US009573181B2

(12) United States Patent
Costa

(10) Patent No.: US 9,573,181 B2
(45) Date of Patent: Feb. 21, 2017

(54) SPINDLE MOUNTABLE CAMERA SYSTEM

(71) Applicant: Larry J. Costa, Mooresville, NC (US)

(72) Inventor: Larry J. Costa, Mooresville, NC (US)

(*) Notice: Subject to any disclaimer, the term of this patent is extended or adjusted under 35 U.S.C. 154(b) by 0 days.

(21) Appl. No.: 14/875,317

(22) Filed: Oct. 5, 2015

(65) Prior Publication Data

US 2016/0097967 A1 Apr. 7, 2016

Related U.S. Application Data

(60) Provisional application No. 62/059,692, filed on Oct. 3, 2014.

(51) Int. Cl.
*G06K 7/14* (2006.01)
*B21C 51/00* (2006.01)
(Continued)

(52) U.S. Cl.
CPC ............ *B21C 51/005* (2013.01); *G03B 11/06* (2013.01); *G03B 17/561* (2013.01); *G05B 19/00* (2013.01);
(Continued)

(58) Field of Classification Search
CPC ....... G06K 2007/10524; G06K 7/0004; G06K 7/10564; G06K 7/10881; B23Q 17/2409;
(Continued)

(56) References Cited

U.S. PATENT DOCUMENTS 3,122,376 A * 2/1964 Atherholt, Sr. ....... B23B 31/305 277/644
4,752,166 A 6/1988 Lehmkuhl
(Continued)

FOREIGN PATENT DOCUMENTS

EP 0296723 A2 12/1988
EP 2296102 A1 3/2011
(Continued)

OTHER PUBLICATIONS

Notification of Transmittal of the International Search Report and the Written Opinion of the International Searching Authority, or the Declaration, issued by the Korean Intellectual Property Office for PCT/US2015/054036 on Dec. 7, 2015, 12 pages.
(Continued)

*Primary Examiner* — Claude J Brown
(74) *Attorney, Agent, or Firm* — Perkins Coie LLP

(57) ABSTRACT

A spindle mountable camera system connectable to a CNC machine for work piece inspection and identification. The camera system includes a mounting stem connectable to a CNC machine tool holder. The mounting stem includes an air passage connectable to an air supply of the CNC machine. An enclosure is attached to the mounting stem and includes a camera opening. A camera module is disposed within the enclosure and an air supply line is connected between the mounting stem and the camera module. An enclosure cover is pivotably mounted to the enclosure proximate the camera opening. One or more pneumatic cylinders are connected to the air passages and extend between the enclosure and the enclosure cover to move the enclosure cover between an open position and a closed position.

11 Claims, 74 Drawing Sheets

Contact Wired and or Wireless Spindle Bar-code Reader / Vision Tool
Mounted In Interchangeable Tool Holder
Lens Cover Open, Top-Left ISO View

(51) Int. Cl.

| | |
|---|---|
| ***G05B 19/401*** | (2006.01) |
| ***G03B 11/06*** | (2006.01) |
| ***G03B 17/56*** | (2006.01) |
| ***G06K 7/10*** | (2006.01) |
| ***G05B 19/18*** | (2006.01) |
| ***G05B 19/00*** | (2006.01) |

(52) U.S. Cl.

CPC ......... *G05B 19/182* (2013.01); *G05B 19/401* (2013.01); *G06K 7/10564* (2013.01); *G06K 7/10881* (2013.01); *G05B 2219/37555* (2013.01); *G05B 2219/45212* (2013.01); *G05B 2219/50042* (2013.01)

(58) Field of Classification Search

CPC .... B23Q 2230/002; G05B 2219/37009; G05B 2219/37555; G05B 19/182; G05B 2219/45212

USPC .......................................................... 235/441

See application file for complete search history.

(56) References Cited

U.S. PATENT DOCUMENTS

| | | | | |
|---|---|---|---|---|
| 6,059,702 | A * | 5/2000 | Winkler ................. | B23Q 3/157 408/56 |
| 6,533,181 | B1 | 3/2003 | Roxby et al. | |
| 7,143,489 | B1 * | 12/2006 | Giebmanns ............. | B23P 15/32 29/38 A |
| 7,191,529 | B2 | 3/2007 | Phipps et al. | |
| 7,423,734 | B1 * | 9/2008 | Luik ....................... | B23B 31/00 356/141.1 |
| 7,866,641 | B1 * | 1/2011 | Switzer ............ | B23B 31/16291 269/20 |
| 8,096,736 | B2 | 1/2012 | Migliore et al. | |
| 8,953,034 | B1 * | 2/2015 | Milosevic .......... | B23Q 17/2409 348/92 |
| 2002/0002885 | A1 * | 1/2002 | Luik ....................... | B23B 31/00 82/118 |
| 2004/0022430 | A1 * | 2/2004 | Franssen ................. | B21B 38/00 382/152 |
| 2005/0079812 | A1 * | 4/2005 | Bechtold ................. | B24B 13/06 451/504 |
| 2006/0174531 | A1 | 8/2006 | Lizotte et al. | |
| 2009/0263199 | A1 * | 10/2009 | Wang ..................... | B23Q 15/22 408/16 |
| 2010/0028097 | A1 | 2/2010 | Luepke | |
| 2010/0051683 | A1 | 3/2010 | Kudo et al. | |
| 2010/0096460 | A1 * | 4/2010 | Carlson ................ | G06K 7/0004 235/462.07 |
| 2012/0321401 | A1 * | 12/2012 | Johnson ................ | B23B 31/083 408/18 |
| 2012/0325781 | A1 | 12/2012 | Gneiting et al. | |
| 2014/0134932 | A1 * | 5/2014 | Nusslein ................. | B24B 29/00 451/446 |
| 2015/0073584 | A1 * | 3/2015 | Goodale ............ | G05B 19/4097 700/186 |
| 2015/0094844 | A1 * | 4/2015 | Kim ..................... | G05B 19/401 700/160 |
| 2015/0172520 | A1 * | 6/2015 | Lindman .............. | H04N 5/2252 382/190 |
| 2015/0185592 | A1 * | 7/2015 | Eineren .................. | G03B 17/02 348/375 |

FOREIGN PATENT DOCUMENTS

| | | | |
|---|---|---|---|
| JP | 2000153698 | A | 6/2000 |
| JP | 2002263976 | A | 9/2002 |
| JP | 2002347394 | A | 12/2002 |
| JP | 2008269219 | A | 11/2008 |
| JP | 2009196003 | A | 9/2009 |

OTHER PUBLICATIONS

Notification of Transmittal of the International Search Report and the Written Opinion of the International Searching Authority, or the Declaration, issued by the Korean Intellectual Property Office for PCT/US2015/054041 on Dec. 23, 2015, 11 pages.

Notification of Transmittal of the International Search Report and the Written Opinion of the International Searching Authority, or the Declaration, issued by the Korean Intellectual Property Office for PCT/US2015/054044 on Jan. 18, 2016, 14 pages.

* cited by examiner

Contact Wired and or Wireless Spindle Bar-code Reader / Vision Tool
Mounted in Interchangeable Tool Holder
Lens Cover Closed, Top-Left ISO View Contact Wired and or Wireless Spindle Bar-code Reader / Vision Tool
Mounted in Interchangeable Tool Holder
Lens Cover Open, Top-Left ISO View Contact Wired and or Wireless Spindle Bar-code Reader / Vision Tool
Top-Left ISO External Components and Devices Exploded View Contact Wired and or Wireless Spindle Bar-code Reader / Vision Tool
Lens Cover Open, Top-Left ISO Cutaway View Contact Wired and or Wireless Spindle Bar-code Reader / Vision Tool
Top-Left ISO Internal Modules and Devices View Contact Wired and or Wireless Spindle Bar-code Reader / Vision Tool
With an External Induction Re-Charger Module
Top-Left ISO Internal Modules and Devices Exploded View Contact Wired and or Wireless Spindle Bar-code Reader / Vision Tool
Mounted in Interchangeable Tool Holder
With an Induction Re-charger Module and Electrical Contacts
Lens Cover Closed, Lower-Back-Right ISO View Contact Wired and or Wireless Spindle Bar-code Reader / Vision Tool
Mounted In Interchangeable Tool Holder
With an Induction Re-charger Module and Electical Contacts
Lens Cover Closed, Top and Side Section Views Contact Wired and or Wireless Spindle Bar-code Reader / Vision Tool
Mounted In Interchangeable Tool Holder, Top-Left ISO View
Communications and Electrical Interface Configuration Options Contact Wired and or Wireless Spindle Bar-code Reader / Vision Tool
Mounted in Interchangeable Tool Holder
With Electrical Contacts and or Re-charger Module
Lens Cover Closed, Lower-Back-Right ISO View Contact Wired and or Wireless Spindle Bar-code Reader / Vision Tool
Mounted in Interchangeable Tool Holder
With an Electical Contacts Re-charger Module
Lens Cover Closed, Top and Side Section Views Contact Wired and or Wireless Spindle Bar-code Reader / Vision Tool
Mounted in Interchangeable Tool Holder
With an Electrical Contacts Re-charger Module
Lens Cover Closed, Side and Top Section Views

| Item | Qty | Name |
|---|---|---|
| 9 | 1 | VISION_CAMERA_LENS_UCS |
| 9.10 | 1 | 2-CONTACT_ENCLOSURE |
| 9.10.2 | 1 | ENCLOSURE_LENS_COVER |
| 9.10.1 | 1 | 2-CONTACT_CUT-AWAY_ENCLOSURE |
| 9.100 | 1 | 4-CONTACT_DIRECT_INTERCONNECTION_MODULE |
| 9.101 | 1 | NO-CONTACT_INDUCTION_INTERCONNECTION_MODULE |
| 9.102 | 1 | 2-CONTACT_DIRECT_INTERCONNECTION_MODULE |
| 9.103 | 1 | 4-CONTACT_ENCLOSURE |
| 9.104 | 1 | NO-CONTACT_ENCLOSURE |
| 9.108 | 1 | WIRED_COMMUNICATIONS_MODULE |
| 9.109 | 1 | 2-CONTACT_AND_INDUCTION_CHARGING_MODULE |
| 9.11.1 | 1 | MOUNTING_STEM |
| 9.11.2 | 2 | 20MM_O-RING |
| 9.110 | 2 | HEXAGON SOCKET SET SCREW - ISO 4028 - M6X16 |
| 9.111 | 1 | INDUCTION_CHARGING_MODULE |
| 9.112 | 1 | 2-CONTACT_CHARGING_MODULE |
| 9.113 | 6 | HEXAGON SOCKET SET SCREW - ISO 4028 - M6X30 |
| 9.114 | 1 | 4-CONTACT_CHARGING_MODULE |
| 9.12 | 2 | KJS02-M3 |
| 9.13 | 1 | HEXAGON SOCKET SET SCREW - ISO 4027 - M5X5 |
| 9.14 | 2 | HEXAGON SOCKET SET SCREW - ISO 4027 - M3X5 |
| 9.15 | 4 | HEXAGON SOCKET SET SCREW - ISO 4026 - M3X3 |
| 9.16 | 1 | AIR_PRESSURE_SWITCH |
| 9.17 | 1 | VENT_MBO-1032M-10-SS |
| 9.18 | 1 | STEM_ROTATIONAL_LOCATOR |
| 9.19 | 4 | PIN - HARDENED GROUND MACHINE DOWEL - ANSI B18.8.2 - 1/2 X 1 |
| 9.20.1 | 1 | LIGHT-RING |
| 9.20 | 1 | CAMERA-MODULE |
| 9.21 | 1 | HEXAGON SOCKET SET SCREW - ISO 4026 - M12X12 |
| 9.22 | 1 | LENS-COVER_PIVOT-HINGE-MOUNT |
| 9.23 | 1 | 2ND_CYLINDER_ROD_MOUNT |
| 9.24 | 2 | USR-08-2_CYLINDER |
| 9.25 | 2 | USR-08-2_ROD |
| 9.26 | 2 | CYLINDER_PIVOT_SPACER |
| 9.27 | 2 | HEXAGON SOCKET SHOULDER SCREW - ISO 7379 - 6.5 X 12 |
| 9.28 | 4 | 6MM_O-RING |
| 9.29 | 2 | HEXAGON SOCKET SET SCREW - ISO 4026 - M5X6 |
| 9.30 | 1 | 2-CONTACT_INDUCTION_INTERCONNECTION_MODULE |
| 9.31 | 2 | HEX NUT - ISO 4035 - M5 |
| 9.32 | 1 | 1ST_CYLINDER_ROD_MOUNT |
| 9.33 | 1 | CYLINDER_ROD_PIVOT |
| 9.34 | 4 | EXTERNAL TYPE-3AM1 - ANSI B27.7 - 6 |
| 9.35 | 1 | LENS_COVER_PIVOT |
| 9.36 | 8 | HEXAGON SOCKET BUTTON HEAD SCREW - ISO 7380 - M5X10 |
| 9.37 | 4 | CONTACT_SHOULDER_SCREW_DIN-921_M6X8 |
| 9.38 | 1 | CAMERA_AIR_FEED |
| 9.39 | 9 | HEX NUT - ISO 4035 - M6 |
| 9.40 | 1 | WIRELESS_COMMUNICATIONS_MODULE |
| 9.41 | 3 | INDUCTION_COIL |
| 9.50 | 6 | TLP-93311-A-SM_LTC-HLC-BATTERY |
| 9.7 | 1 | LENS_SHROUD |
| 9.90 | 1 | E2504_584_20275_20MM_CAT-50_TOOL_HOLDER |
| 9.91 | 1 | RETENTION_KNOB_REP |
| 9.93 | 2 | COMPRESSED_COMPRESSION_SPRING - 1.000000 X 11.500000 X 31.140000 |
| 9.94 | 2 | EXTENDED_COMPRESSION_SPRING - 1.000000 X 11.700000 X 81.940000 |
| 9.98 | 1 | LASER_DISTANCE_SENSOR |
| 9.99 | 1 | LASER_BAR-CODE_READER |
| 9.118 | 2 | TRANSMIT_IR-LED |
| 9.119 | 2 | RECEIVE_IR-SENSOR |

Contact Wired and or Wireless Spindle Bar-code Reader / Vision Tool
Mounted In Interchangeable Tool Holder
Bill Of Materials

Figure-14

Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder
Lens Cover Closed, Top-Left ISO View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder
Lens Cover Open, Top-Left ISO View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Top-Left ISO External Components and Devices Exploded View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Lens Cover Open, Top-Left ISO Cutaway View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Top-Left ISO Internal Modules and Devices View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
With an External Induction Re-Charger Module
Top-Left ISO Internal Modules and Devices Exploded View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted in Interchangeable Tool Holder
With an Induction Re-charger Module and Electical Contacts
Lens Cover Closed, Lower-Back-Right ISO View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder
With an Induction Re-charger Module and Electical Contacts
Lens Cover Closed, Top and Side Section Views Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder
With an Induction Re-charger Module and Electrical Contacts
Lens Cover Closed, Side and Top Section Views Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder, Top-Left ISO View
Communications and Electrical Interface Configuration Options Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted in Interchangeable Tool Holder
With Electical Contacts and or Re-charger Module
Lens Cover Closed, Lower-Back-Right ISO View Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted in Interchangeable Tool Holder
With an Electical Contacts Re-charger Module
Lens Cover Closed, Top and Side Section Views Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder
With an Electical Contacts Re-charger Module
Lens Cover Closed, Side and Top Section Views

| Item | Qty | Name |
|---|---|---|
| 9 | 1 | VISION_CAMERA_LENS_UCS |
| 9.100 | 1 | 4-CONTACT_DIRECT_INTERCONNECTION_MODULE |
| 9.10.1 | 1 | 2-CONTACT_CUT-AWAY_ENCLOSURE |
| 9.10.2 | 1 | ENCLOSURE_LENS_COVER |
| 9.10 | 1 | 2-CONTACT_ENCLOSURE |
| 9.101 | 1 | NO-CONTACT_INDUCTION_INTERCONNECTION_MODULE |
| 9.102 | 1 | 2-CONTACT_DIRECT_INTERCONNECTION_MODULE |
| 9.103 | 1 | 4-CONTACT_ENCLOSURE |
| 9.104 | 1 | NO-CONTACT_ENCLOSURE |
| 9.108 | 1 | WIRED_COMMUNICATIONS_MODULE |
| 9.109 | 1 | 2-CONTACT_AND_INDUCTION_CHARGING_MODULE |
| 9.11.2 | 2 | 20MM_O-RING |
| 9.11.1 | 1 | MOUNTING_STEM |
| 9.110 | 2 | HEXAGON SOCKET SET SCREW - ISO 4028 - M6X16 |
| 9.111 | 1 | INDUCTION_CHARGING_MODULE |
| 9.112 | 1 | 2-CONTACT_CHARGING_MODULE |
| 9.113 | 6 | HEXAGON SOCKET SET SCREW - ISO 4028 - M6X30 |
| 9.114 | 1 | 4-CONTACT_CHARGING_MODULE |
| 9.115 | 1 | LASERCHECK_8826_HEAD |
| 9.116 | 1 | AIR_BLOW-OFF_KNIFE |
| 9.117 | 1 | IR-TEMPERATURE_SENSOR |
| 9.118 | 2 | TRANSMIT_IR-LED |
| 9.119 | 2 | RECEIVE_IR-SENSOR |
| 9.12 | 2 | KJS02-M3 |
| 9.13 | 1 | HEXAGON SOCKET SET SCREW - ISO 4027 - M5X5 |
| 9.14 | 2 | HEXAGON SOCKET SET SCREW - ISO 4027 - M3X5 |
| 9.15 | 4 | HEXAGON SOCKET SET SCREW - ISO 4026 - M3X3 |
| 9.16 | 1 | AIR_PRESSURE_SWITCH |
| 9.17 | 1 | VENT_MBO-1032M-10-SS |
| 9.18 | 1 | STEM_ROTATIONAL_LOCATOR |
| 9.19 | 4 | PIN - HARDENED GROUND MACHINE DOWEL - ANSI B18.8.2 - 1/2 X 1 |
| 9.20 | 1 | CAMERA-MODULE |
| 9.20.1 | 1 | LIGHT-RING |
| 9.21 | 1 | HEXAGON SOCKET SET SCREW - ISO 4026 - M12X12 |
| 9.22 | 1 | LENS-COVER_PIVOT-HINGE-MOUNT |
| 9.23 | 1 | 2ND_CYLINDER_ROD_MOUNT |
| 9.24 | 2 | USR-08-2_CYLINDER |
| 9.25 | 2 | USR-08-2_ROD |
| 9.26 | 2 | CYLINDER_PIVOT_SPACER |
| 9.27 | 2 | HEXAGON SOCKET SHOULDER SCREW - ISO 7379 - 6.5 X 12 |
| 9.28 | 4 | 6MM_O-RING |
| 9.29 | 2 | HEXAGON SOCKET SET SCREW - ISO 4026 - M5X6 |
| 9.30 | 1 | 2-CONTACT_INDUCTION_INTERCONNECTION_MODULE |
| 9.31 | 2 | HEX NUT - ISO 4035 - M5 |
| 9.32 | 1 | 1ST_CYLINDER_ROD_MOUNT |
| 9.33 | 1 | CYLINDER_ROD_PIVOT |
| 9.34 | 4 | EXTERNAL TYPE-3AM1 - ANSI B27.7 - 6 |
| 9.35 | 1 | LENS_COVER_PIVOT |
| 9.36 | 8 | HEXAGON SOCKET BUTTON HEAD SCREW - ISO 7380 - M5X10 |
| 9.37 | 4 | CONTACT_SHOULDER_SCREW_DIN-921_M6X8 |
| 9.38 | 1 | CAMERA_AIR_FEED |
| 9.39 | 9 | HEX NUT - ISO 4035 - M6 |
| 9.40 | 1 | WIRELESS_COMMUNICATIONS_MODULE |
| 9.41 | 3 | INDUCTION_COIL |
| 9.50 | 6 | TLP-93311-A-SM_LTC-HLC-BATTERY |
| 9.7 | 1 | LENS_SHROUD |
| 9.90 | 1 | E2504_584_20275_20MM_CAT-50_TOOL_HOLDER |
| 9.91 | 1 | RETENTION_KNOB_REP |
| 9.93 | 2 | COMPRESSED_COMPRESSION_SPRING - 1.000000 X 11.500000 X 31.140000 |
| 9.94 | 2 | EXTENDED_COMPRESSION_SPRING - 1.000000 X 11.700000 X 81.940000 |
| 9.98 | 1 | LASER_DISTANCE_SENSOR |
| 9.99 | 1 | LASER_BAR-CODE_READER |

Contact Wired and or Wireless Non-contact Work piece Data Collection Spindle Tool
Infrared Temperature Probe, Laser Surface Roughness Gauge, Laser Distance & Edge Finder,
Bar-code Reader, 2D & 3D Vision Metrologies
Mounted In Interchangeable Tool Holder
Bill Of Materials

Figure-28

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 1 = Spindle Data - Metrology Tool in Storage Chain Pocket, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 2 = Spindle Data - Metrology Tool in 1st Pivot Xfer Pocket, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 3 = Spindle Data - Metrology Tool Rotated in 1st Pivot Xfer Pocket, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 4 = Spindle Data - Metrology Tool at Middle of Rotation to Next Tool Position In 1st Pivot Xfer Pocket, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 5 = Spindle Data - Metrology Tool in Next Tool Pivot Xfer Pocket, Top-Left ISO View Work Piece Data Collection Spindle Tool used in CNC HMC with Chain Tool Stroage Pocket System
For Work Piece Infrared Temperature Probe, Laser Surface Roughness Gauge,
Laser Distance & Edge Finder, Bar-code Reader, 2D & 3D Vision Metrologies
Step 6 = Spindle Data - Metrology Tool Powered and Programmed in Next Tool Pivot Xfer Pocket, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 7 = Spindle Data - Metrology Tool Cleared In Next Tool Pivot Xfer Pocket and Enclosure Open, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 8 = S-Arm Engaging Spindle Data - Metrology Tool in Next Tool Pivot Xfer Pocket and Spindle Tool, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 9 = S-Arm Removing Spindle Data - Metrology Tool in Next Tool Pivot Xfer Pocket and Spindle Tool, Top-Left ISO View

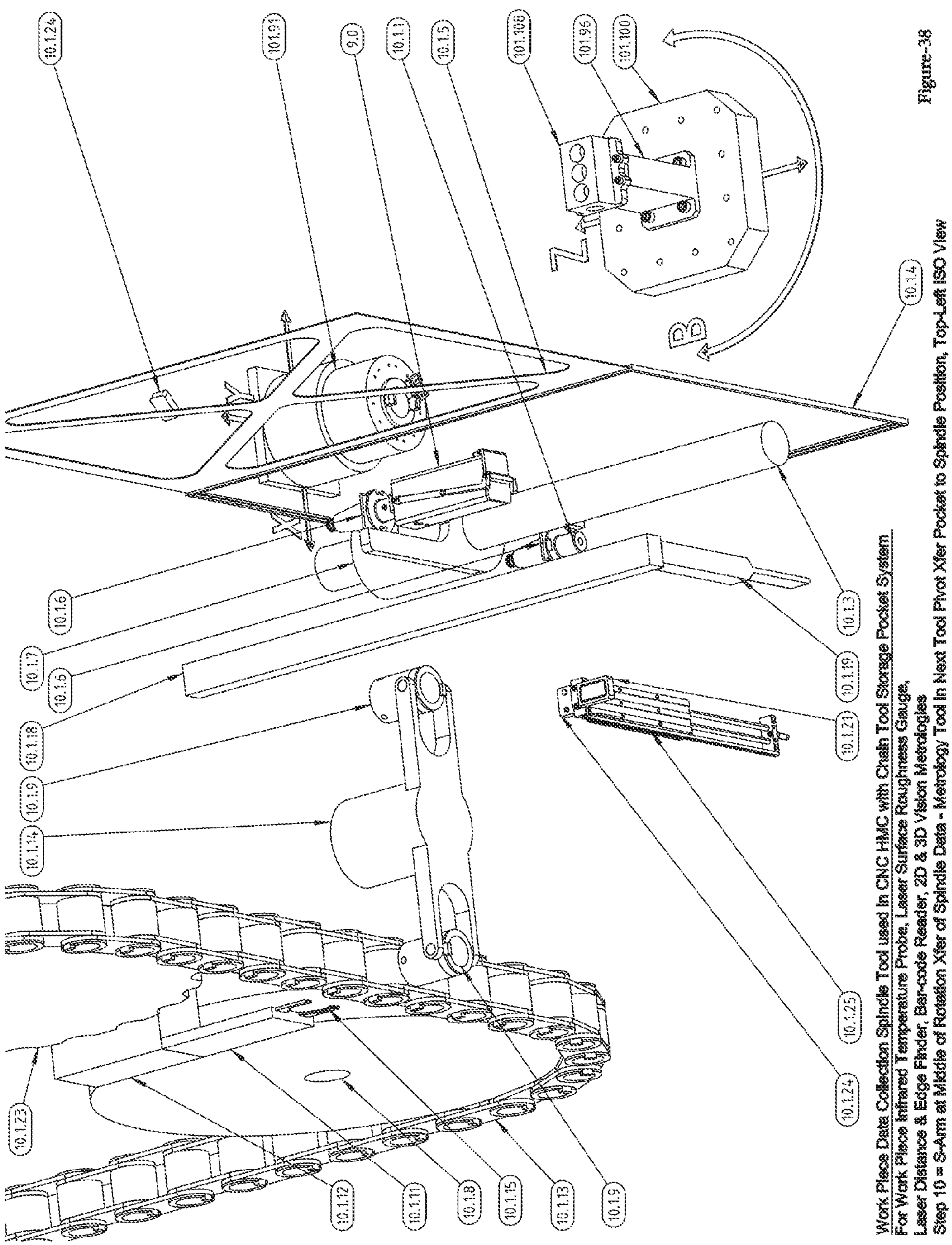

Work Piece Data Collection Spindle Tool used In CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 10 = S-Arm at Middle of Rotation Xfer of Spindle Data - Metrology Tool In Next Tool Pivot Xfer Pocket to Spindle Position, Top-Left ISO View

Figure-38

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 11 = S-Arm Xfered Spindle Data - Metrology Tool from Next Tool Pivot Xfer Position to Spindle Position, Top-Left ISO View

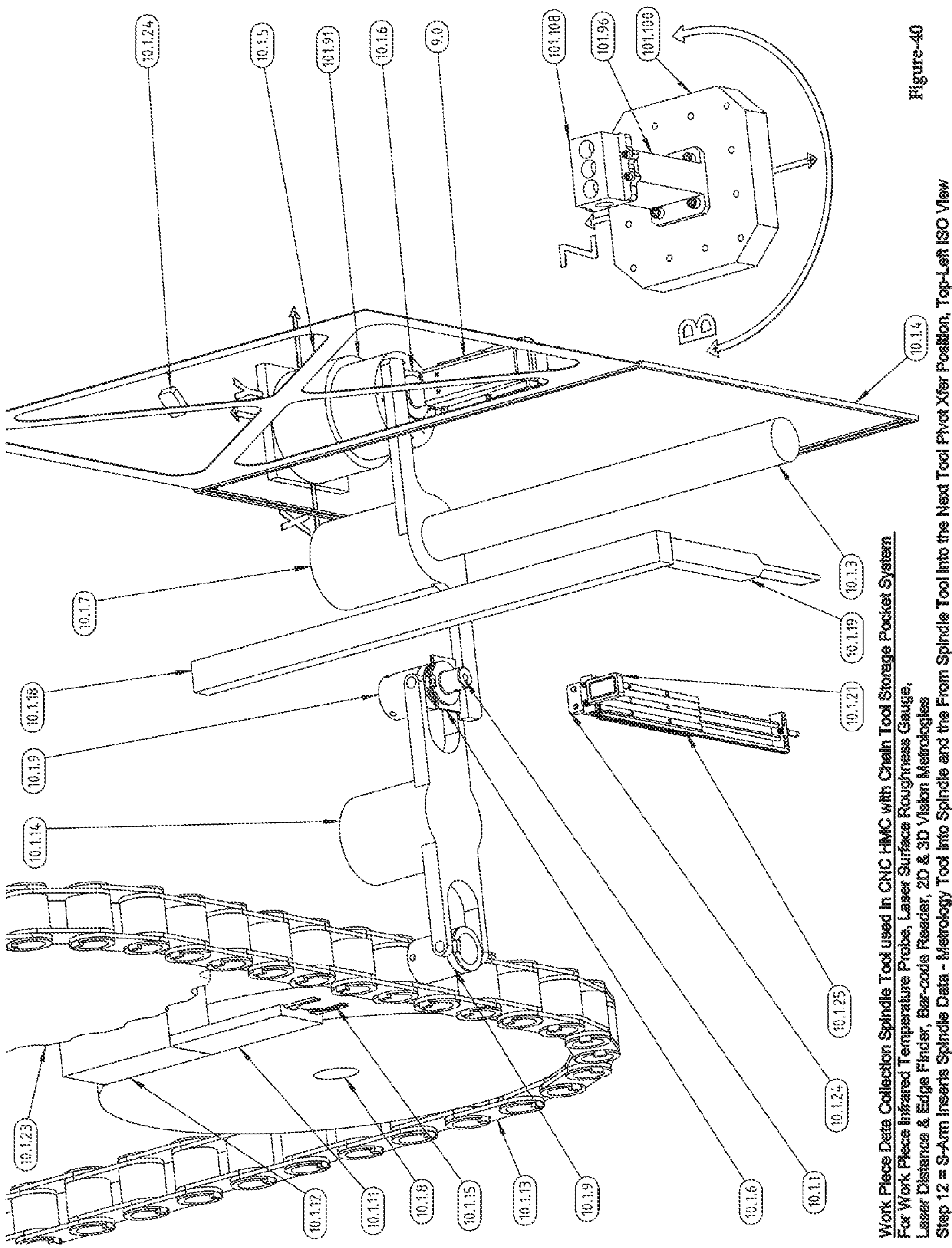

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 12 = S-Arm Inserts Spindle Data - Metrology Tool into Spindle and the From Spindle Tool into the Next Tool Pivot Xfer Position, Top-Left ISO View

Figure-40

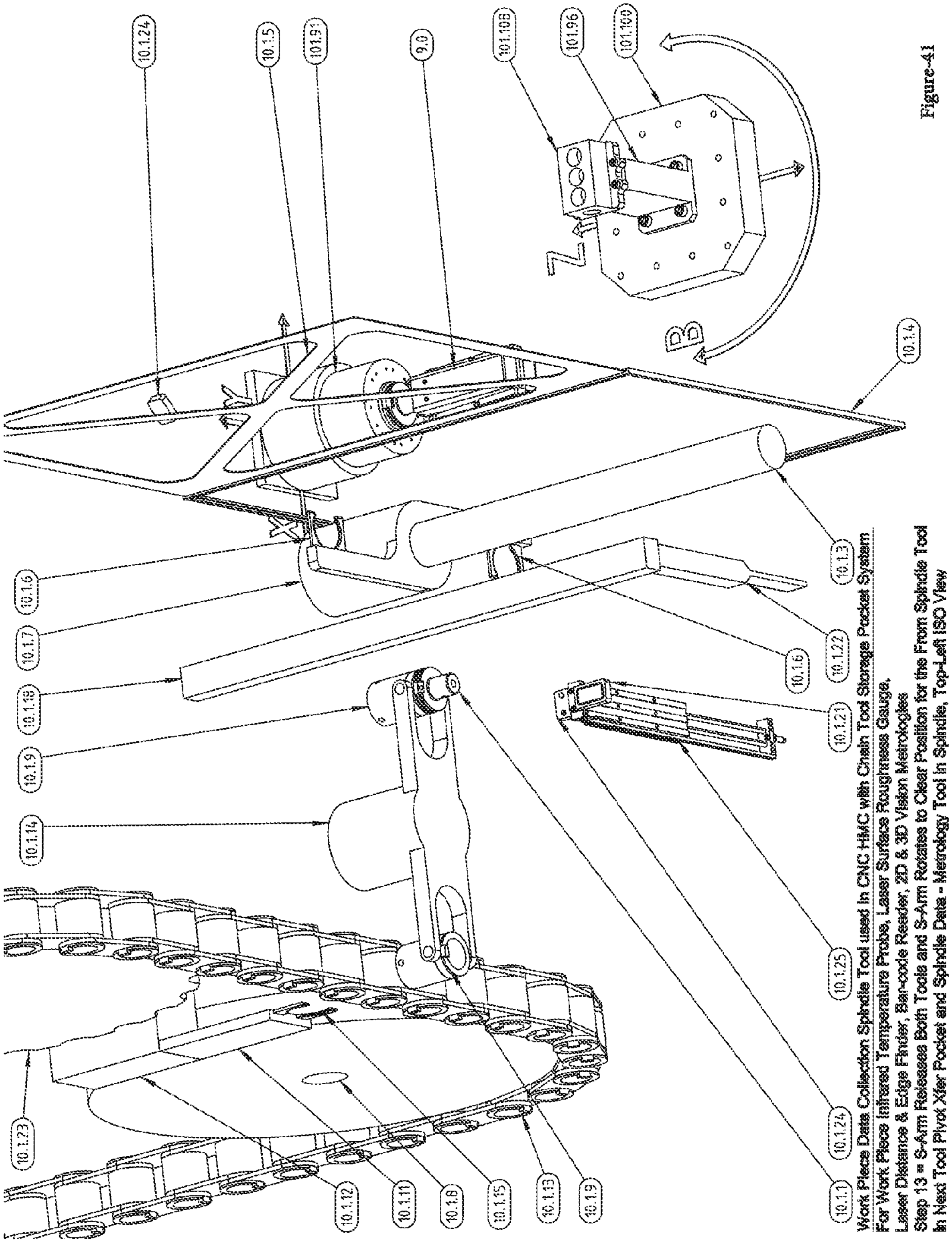

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 13 = S-Arm Releases Both Tools and S-Arm Rotates to Clear Position for the From Spindle Tool
In Next Tool Pivot Xfer Pocket and Spindle Data - Metrology Tool in Spindle, Top-Left ISO View

Figure-41

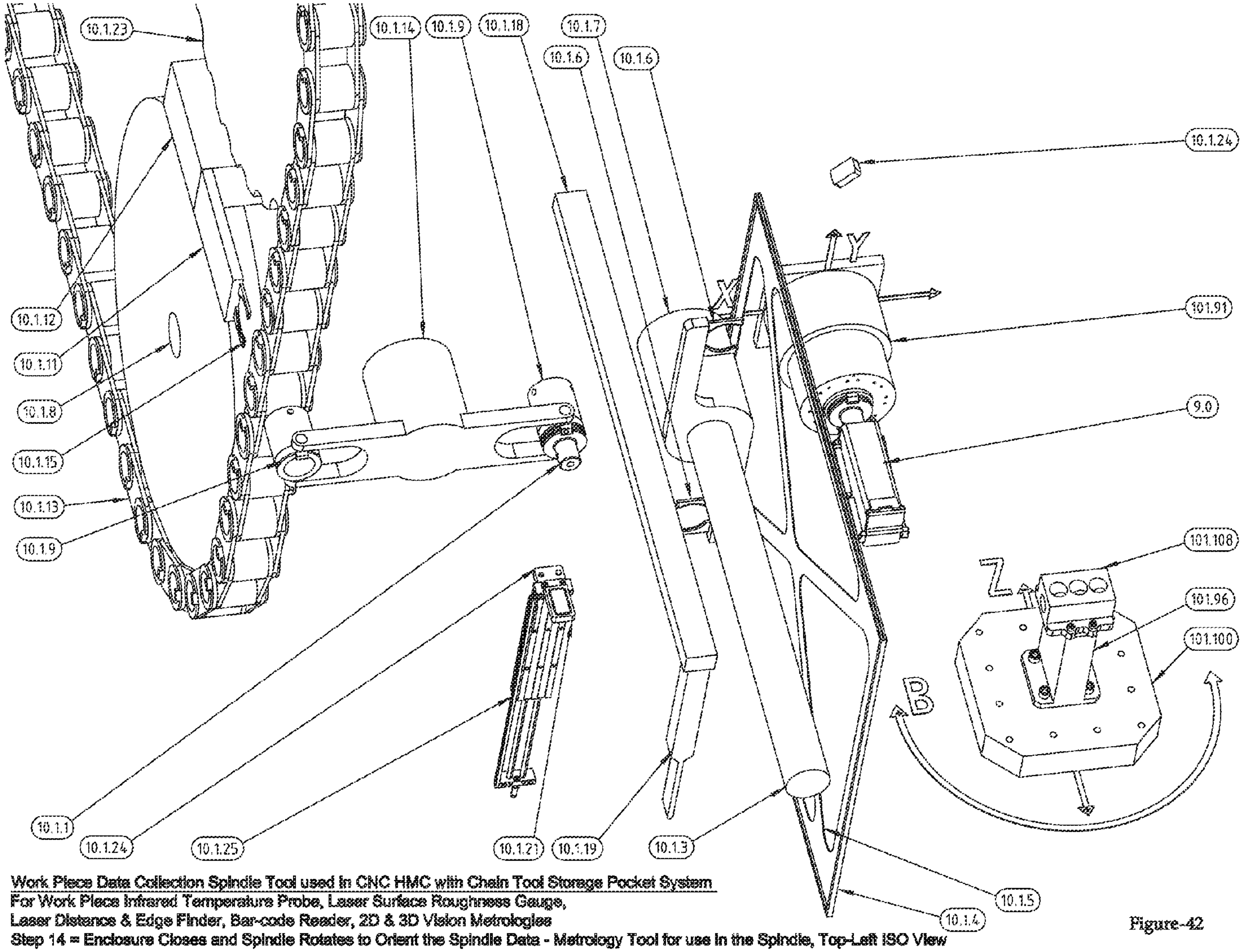

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 14 = Enclosure Closes and Spindle Rotates to Orient the Spindle Data - Metrology Tool for use in the Spindle, Top-Left ISO View

Figure-42

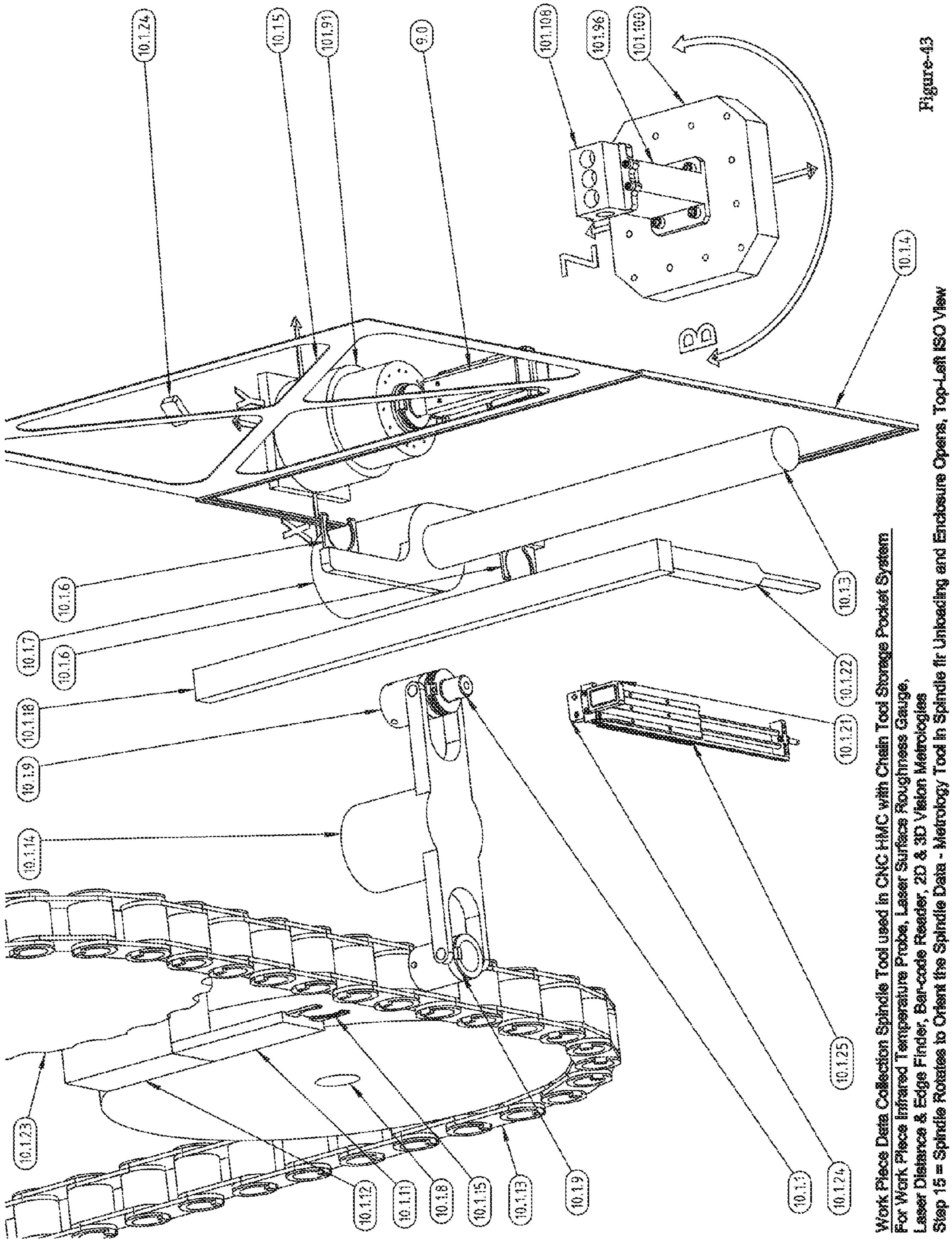

Figure-43

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 15 = Spindle Rotates to Orient the Spindle Data - Metrology Tool in Spindle fir Unloading and Enclosure Opens, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 16 = S-Arm Engaging Tool In Next Tool Pivot Xfer Pocket and Spindle Data - Metrology In Spindle, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 17 = S-Arm Removing Tool from Next Tool Pivot Xfer Pocket and Spindle Data - Metrology Tool from Spindle, Top-Left ISO View

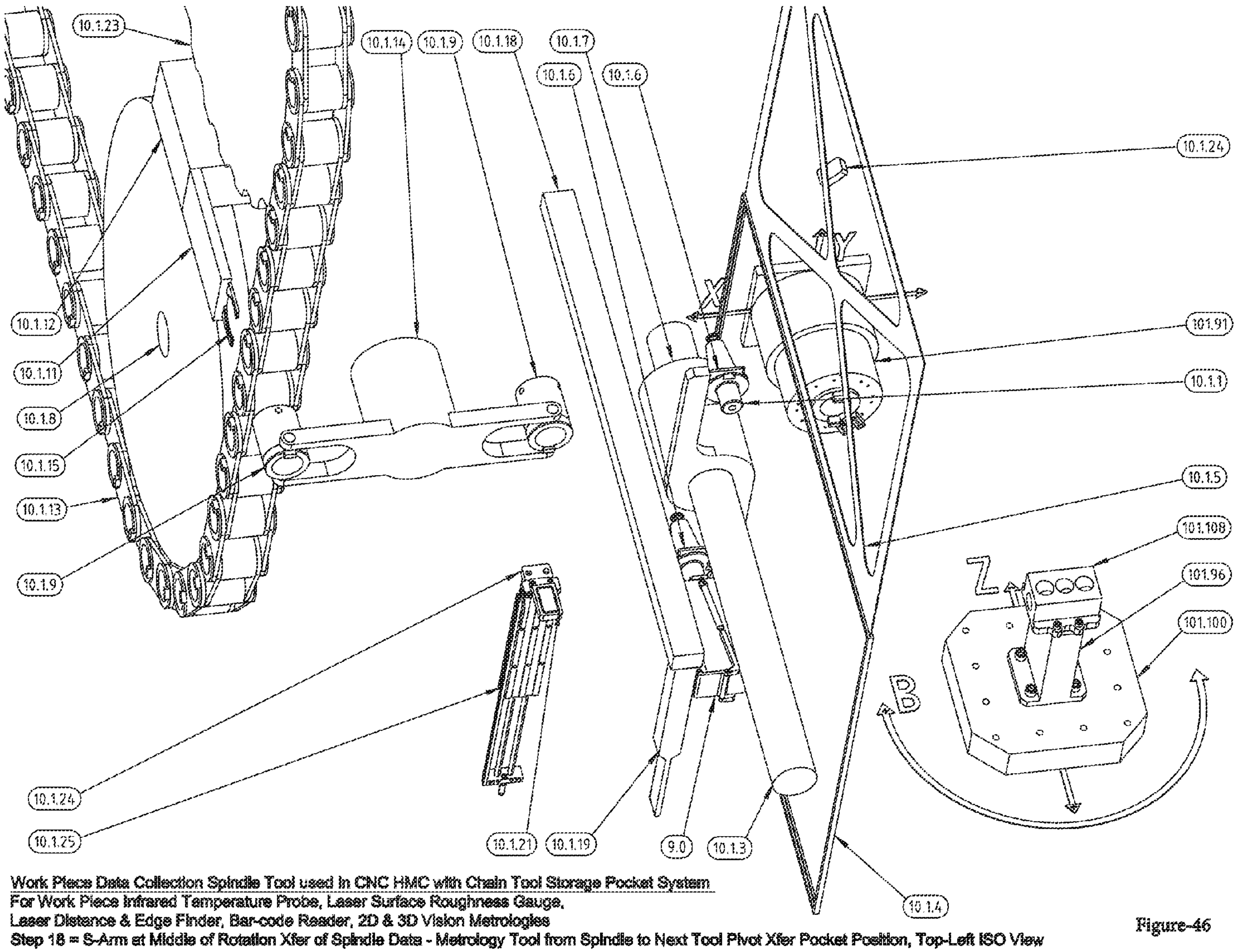

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 18 = S-Arm at Middle of Rotation Xfer of Spindle Data - Metrology Tool from Spindle to Next Tool Pivot Xfer Pocket Position, Top-Left ISO View

Figure-46

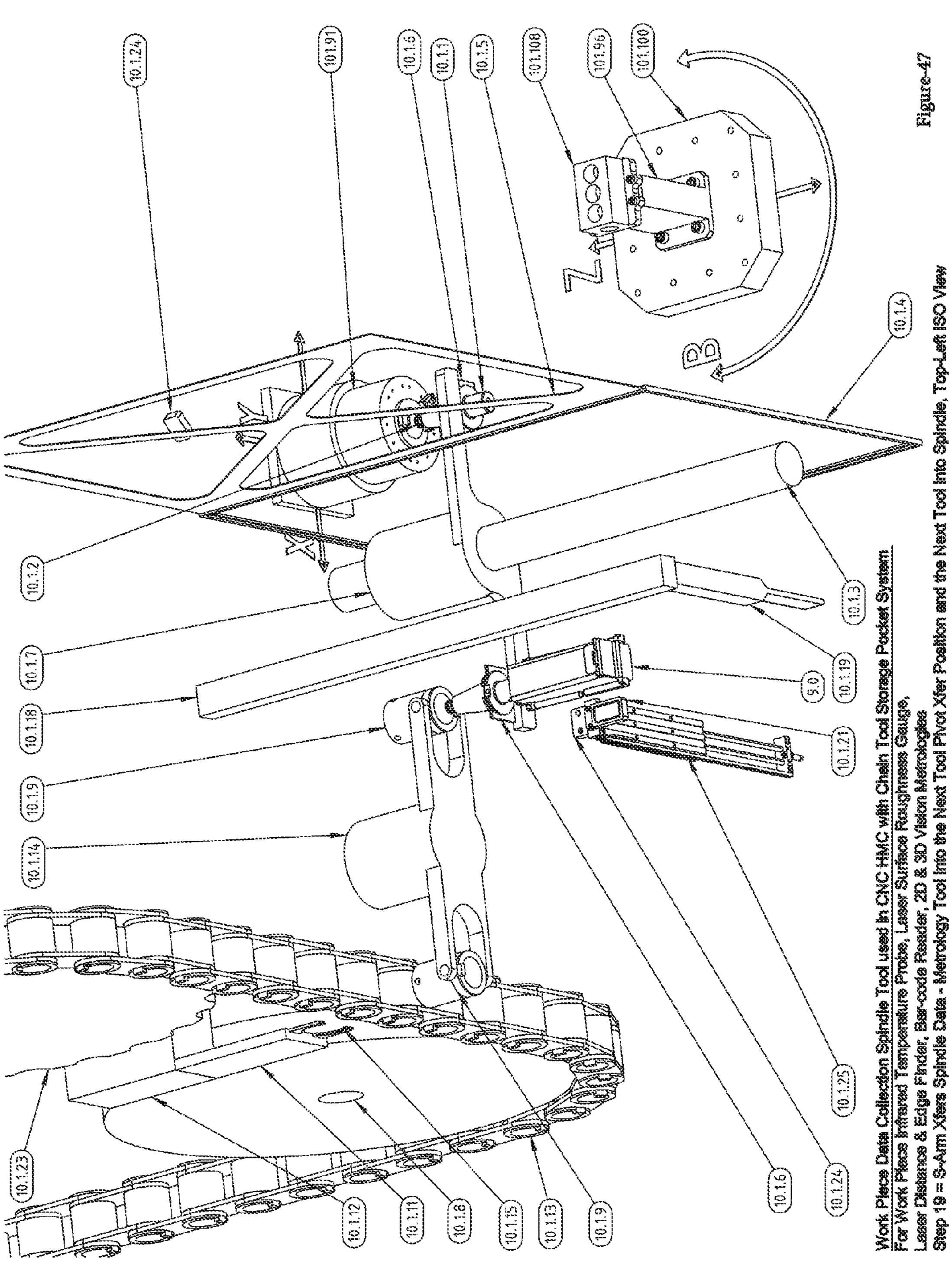

Figure-47

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 19 = S-Arm Xfers Spindle Data - Metrology Tool into the Next Tool Pivot Xfer Position and the Next Tool into Spindle, Top-Left ISO View

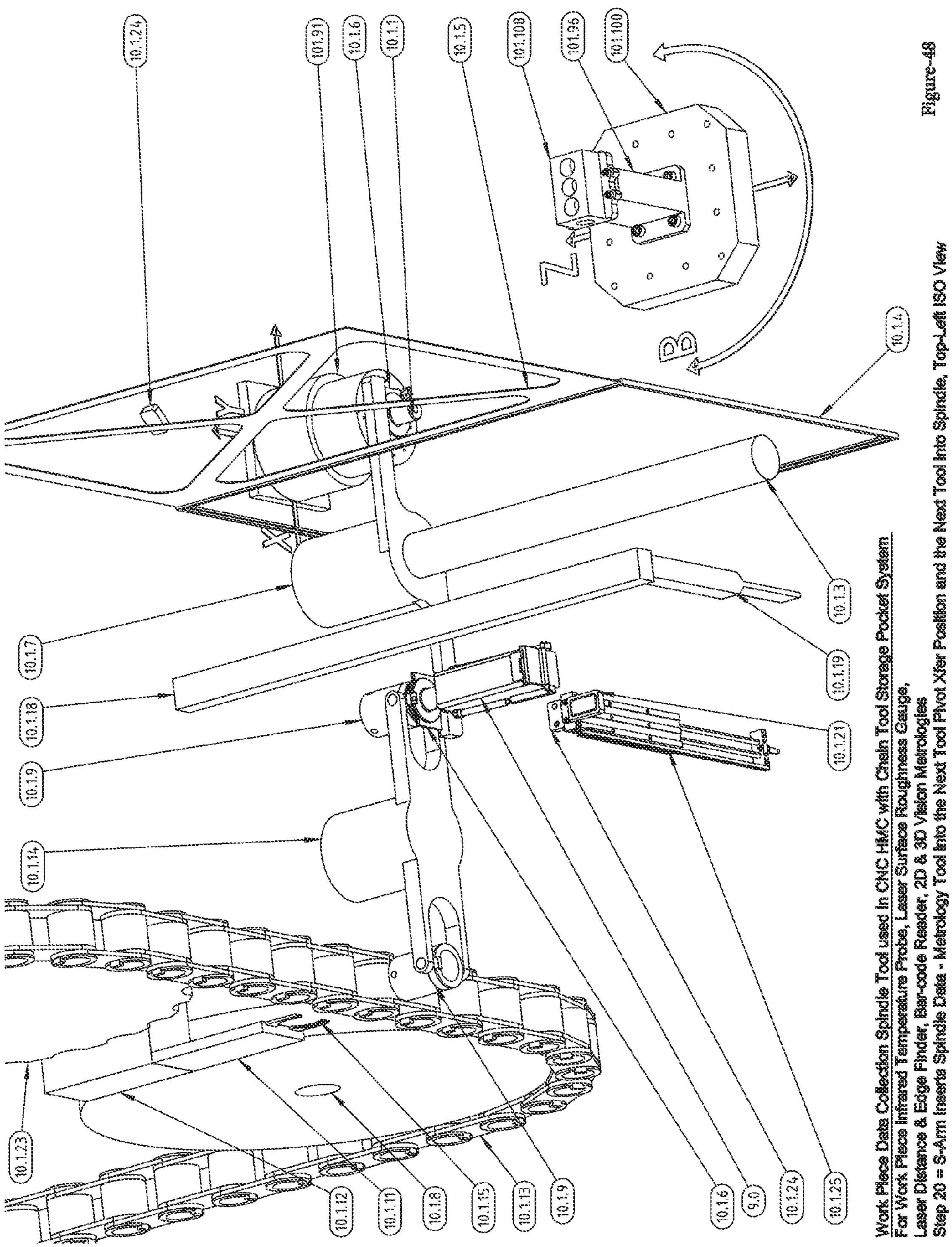

Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 20 = S-Arm Inserts Spindle Data - Metrology Tool into the Next Tool Pivot Xfer Position and the Next Tool into Spindle, Top-Left ISO View

Figure-48

Work Piece Data Collection Spindle Tool used In CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 21 = S-Arm Releases Both Tools, S-Arm Rotates to Clear Position, and Enclosure Closes, Top-Left ISO View Work Piece Data Collection Spindle Tool used in CNC HMC with Chain Tool Storage Pocket System
For Work Piece Infrared Temperature Probe, Laser Surface Roughness Gauge,
Laser Distance & Edge Finder, Bar-code Reader, 2D & 3D Vision Metrologies
Step 22 = Spindle Data - Metrology Tool Powered and Data-Collected in Next Tool Pivot Xfer Pocket, Top-Left ISO View Work Piece Data Collection Spindle Tool used in CNC HMC with Magazine Storage Pocket System
For Work Piece Infrared Temperature Probe, Laser Surface Roughness Gauge,
Laser Distance & Edge Finder, Bar-code Reader, 2D & 3D Vision Metrologies
Step 1 = Powered and Programming the Spindle Data - Metrology Tool in Magazine Storage Pocket #21, Top-Left ISO View

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 2 = Spindle Date - Metrology Tool at the Pocket Grip Position of the Magazine Storage Pocket #21, Top-Left ISO View Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 3 = Spindle Data - Metrology Tool at the Pocket Removal Position of the Magazine Storage Pocket #21, Top-Left ISO View Work Piece Data Collection Spindle Tool used In CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 4 = Spindle Data - Metrology Tool at the Pocket Removed Position of the Magazine Storage Pocket #21, Top-Left ISO View Work Piece Data Collection Spindle Tool used In CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 5 = Spindle Data - Metrology Tool In Next Tool Position with IR Communications, Top-Left ISO View Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 6 = Spindle Data - Metrology Tool Ready in Next Tool Position and Enclosure Open, Top-Left ISO View

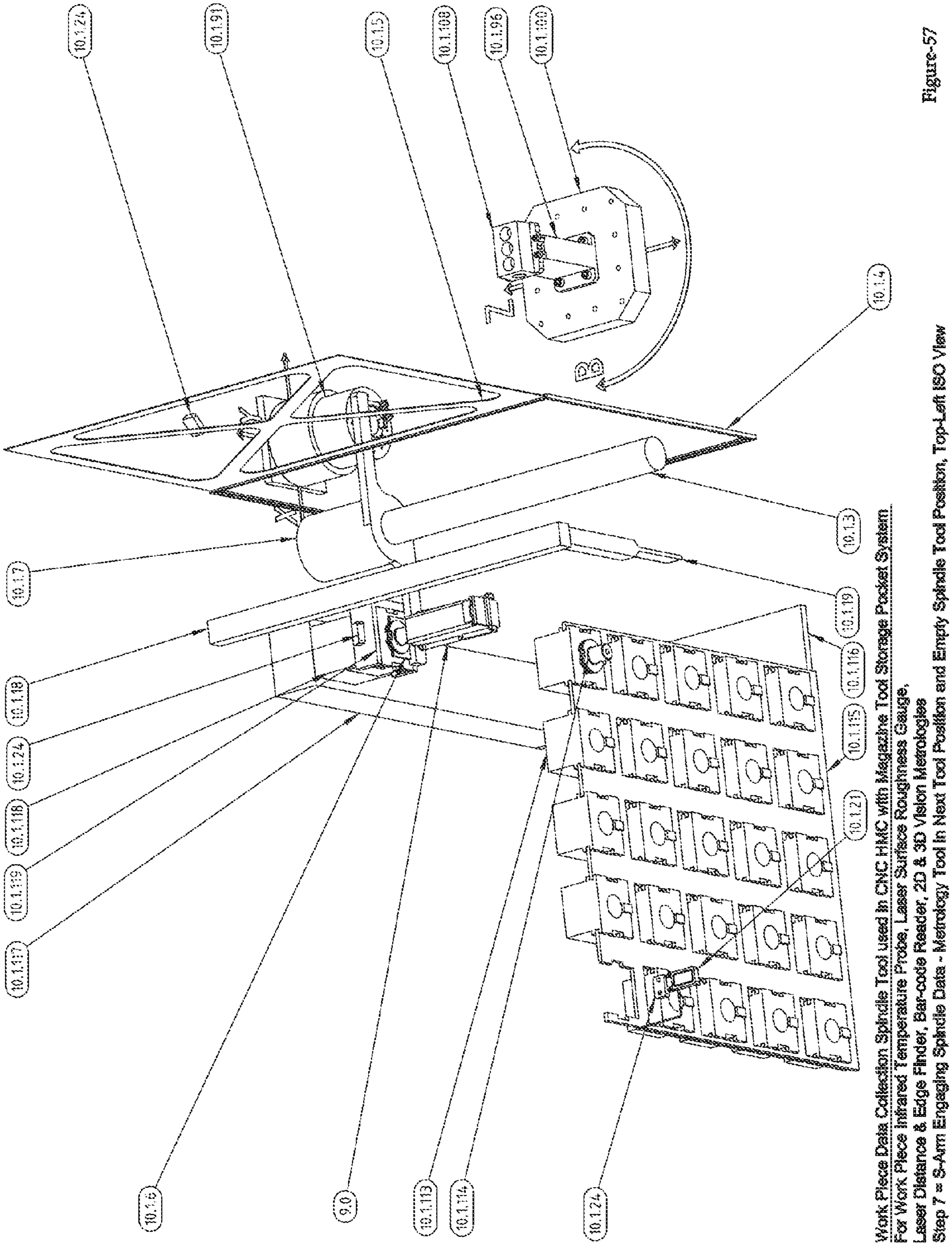

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 7 = S-Arm Engaging Spindle Data - Metrology Tool in Next Tool Position and Empty Spindle Tool Position, Top-Left ISO View

Figure-57

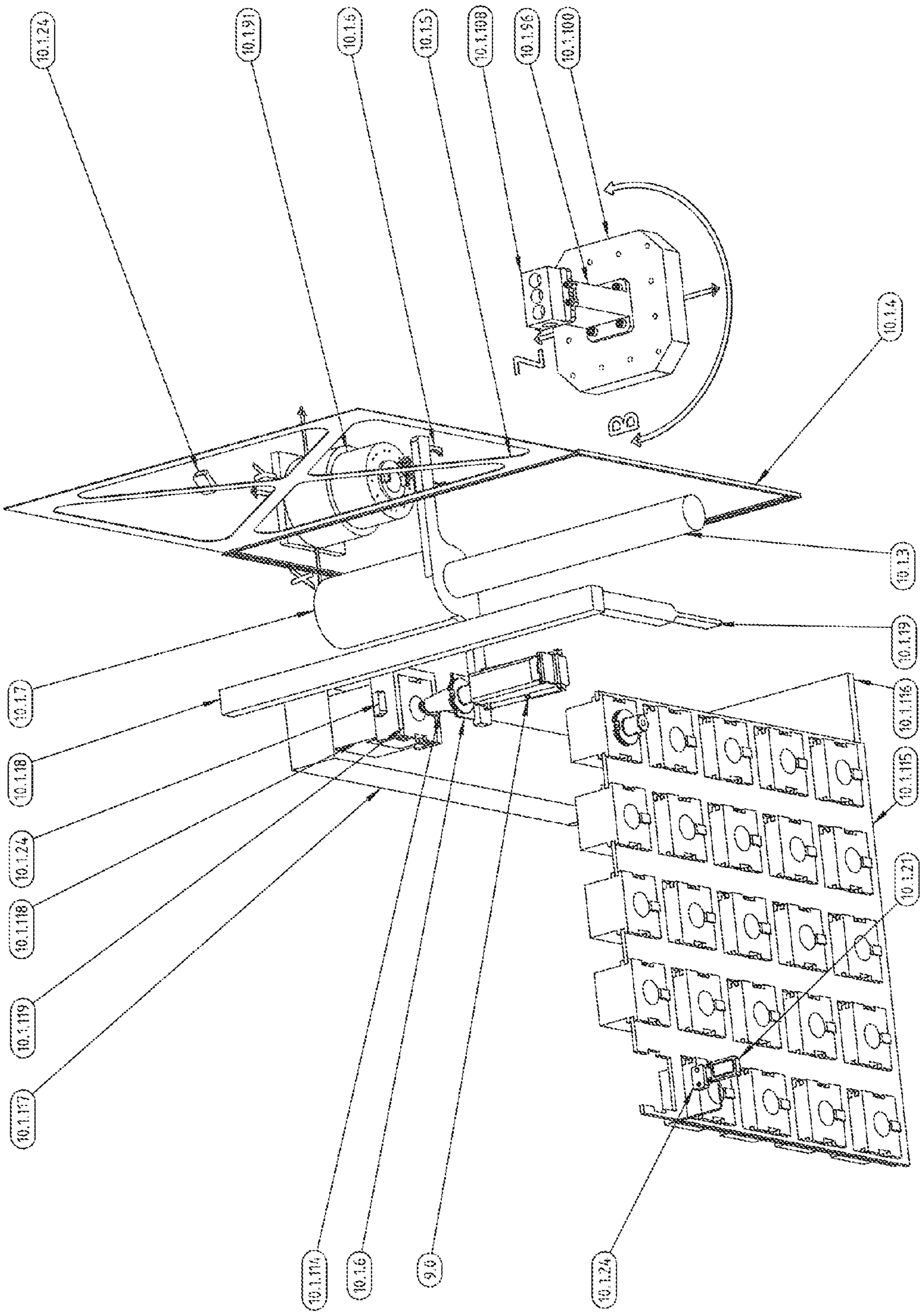

Figure-58

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 9 = S-Arm Removing Spindle Data - Metrology Tool from Next Tool Pocket Position and Empty Spindle Tool Position, Top-Left ISO View

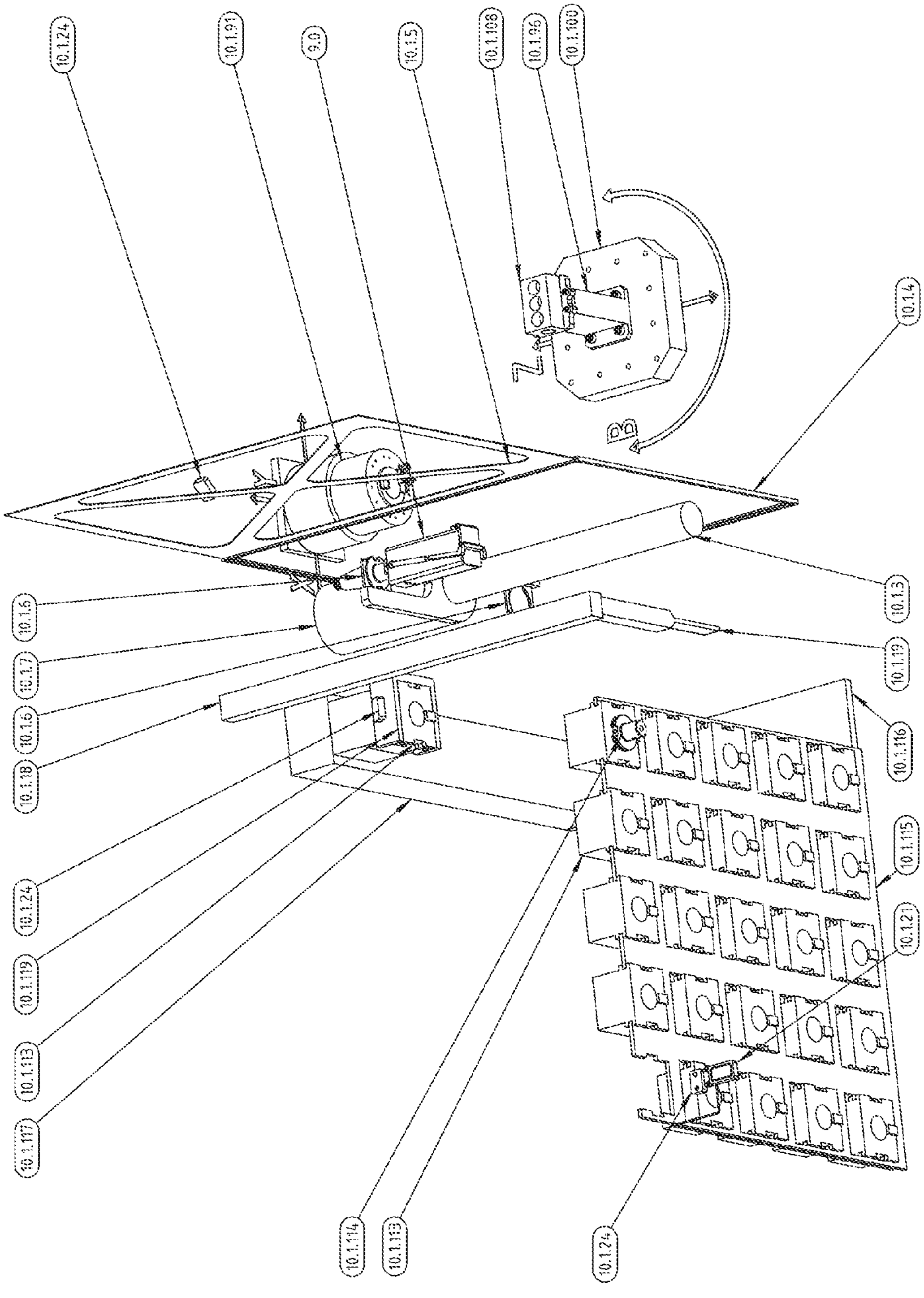

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 9 = S-Arm at Middle of Rotation Xfer of Spindle Data - Metrology Tool from Next Tool Position to Empty Spindle Tool Position, Top-Left ISO View

Figure-59

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 10 = S-Arm Xfered Spindle Data - Metrology Tool from Next Tool Position to Spindle Position, Top-Left ISO View

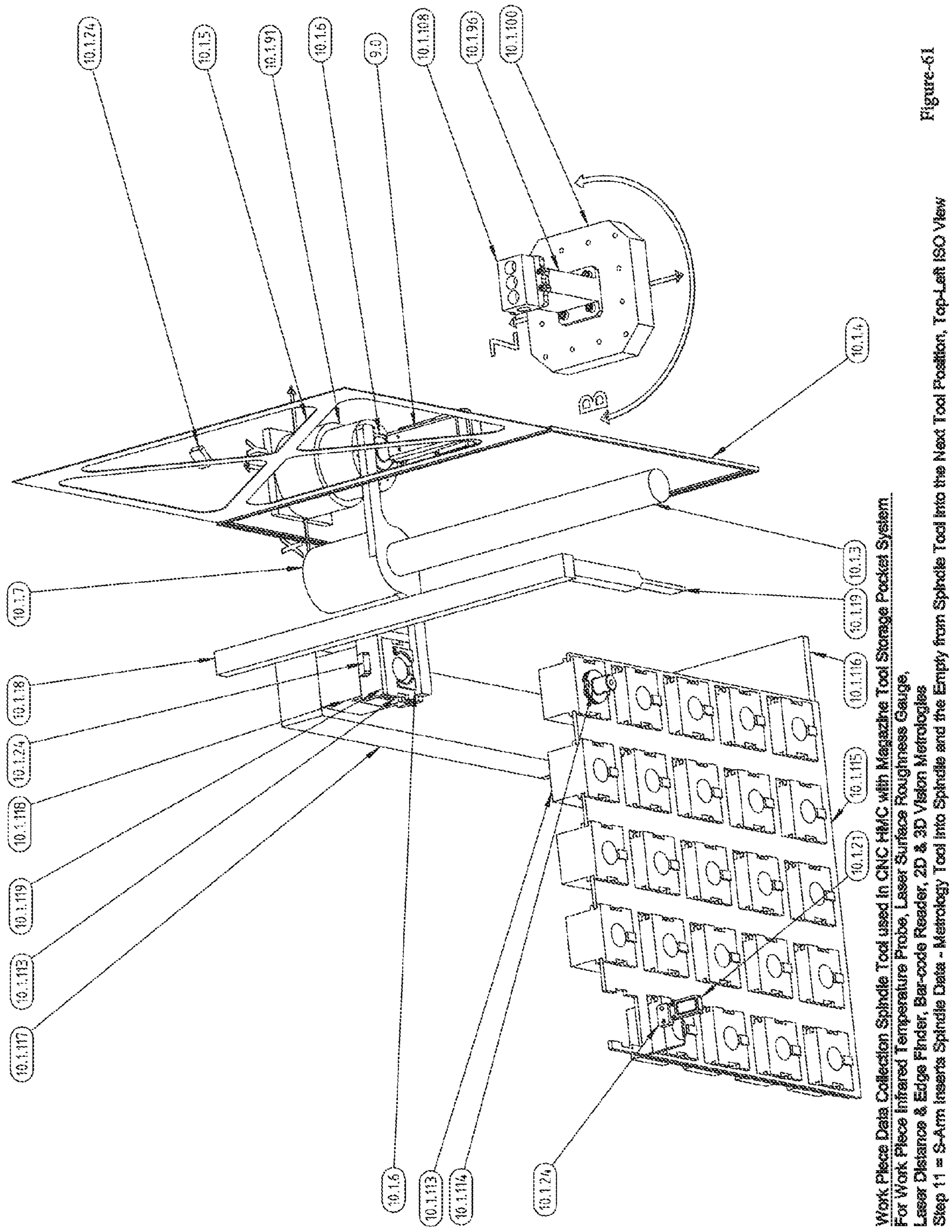

Figure-61

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 11 = S-Arm Inserts Spindle Data - Metrology Tool into Spindle and the Empty from Spindle Tool into the Next Tool Position, Top-Left ISO View

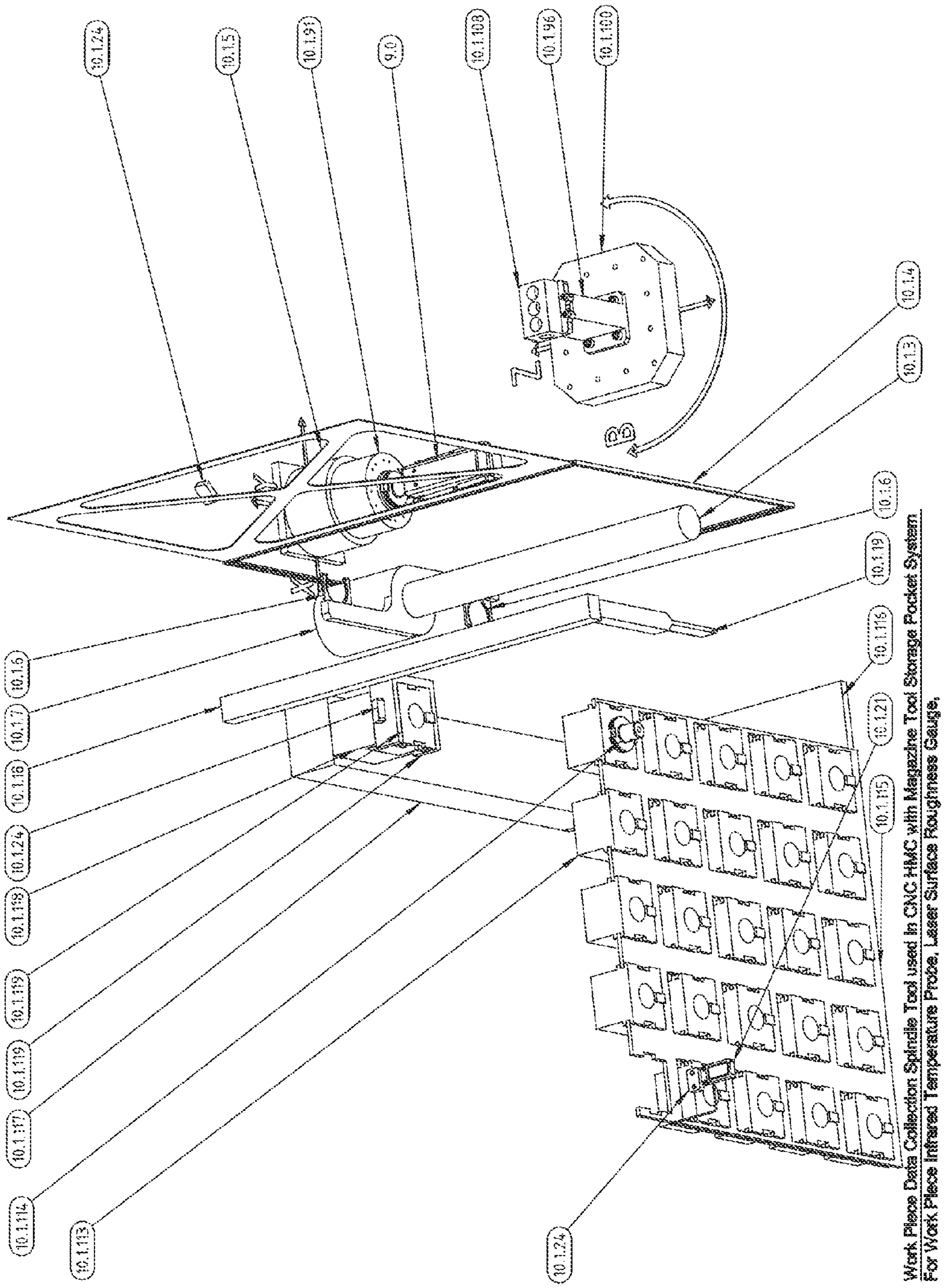

Figure-62

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 12 = S-Arm Releases Both Tools and S-Arm Rotates to Clear Position for the From Spindle Tool
In Next Tool Pivot Xfer Pocket and Spindle Data - Metrology Tool In Spindle, Top-Left ISO View

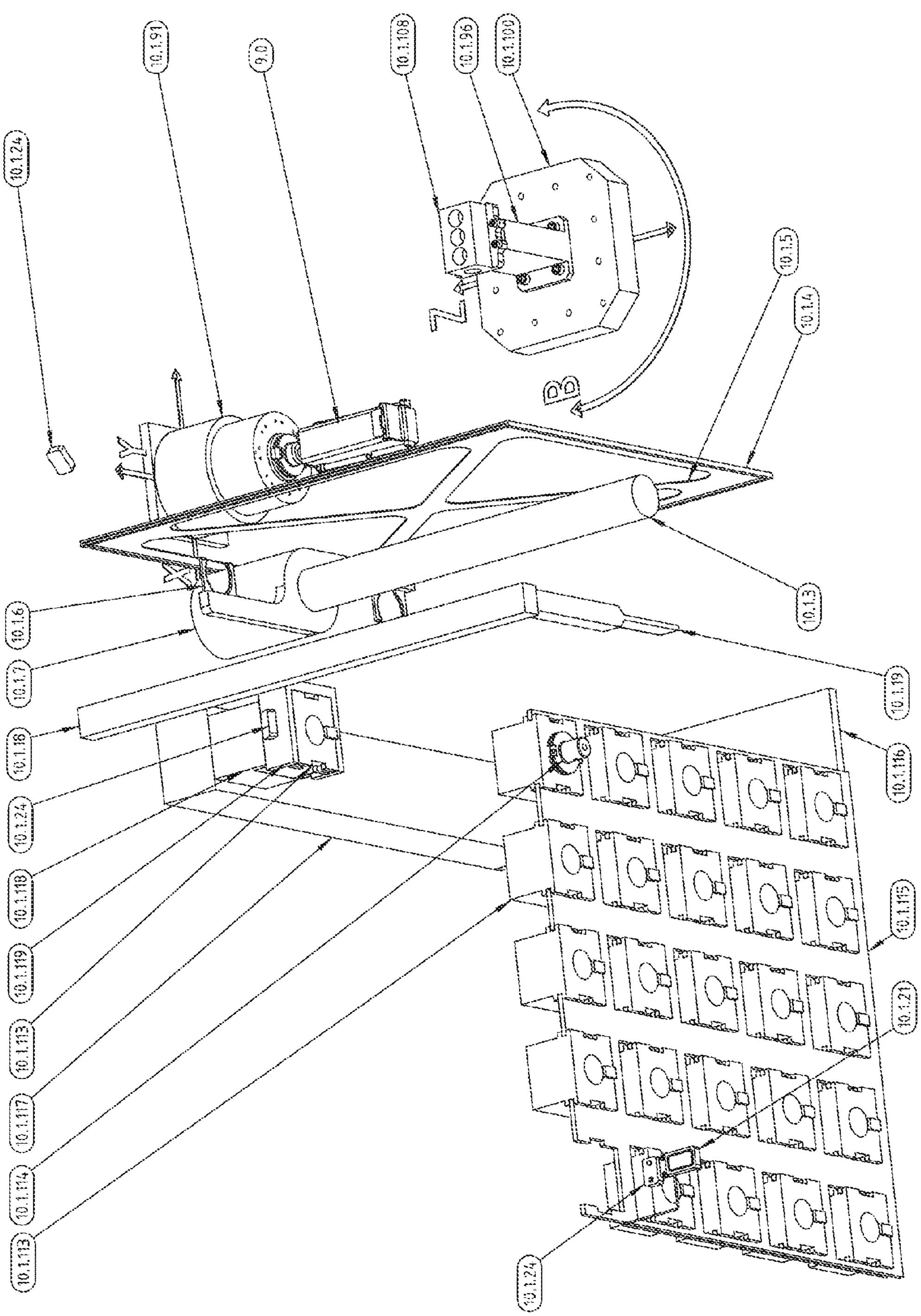

Work Piece Data Collection Spindle Tool used In CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 13 = Enclosure Closes and Spindle Rotates to Orient the Spindle Data - Metrology Tool In Spindle with IR Communications, Top-Left ISO View

Figure-63

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 14 = Spindle Rotates to Orient the Spindle Data - Metrology Tool in Spindle and Enclosure Opens, Top-Left ISO View Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 15 = S-Arm at Empty Next Tool Pocket Position and Spindle Data - Metrology Tool In Spindle Position, Top-Left ISO View Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 16 = S-Arm Removing from Empty Next Tool Pocket and Spindle Data - Metrology Tool from Spindle, Top-Left ISO View

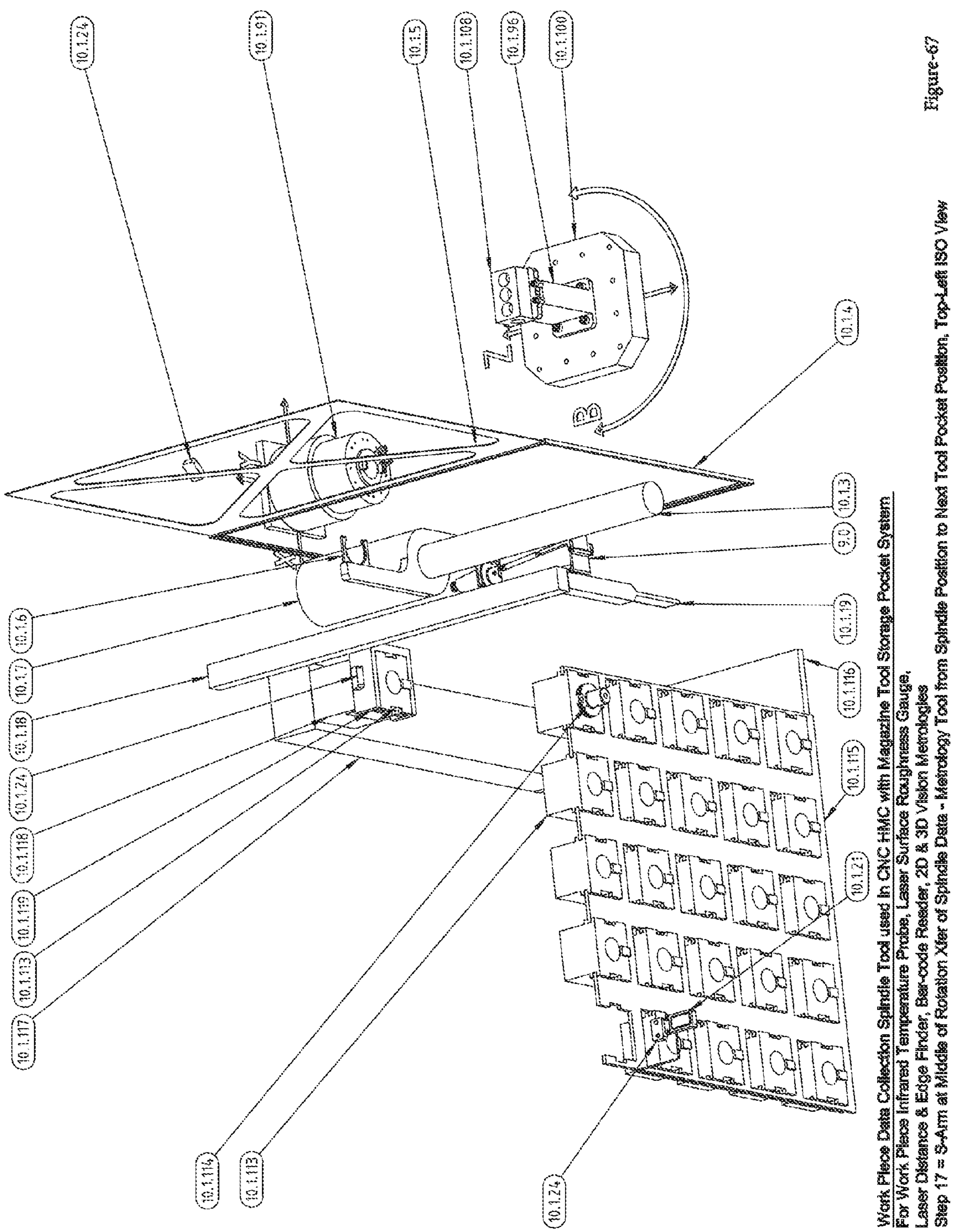

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 17 = S-Arm at Middle of Rotation Xfer of Spindle Data - Metrology Tool from Spindle Position to Next Tool Pocket Position, Top-Left ISO View

Figure-67

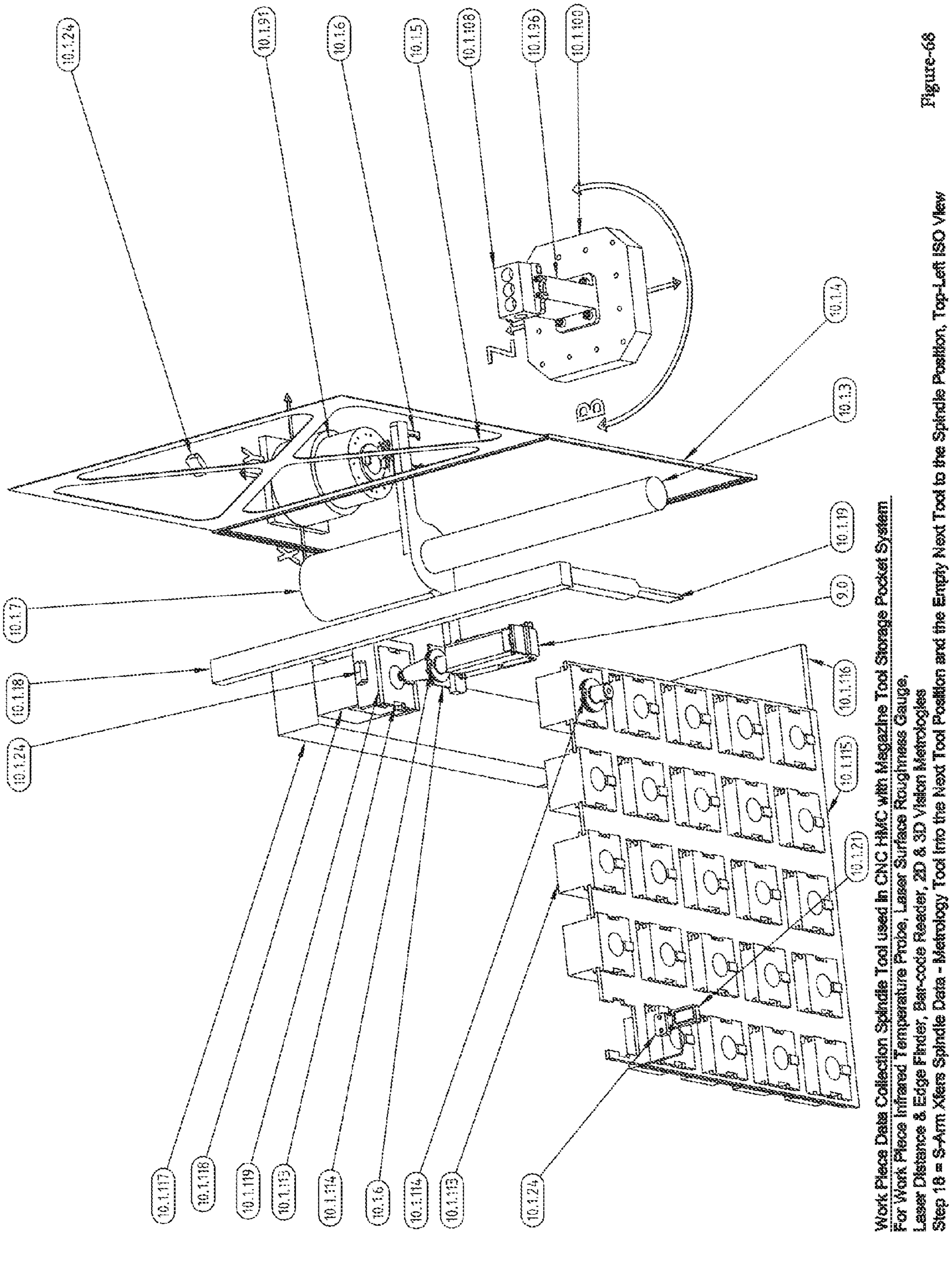

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 18 = S-Arm Xfers Spindle Data - Metrology Tool into the Next Tool Position and the Empty Next Tool to the Spindle Position, Top-Left ISO View

Figure-68

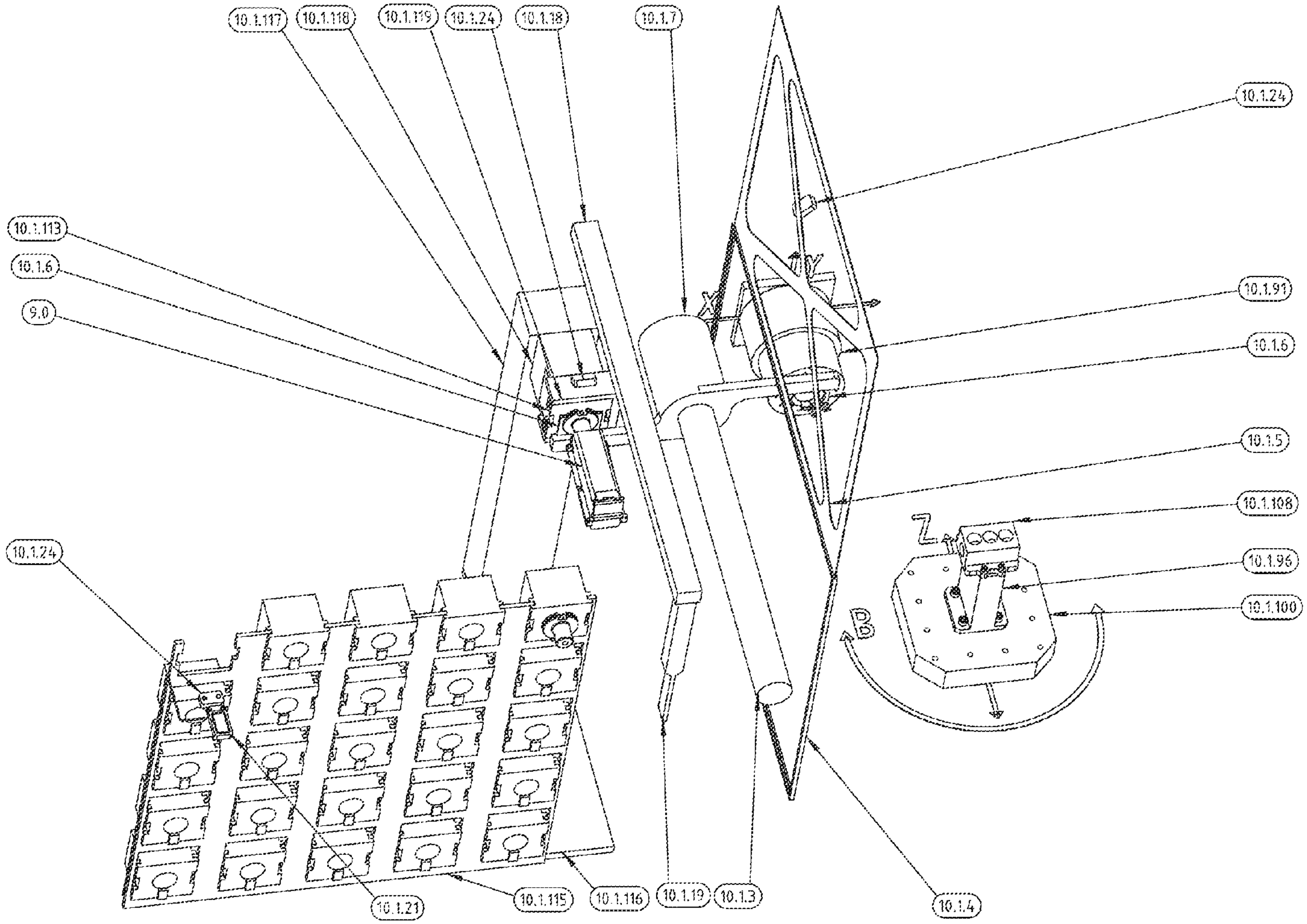

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 19 = S-Arm Inserts Spindle Data - Metrology Tool Into the Next Tool Position and the Empty Next Tool Into Spindle Position, Top-Left ISO View

Figure-69

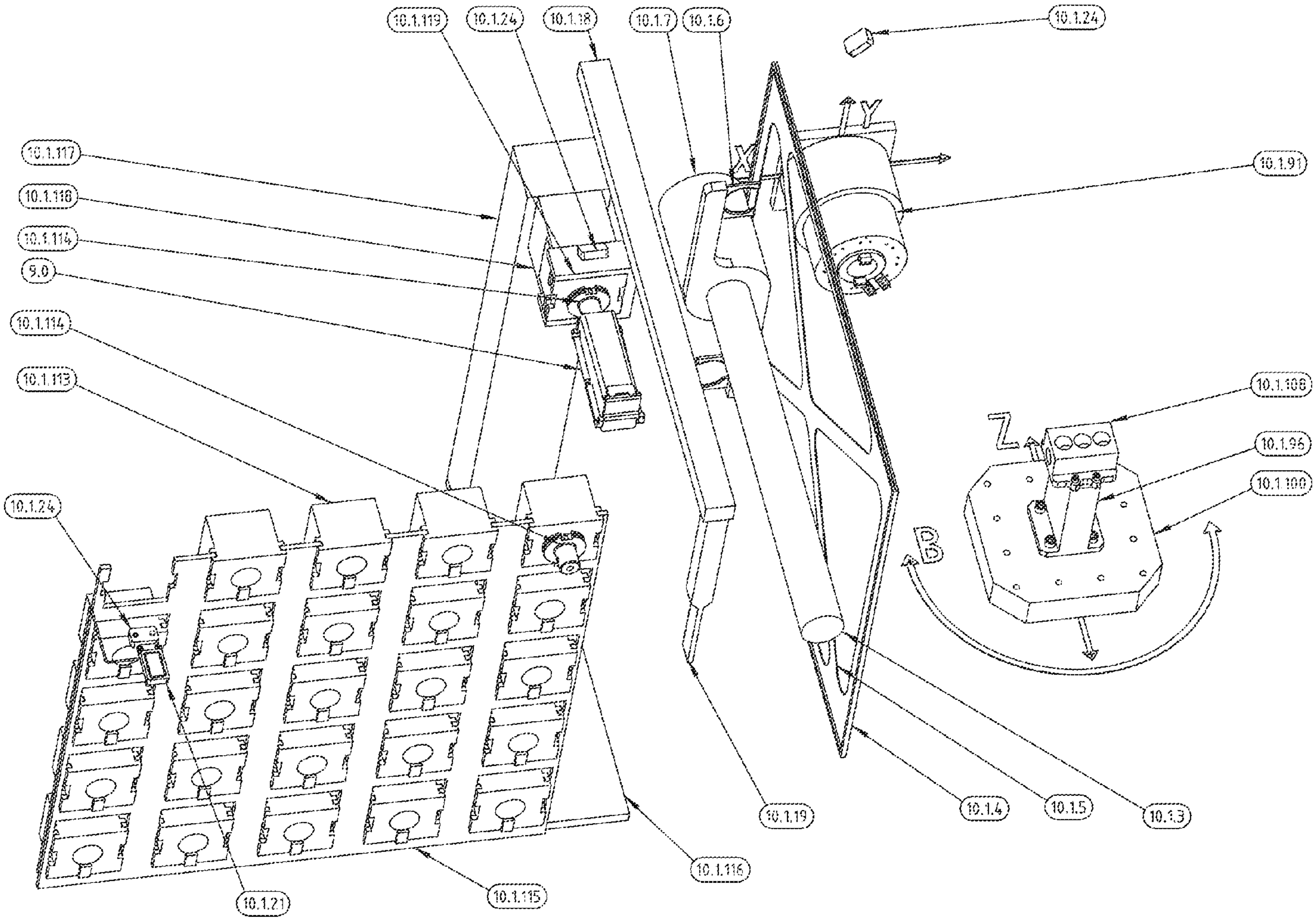

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 20 = S-Arm Releases Tools at Next Tool with IR Communications and Spindle Positions, S-Arm Rotates to Clear Position, and Enclosure Closes, Top-Left ISO View

Figure-70

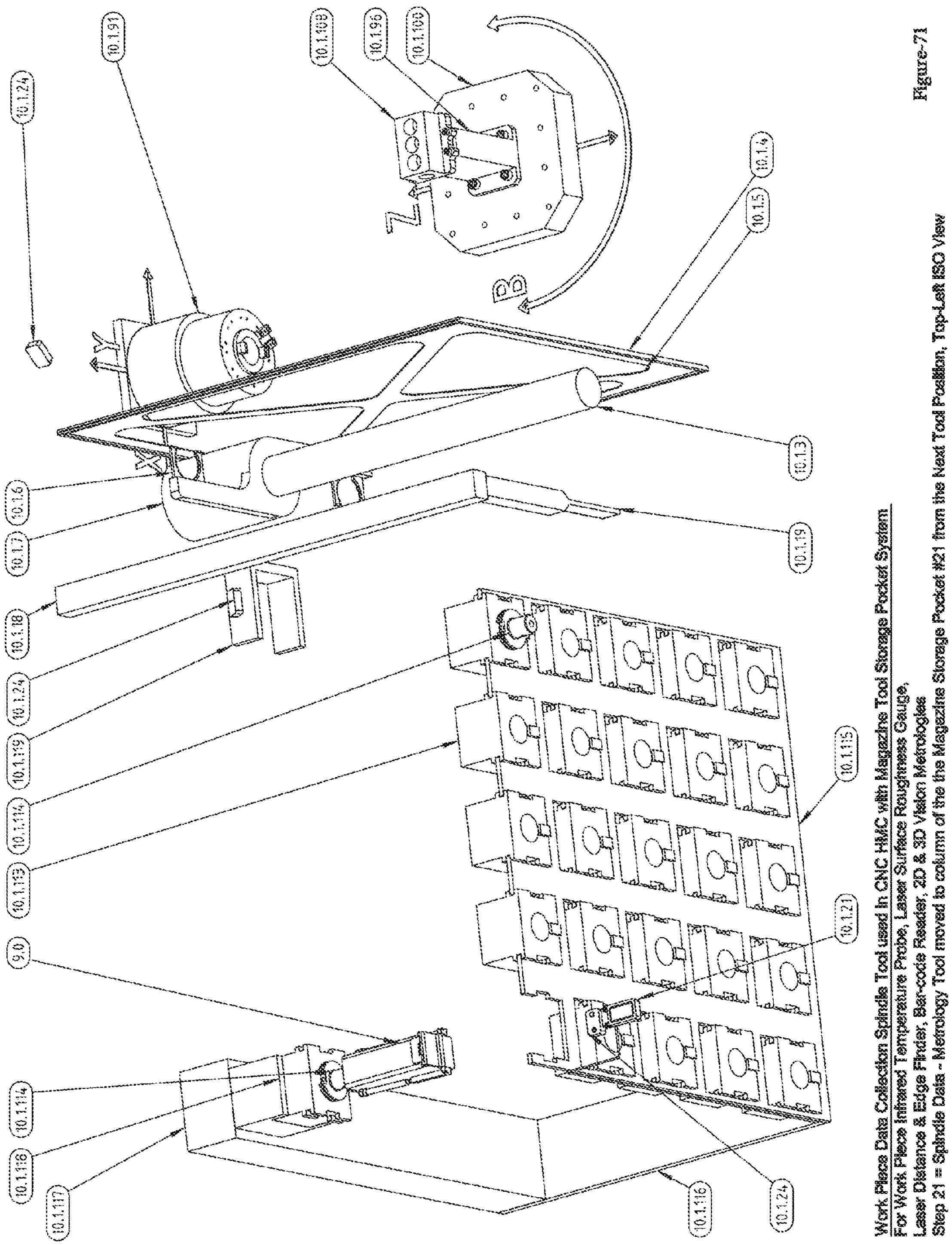

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 21 = Spindle Data - Metrology Tool moved to column of the the Magazine Storage Pocket #21 from the Next Tool Position, Top-Left ISO View

Figure-71

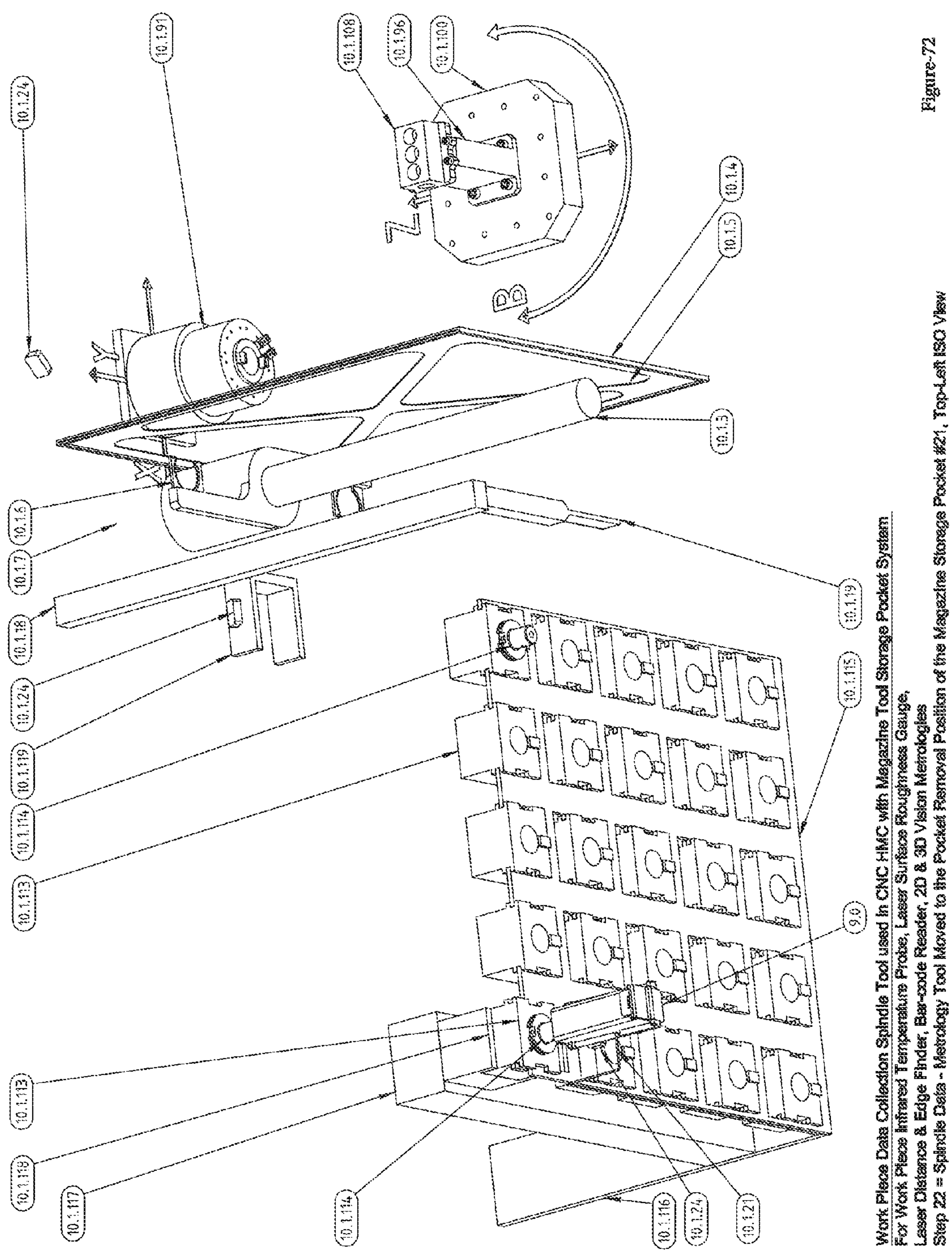

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 22 = Spindle Data - Metrology Tool Moved to the Pocket Removal Position of the Magazine Storage Pocket #21, Top-Left ISO View

Figure-72

Work Piece Data Collection Spindle Tool used in CNC HMC with Magazine Tool Storage Pocket System
For Work Piece Infrared Temperature Probe, Laser Surface Roughness Gauge,
Laser Distance & Edge Finder, Bar-code Reader, 2D & 3D Vision Metrologies
Step 23 = Spindle Data - Metrology Tool at the Storage Position of the Magazine Storage Pocket #21, Top-Left ISO View Work Piece Data Collection Spindle Tool used in CNC HMC with Magazine Storage Pocket System
For Work Piece Infrared Temperature Probe, Laser Surface Roughness Gauge,
Laser Distance & Edge Finder, Bar-code Reader, 2D & 3D Vision Metrologies
Step 24 = Powered and Data Collected from the Spindle Data - Metrology Tool in Magazine Storage Pocket #21, Top-Left ISO View

SPINDLE MOUNTABLE CAMERA SYSTEM

CROSS-REFERENCE TO RELATED APPLICATIONS

This application claims the benefit of U.S. Provisional Application No. 62/059,692, filed Oct. 3, 2014, the disclosure of which is hereby incorporated by reference in its entirety. This application is related to U.S. patent application Ser. No. 14/875,239, titled "MULTI-STYLUS ORBITAL ENGRAVING TOOL," filed concurrently herewith, and which is hereby incorporated by reference in its entirety. This application is related to U.S. patent application Ser. No. 14/875,284, titled "METHOD AND APPARATUS FOR ENCODING DATA ON A WORK PIECE," filed concurrently herewith, and which is hereby incorporated by reference in its entirety.

BACKGROUND

The identification means of work pieces utilized for its identification and traceability throughout the manufacturing process and product life cycle has become a necessity for the high productivity required by the increasingly competitive global manufacturing operations having multiple part variants within a products' family, using multiple work-piece part work holding fixtures, and at multiple manufacturing locations, being produced via sequential machining-manufacturing operations, and manufacturing processes. As the work-piece part's identification data is frequently required by the Manufacturer's Quality Plan, Industrial Standards Organizations, Regulatory Agencies, customer(s) specifications, etc., such as for patient specific replacement(s), the work-piece part's design revisions, the product's assembly of multiple work-piece parts having a combined tolerance stack-up, a work-piece part's/Article's certificate of origin, Department of Defense components, product recall campaigns, forensic identification, etc.

Traditional Direct Part Marking Via the Manual Direct Work-Piece Marking and Identification Via Impacting Stamps Manual work-piece direct part marking may not be desirable, and or suitable, for most modern manufacturing processes. Because it is susceptible to human error(s) for correctly marking the work-piece part/article, with errors negating the intended purpose of the work-piece parts'/articles' identification, and potentially injurious to personnel, via using a hammer to impact the hardened steel character forming stamp(s) onto the work piece's surface, to a semi-controlled depth, to indent and displace the surface material of the work-piece part/article to create a readable character and or symbol causing the displaced material to project above the previously smooth surface.

As a Secondary Operation Via the Semi-Automatic Direct Work-Piece Marking and Identification Semi-automatic work-piece direct part marking can be done as a secondary operation to the primary manufacturing process that may not be desirable, and or suitable, for manufacturing processes that requires integrity of the data because it is susceptible to error(s) for correctly marking the corresponding work-piece part/article with the required data, with errors negating the intended purpose of the work-piece part's/article's identification.

Automatic Point-of-Manufacture Work-Piece Marking and Identification

Automatic point-of-manufacture work-piece part/article engraving for marking/identification minimizes the opportunities for data error(s) and eliminates the potential for injuring personnel.

Automatic point-of-manufacture Work-piece Engraving is desirable at the point of manufacturing the work-piece part/article because of its being an integral operation of the production process to ensure the product's work-piece part/article marking and identification data integrity.

Automatic Work-piece Engraving is desirable to reduce the operator's potential for injury by eliminating the use of having to manually impact the hardened character forming stamp(s) against the work-piece part/article.

Existing Engraving Methods:

Currently, there are two common methodologies for Automatic point-of-manufacture direct work-piece marking spindle tooling used within Computer Numerically Controlled (CNC) Machine Tools, both having a different single point tool for either cutting material from the work-piece surface or impacting the work-piece part/article to indent and displace the work-piece part's/article's base material to create a readable character and or symbol:

Single Point Cutting Tools:

Cutting material from the work-piece surface using one rotating fluted cutting tool being plunged into the work-piece to a specific depth for the tool's cutting land(s) to remove the material from the work-piece surface while it's being moved parallel to the work-piece part's/article's surface by the motion of the CNC machine tool, to "write" the segments of a character via the removed material of the work piece's cutout profile cross section at specific location(s) and or along a path of lines and or curves on the work-piece part's surface to engrave a readable character and or symbol.

Single Point Impacting Tools:

Impacting via the "dot-peen" or scribing via the "Square-Dot" methodologies onto the work-piece part to indent and displace the work-piece material using a percussion motion to plunge a single point stylus into the work-piece to a depth to displace the material of the work piece's surface with the tool being lifted from the work-piece part's/article's surface as the tool is being moved parallel to the work-piece surface by the CNC machine tool to the next specific location(s) to "write" the character via the visually contiguous/adjacent pointed stylus at a specific location(s) or along a path of lines and or curves on the work-piece part's surface making a readable character and or symbol.

Multiple Point Impacting Tools:

Impacting the work-piece to indent and displace the work-piece material using a percussion motion to plunge multiple single point styluses into the work-piece to a depth to displace the material of the work piece's surface with the tool being lifted from the work-piece surface to "write" the next character via the visually contiguous/adjacent multiple pointed styluses impact "dots or dot-peen" at a specific location(s), or along a path of lines and or curves on the work-piece part's surface making a readable character and or symbol.

Disadvantages of the Existing Work-Piece Part Engraving Methods:

Both of the single stylus direct part marking processes described above have the same initial limitation for the Automatic point-of-manufacture work-piece direct part marking and identification operation, as that of being a time consuming operation for an expensive machine tool and manufacturing process via being constrained by their respective single point tooling for the work-piece part's surface material displacement.

The higher manufacturing costs and reduced tool life for the rotating Cutting tool method of engraving are comparable to the standard single point CNC cutting tools.

The Impacting pointed stylus direct part marking devices are more expensive and potentially damaging to the CNC machine tool's precision spindle bearings. While the smoothness of the work-piece surface is disrupted by the impacting of the pointed stylus potentially affecting its assembly to an adjacent work-piece part, while the displaced work-piece surface material can become a source of contamination in the application of the work-piece part(s) in its assembly.

Disadvantages of Marking Inks and Printed Labels:

The use of a "permanent" marking pens and inks to mark/identify the work-piece has multiple limitations such as:

A) The manual method of pen marking the readable character and or symbol to the corresponding work-piece part is subject to human operator error and the readers' interpretation of the data.

B) The marking ink may not adhere to the machined work-piece part's surface because of the machine tool's cutting fluid and or protective coating on the work-piece part.

C) The vibratory fluidic and or aggregate stone processes used to de-burr/remove the sharp edges of the machined work-piece part can also remove the marking ink from the work piece, requiring the remarking of the work-piece after its de-burring operation.

D) The agitated and or high pressure washing and rinsing processing operation(s) of the machined work-piece part can remove the marking ink from the work-piece part.

E) The corrosion resistant/preservative coating fluid used for storing and shipping the work-piece part can remove the marking ink from the work-piece part.

F) The marking ink may need to be removed from the work-piece part at the components' assembly point to prevent contamination of the assembled product.

G) The marking ink would not be readily detectable on the work-piece part beneath the assembled components' painted surface.

H) The initial marking ink's information prior to the machining operation may be critical to the documentation required for the traceability of the work-piece part and its data that may need to be captured before its removal from the work-piece part.

I) The marking ink's information after the machining operation may be critical to the documentation required for the traceability of the work-piece part and its data that may need to be captured before its removal from the work-piece part.

The use of an adhesive backed printed label to mark/identify the work-piece has multiple limitations such as:

A) The manual application of the correct adhesive backed printed label to the corresponding work-piece part is subject to human operator error.

B) The adhesive backed printed label may not adhere to the machined work-piece part because of the machine tool's cutting fluid on the work-piece part.

C) The vibratory fluidic and or aggregate stone processes used to de-burr/remove the sharp edges of the machined work-piece part can also remove the adhesive backed printed label from the work-piece part.

D) The agitated and or high pressure washing and rinsing processing operation(s) of the machined work-piece part can also remove the adhesive backed printed label from the work-piece part.

E) The corrosion resistant/preservative coating fluid used for storing and shipping the work-piece part can remove the adhesive backed printed label from the work-piece part.

F) The adhesive backed printed label may need to be removed from the work-piece part for the assembly of the components as required to prevent contamination of the assembled product part.

G) The adhesive backed printed label may need to be removed from the work-piece part for the assembly of the components as required for the proper fit-up with the adjacent components.

H) The adhesive backed printed label may need to be removed from the work-piece part after the components' assembly to facilitate painting.

I) The adhesive backed printed label would not be readily detectable beneath the surface of the components' painted surface.

J) The initial printed label's information prior to the machining operation may be critical to the documentation required for the traceability of the work-piece part and its data that may need to be captured before its removal from the work-piece part.

K) The printed label's information after the machining operation may be critical to the documentation required for the traceability of the work-piece part and its data that may need to be captured before its removal from the work-piece part.

Considerations for the productive machining of work piece parts and the increased necessity for the automatic point-of-manufacture Direct Work-piece Marking and Identification:

The automatic point-of-manufacture direct work-piece part marking operation is an additional machining operation that requires its minimization to reduce the CNC machine's overall cycle time to a minimum, as the cost basis for CNC Machining is a combination of cost effective equipment utilization, the quality, and the quantity of work-piece parts/articles being produced in the shortest time possible.

A. The higher quantity of work-piece parts increases the opportunities for manual work-piece part marking operation errors and operator injuries using impacting stamps.

B. The higher productivity of the high speed/high production output advanced machine tools' increases the opportunities for manufacturing defects via increasing the quantity of defective work-piece parts that could be produced in a shorter time span.

C. The higher productivity of machine tools increases the quantity of work-piece parts that need to be identified via the work-piece part marking operation of the manufacturing process.

D. The higher productivity of the high speed machining for advanced machine tools can be attributed to a combination of advances in (a) cutting tool technologies (materials, designs, & coatings) to facilitate rough machining in only one pass for the maximum work-piece material stock removal and then using the same cutting tool for the finishing pass for a "mirror like" surface finish or one pass for the maximum work-piece material stock removal and simultaneously producing a "mirror like" surface finish, (b) the higher speed computer processors, digital inputs, and outputs directly increasing the speed of the machine tools' driven axes and spindles, (c) the improved machine tool designs' utilization of full-time pressure lubricated recirculating bearings ways, ceramic elements, closed loop liquid temperature management, and thermal compensating algorithms to manage its heat generating mechanisms, (d) the machine tools' NC-Programming productivity simulation software and "chip thinning" machining methodologies being utilized to increase cutting feed rates within a tool's operational machining path, etc.

E. The high speed machining of multiple work-piece parts causes heating of the work-piece part that in turn causes dimensional changes from work-piece to work-piece over a period of time and or within a group of multiple work-piece parts being machined via the same machining cycle.

F. The machining of work pieces, especially at high speed, causes heating of the work-piece that causes dimensional changes from work-piece to work-piece over a period of time being caused by changing ambient and work-piece temperatures and the stress-relief/normalization caused by the removal of the raw work-piece material. This can necessitate the Coordinate Measurement Machine's dimensional inspection of the machined work-piece part being delayed, 22 hours or more for some applications.

G. The higher productivity of high speed machining increases the opportunities for manufacturing defects via increasing the thermal dimensional changes of the finished work pieces. These errors are corrected by the Coordinate Measurement Machine's dimensional inspection of the work-piece part(s) having been machined at a specific time and fixture location(s), then using the corresponding work piece's CMM inspection data for correcting the corresponding machine tools' work-piece part machining NC-Program as required. The improved high speed machining of aluminum work-piece parts has resulted in the machining cycle time for 4 parts being machined in one operation on 2 sides being reduced from 97 minutes when the manufacturing operations were developed in the 1990s, to 9:36 minutes in 2013 via the NC-Program O0602.

H. The dimensional changes of the finished work-piece part caused by thermal changes during machining can be combined with those caused by the stress-relief/normalization of the raw work-piece material that are then corrected by the Coordinate Measurement Machine's dimensional inspection of the work-piece part having been machined at a specific time and fixture location(s), then using the corresponding work piece's CMM inspection data for correcting the corresponding machine tools' work-piece part machining NC-Program as required. The improved high speed 6 sided machining of one cast iron work-piece part "317" has resulted in the machining cycle time being reduced from 390 minutes being done via 4 machining operations on a 4 work-piece part locating fixtures on 3 different CNC machines when the manufacturing process was developed in the 1990s, to 112 minutes on 2 work-piece part locating fixtures on 1 CNC machine in 2011 via the NC-Programs O3170, O3171, and O3173.

I. The specific work-piece part being sequentially machined at specific location(s) of a high density multiple position work-piece holding fixture need to be uniquely and correctly identified to facilitate that work-piece parts' correct sequential transfer to the next subsequent machining location(s) of the fixture and for the appropriate and corresponding corrective action(s).

J. The multiple sources and suppliers for the incoming raw work-piece parts to be machined increases the opportunities for manufacturing defects via the increasing variability of the raw work-piece parts coming from multiple casting patterns and or suppliers such as those having a specific date stamp identification for a specific group of raw work-piece parts and or having various suppliers for those work-piece parts.

K. Multiple work-piece parts having been potentially machined at numerous locations of a multiple position work-piece holding fixture, having the variables as in paragraph J above, will need to be uniquely and correctly identified to facilitate the corresponding work-piece parts' correlation to the specific machine tool(s) used for machining, the cutting tool(s) that were used, and the specific location(s) of the work holding fixture(s) for the corresponding corrective action(s) that may be required for that specific work-piece part.

L. The cell of multiple automatic machine tools, which includes the transferring of multiple pre-loaded work pieces pallets, and the machine tools' specific pre-installed initial and sometimes multiple backup tools that are automatically selected after the initial tools' specific operational usage limit is reached to facilitate automated manufacturing operations, relies on the tracking and serialization data of the work-piece parts for the traceability of defects and for the corresponding corrective action(s).

M. The automatic point-of-manufacture direct work-piece part marking/engraving operation within the machine tool becomes a portion of the machine's cycle time, increasing the machine's overall cycle time, and increases the machining cost of the work-piece part/article.

However, the total manufacturing costs for the high productivity sequential machining of multiple work-piece parts will increase when the shorter cycle time of not marking the work-piece parts causes the erroneous sequential transferring of work-piece parts between the sequential machining operations and the increased difficulty for the root cause defect analysis and the corresponding corrective action required for eliminating defective and out of tolerance work pieces. The sequential machining of multiple work-piece parts, correctly via multiple operations, can be dependent upon using the same manual transfer sequence for the work-piece parts from one of the previous sequential work-piece parts' fixture location to the next sequential work-piece parts' fixture location for the next machining/manufacturing operation.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A spindle mountable camera system connectable to a CNC machine for work piece inspection and identification is disclosed. The disclosed technology facilitates real-time point-of-use in-process collection and transfer of data to and from a work piece to improve its manufacturability and traceability. The camera system includes a mounting stem connectable to a CNC machine tool holder. The mounting stem includes an air passage connectable to an air supply of the CNC machine. An enclosure is attached to the mounting stem and includes a camera opening. A camera module is disposed within the enclosure. In some embodiments, an air supply line is connected between the mounting stem and the camera module. An enclosure cover is pivotably mounted to the enclosure proximate the camera opening. One or more pneumatic cylinders are connected to the air passages and extend between the enclosure and the enclosure cover to move the enclosure cover between an open position and a closed position.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 1 basic/multi-functional Spindle work piece data collection vision inspection lens closed.

FIG. 2 basic/multi-functional Spindle work piece data collection spindle vision inspection lens open.

FIG. 3 basic/multi-functional Spindle work piece data collection vision inspection external lens open—external components exploded view.

FIG. 4 basic/multi-functional Spindle work piece data collection vision lens open—internal components cut-away view.

FIG. 5 basic/multi-functional Spindle work piece data collection internal modules and devices.

FIG. 6 basic/multi-functional Spindle work piece data collection internal modules and devices exploded view.

FIG. 7 basic/multi-functional Spindle work piece data collection induction Recharger and electrical contacts.

FIG. 8 basic/multi-functional Spindle work piece data collection induction Recharger top and section views.

FIG. 9 basic/multi-functional Spindle work piece data collection induction Recharger side and section views.

FIG. 10 basic/multi-functional Spindle work piece data collection communication-electrical interface options.

FIG. 11 basic/multi-functional Spindle work piece data collection electrical contacts and or Recharger.

FIG. 12 basic/multi-functional Spindle work piece data collection electrical contact Recharger top and section views.

FIG. 13 basic/multi-functional Spindle work piece data collection electrical contact Recharger side and section views.

FIG. 14 basic/multi-functional Spindle work piece data collection spindle vision bill of material.

For the advanced multi-functionality Spindle Tooling for Work piece verification, data collection, utilization, and exchange as shown by:

FIG. 15 advanced multi-functionality Spindle work piece metrology data collection spindle vision lens closed.

FIG. 16 advanced multi-functionality Spindle work piece metrology data collection spindle vision lens open.

FIG. 17 advanced multi-functionality Spindle work piece metrology data collection vision inspection external lens open—external components exploded view.

FIG. 18 advanced multi-functionality Spindle work piece metrology data collection vision lens open-internal components cut-away view.

FIG. 19 advanced multi-functionality Spindle work piece metrology data collection internal modules and devices.

FIG. 20 advanced multi-functionality Spindle work piece metrology data collection internal modules and devices exploded view.

FIG. 21 advanced multi-functionality Spindle work piece metrology data collection induction Recharger and electrical contacts.

FIG. 22 advanced multi-functionality Spindle work piece metrology data collection induction Recharger top and section views.

FIG. 23 advanced multi-functionality Spindle work piece metrology data collection induction Recharger side and section views.

FIG. 24 advanced multi-functionality Spindle work piece metrology data collection communication-electrical interface options.

FIG. 25 advanced multi-functionality Spindle work piece metrology data collection electrical contacts and or Recharger.

FIG. 26 advanced multi-functionality Spindle work piece metrology data collection electrical contact Recharger top and section views.

FIG. 27 advanced multi-functionality Spindle work piece metrology data collection electrical contact Recharger side and section views.

FIG. 28 advanced multi-functionality Spindle work piece metrology data collection spindle vision bill of material.

FIG. 29 through FIG. 50 the spindle mountable camera inspection/metrology system 9.0 being utilized in a typical 4 axis CNC machine tool having a multiple pockets chain style tool storage system for the automatic tool changer with the camera inspection/metrology system being in its respective tool storage pocket.

FIG. 30 the spindle mountable camera inspection/metrology system 9.0 being removed from its tool storage pocket and positioned in the dual pivoting rotating tool exchange transfer device 10.1.14.

FIG. 31 the spindle mountable camera inspection/metrology system 9.0 being rotationally pivoted in the dual pivoting rotating tool exchange transfer device 10.1.14

FIG. 32 the spindle mountable camera inspection/metrology system 9.0 being at its rotational transfer mid-position for being transferred in the dual pivoting rotating tool exchange transfer device 10.1.14 to the spindle load-unload rotating transfer device 10.1.7.

FIG. 33 the spindle mountable camera inspection/metrology system 9.0 being at its exchange position for being transferred from the dual pivoting rotating tool exchange transfer device 10.1.14 to the spindle load-unload rotating transfer device 10.1.7.

FIG. 34 the spindle mountable camera inspection/metrology system 9.0 being recharged and/or communicated with via its appropriate coupling device 10.1.25 while at the transfer exchange position before its subsequent transfer from the dual pivoting rotating tool exchange transfer device 10.1.14 to the spindle load-unload rotating transfer device 10.1.7.

FIG. 35 the spindle mountable camera inspection/metrology system 9.0 having been recharged and/or communicated with via its appropriate coupling device 10.1.25 while at the transfer exchange position before its subsequent transfer from the dual pivoting rotating tool exchange transfer device 10.1.14 to the spindle load-unload rotating transfer device 10.1.7 in its home/clearance position with the machine tool's machining enclosure door 10.1.5 being opened for the tools' subsequent simultaneous loading and unloading of the machine tool's spindle.

FIG. 36 the spindle mountable camera inspection/metrology system 9.0 being transferred at the exchange position from the dual pivoting rotating tool exchange transfer device 10.1.14 to the spindle load-unload rotating transfer device 10.1.7.

FIG. 37 the spindle mountable camera inspection/metrology system 9.0 being removed from the dual pivoting rotating tool exchange transfer device 10.1.14 via the spindle load-unload rotating transfer device 10.1.7 while it is simultaneously removing the spindle's tool 10.1.1 from the spindle 101.91.

FIG. 38 the spindle mountable camera inspection/metrology system 9.0 at its midpoint of being exchanged via the spindle load-unload rotating transfer device 10.1.7 simultaneously with the spindle's tool 10.1.1 having been removed from the spindle 101.91.

FIG. 39 the spindle mountable camera inspection/metrology system 9.0 at its spindle 101.91 load position via the spindle load-unload rotating transfer device 10.1.7 having simultaneously moved the spindle's tool 10.1.1 to its transfer position into the dual pivoting rotating tool exchange transfer device 10.1.14.

FIG. 40 the spindle mountable camera inspection/metrology system 9.0 is loaded into the spindle 101.91 via the spindle load-unload rotating transfer device 10.1.7 having simultaneously transferred/loaded the spindle's tool 10.1.1 to into the dual pivoting rotating tool exchange transfer device 10.1.14.

FIG. 41 the spindle mountable camera inspection/metrology system 9.0 is simultaneously secured in the spindle 101.91 and tool 10.1.1 is secured in the dual pivoting rotating tool exchange transfer device 10.1.14 for the load-unload rotating transfer device 10.1.7 to move to its home/clearance position.

FIG. 42 having the spindle mountable camera inspection/metrology system 9.0 is secured in the spindle 101.91 and the tool exchange access door is closed for the machine tool to operate as required and having activated the spindle mountable camera inspection/metrology system rotated via the spindle as may be required for its activation and/or orientation and it's being repositioned utilizing the axes XYZ and B and any other axis as may be required for the inspection of work piece 101.108 via an external control system operably connected to the machine tool communicating via an IR transmitter and receiver 10.1.24 within the machine tools enclosure and/or wirelessly and/or any other means as required.

FIG. 43 through FIG. 49 the spindle mountable camera inspection/metrology system 9.0 is sequentially transferred to the exchange position for the dual pivoting rotating tool exchange transfer device 10.1.14 for being recharged and/or communicated with via its appropriate coupling device 10.1.25.

FIG. 50 the spindle mountable camera inspection/metrology system having been recharged and/or communicated with via its appropriate coupling device 10.1.25 while at the exchange position, before its subsequent transfer from the dual pivoting rotating tool exchange transfer device 10.1.14 and its subsequent return to the multiple pockets chain style tool storage system's 1.1.13 respective tool storage pocket.

FIG. 51 through FIG. 74 shows the spindle mountable camera inspection/metrology system 9.0 being utilized in a typical 4 axis CNC machine tool having a multiple pockets magazine style tool storage system for the automatic tool changer with the camera inspection/metrology system being in its respective tool storage pocket.

FIG. 51 the spindle mountable camera inspection/metrology system 9.0 retained in the tool storage pocket 10.1.113 that is retained at its tool storage pocket and multiple pocket magazine 1.1.115 storage position while being recharged and/or communicated with via its appropriate coupling device 10.1.24 and/or 10.1.21.

FIG. 52 the spindle mountable camera inspection/metrology system 9.0 retained in the tool storage pocket 10.1.113 while it is being secured at its tool storage position via the tool storage pocket gripper 10.1.118 4 its subsequent removal from the multiple pocket storage magazine 1.1.115.

FIG. 53 the spindle mountable camera inspection/metrology system 9.0 retained in the tool storage pocket 10.1.113 while it is being removed from its tool pocket magazine storage position via the tool storage pocket gripper 10.1.118 after its having been recharged and/or communicated with via its appropriate coupling device 10.1.24 and/or 10.1.21.

FIG. 54 the spindle mountable camera inspection/metrology system 9.0 is transferred while in the tool storage pocket 10.1.113 via is being removed from its tool pocket magazine storage position via the tool storage pocket gripper 10.1.118.

FIG. 55 the spindle mountable camera inspection/metrology system 9.0 is transferred while in the tool storage pocket 10.1.113 via is being repositioned via the tool storage pocket gripper 10.1.118 into the stationary tool exchange transfer device 10.1.118.

FIG. 56 the spindle mountable camera inspection/metrology system 9.0 having been retained in the stationary tool exchange transfer device 10.1.118, having the spindle load-unload rotating transfer device 10.1.7 in its home/clearance position with the machining enclosure door 10.1.5 being opened for the tools' subsequent simultaneous loading and unloading, if required, the machine tool's spindle 10.1.91.

FIG. 57 the spindle mountable camera inspection/metrology system 9.0 being transferred from stationary tool exchange transfer device 10.1.18 to the spindle load-unload rotating transfer device 10.1.7.

FIG. 58 the spindle mountable camera inspection/metrology system 9.0 being removed from the stationary tool exchange transfer device 10.1.18 via the spindle load-unload rotating transfer device 10.1.7, and, if required, while it is simultaneously removing the spindle's tool from the spindle 101.91.

FIG. 59 the spindle mountable camera inspection/metrology system 9.0 at its midpoint of being exchanged via the spindle load-unload rotating transfer device 10.1.7, and, if required, simultaneously with the spindle's tool having been removed from the spindle 101.91.

FIG. 60 the spindle mountable camera inspection/metrology system 9.0 at its spindle 101.91 load position via the spindle load-unload rotating transfer device 10.1.7, and having, if required, simultaneously moved the spindle's tool to its transfer position into the stationary tool exchange transfer device 10.1.18.

FIG. 61 the spindle mountable camera inspection/metrology system 9.0 is loaded into the spindle 101.91 via the spindle load-unload rotating transfer device 10.1.7 having, if required, simultaneously transferred the spindle's tool to into the stationary tool exchange transfer device 10.1.18.

FIG. 62 the spindle mountable camera inspection/metrology system 9.0 is secured in the spindle 101.91, and, if required, the spindle's removed tool is secured simultaneously in the dual pivoting rotating tool exchange transfer device 10.1.14, for having the load-unload rotating transfer device 10.1.7 to move to its home/clearance position.

FIG. 63 having the spindle mountable camera inspection/metrology system 9.0 is secured in the spindle 101.91 and the tool exchange access door is closed for the machine tool to operate as required and having activated the spindle mountable camera inspection/metrology system rotated via the spindle as may be required for its activation and/or orientation and it's being repositioned utilizing the axes XYZ and B and any other axis as may be required for the inspection of work piece 101.108 via an external control system operably connected to the machine tool communicating via an IR transmitter and receiver 10.1.24 within the machine tools enclosure and/or wirelessly and/or any other means as required.

FIG. 64 through FIG. 73 the spindle mountable camera inspection/metrology system 9.0 is sequentially transferred to, and from the exchange position for the stationary tool exchange transfer device 10.1.18, and subsequently returned into its tool storage position in the multiple tooling pockets storage magazine 10.1.115.

FIG. 74 the spindle mountable camera inspection/metrology system 9.0 having been returned into its tool storage position for being recharged and/or communicated with via its appropriate coupling device 10.1.24 and/or 10.1.21.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Spindle Mountable Camera System:

With reference to FIGS. 1-14, a spindle mountable camera system according to a representative embodiment is disclosed. The spindle mountable camera system is connectable to the spindle of a CNC machine for work piece inspection and identification. The camera system includes a mounting stem 9.11.1 connectable to a CNC machine tool holder 9.90, which can be connected to the spindle of a CNC machine (not shown). When the camera system is mounted to the spindle of the CNC machine, the CNC machine can move the camera system around a work center to inspect work piece(s) mounted therein.

The camera system includes an enclosure 9.10 including a proximal end portion attached to the mounting stem 9.11.1 and a distal end portion including a camera opening (see e.g., FIG. 4 at 9.7). A camera module 9.20 is disposed within the distal end portion of the enclosure 9.10. In some embodiments, a light ring 9.20.1 is disposed around the camera module 9.20.

The mounting stem 9.11.1 includes an air passage (see e.g., Section A-A, FIG. 8) connectable to an air supply of the CNC machine when the tool holder 9.90 is attached to the spindle. In some embodiments, an air supply line 9.38 is connected between the mounting stem 9.11.1 and the camera module 9.20. The air supply line 9.38 supplies air from the CNC machine's air supply system to cool the camera module 9.20.

An enclosure cover 9.10.2 is pivotably mounted to the enclosure 9.10 proximate the camera opening and moveable between an open position (FIG. 2) wherein the camera opening is uncovered and a closed position (FIG. 1) wherein the camera opening is covered. The enclosure 9.10 and enclosure cover 9.10.2 protect the camera module 9.20 and other components (e.g., sensors) from cutting fluid and other debris associated with machining a work piece. One or more (e.g., a pair) pneumatic cylinders 9.24 are connected to the air passages and extend between the enclosure 9.10 and the enclosure cover 9.10.2 to move the enclosure cover 9.10.2 between the open position and the closed position. In some embodiments, an air switch 9.16 is interconnected between the one or more air passages and the one or more pneumatic cylinders 9.24 and is operative to selectively control an air flow to the one or more pneumatic cylinders 9.24. Although the embodiments are described herein with respect to pneumatic cylinders 9.24, other suitable actuators can be used.

In some embodiments, the camera system includes one or more additional sensors, such as a laser bar code reader 9.99 disposed within the distal portion of the enclosure 9.10 adjacent the camera opening. In some embodiments, the camera system also includes a plurality of batteries 9.50 disposed in the enclosure 9.10 and connected to the camera module 9.20, light ring 9.20.1, and/or additional sensors, such as laser bar code reader 9.99.

FIG. 15 shows the spindle mountable camera inspection/metrology system being configured as having multiple sensor data acquisition systems for the data acquisition/inspection of multiple features and/or variables of the work piece while it is located in the machining position of the machine tool.

FIG. 16 shows the spindle mountable camera inspection/metrology system of FIG. 15 having the enclosure's actuated door in its open position for the multiple data acquisition sensors to inspect the workpiece as required for the work piece's surface inspection and analysis via a standard laser surface metrology sensor as shown by device 9.115 or surface finish gauge or equivalent having an air blow-off knife as shown by device 9.1164 optionally drying/cleaning the area of the work piece surface prior to its inspection, a standard work piece noncontact infrared temperature sensor as shown by device 9.117 or by a work piece contacting thermocouple probe or equivalent, a standard laser bar code reader as required for high resolution near field data acquisition and/or long-distance data acquisition of FIG. 15.

Figure 1:
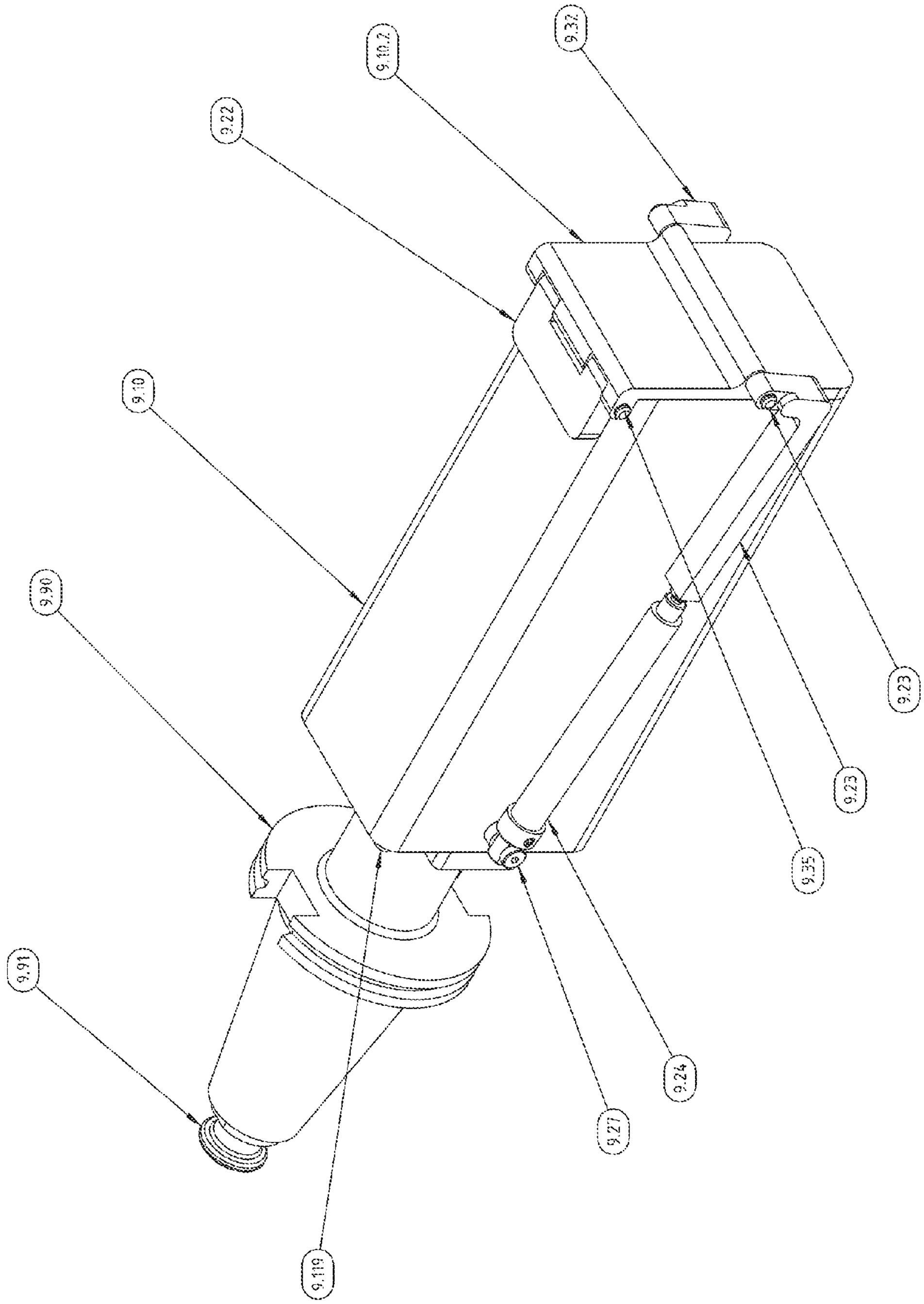
Figure 2:
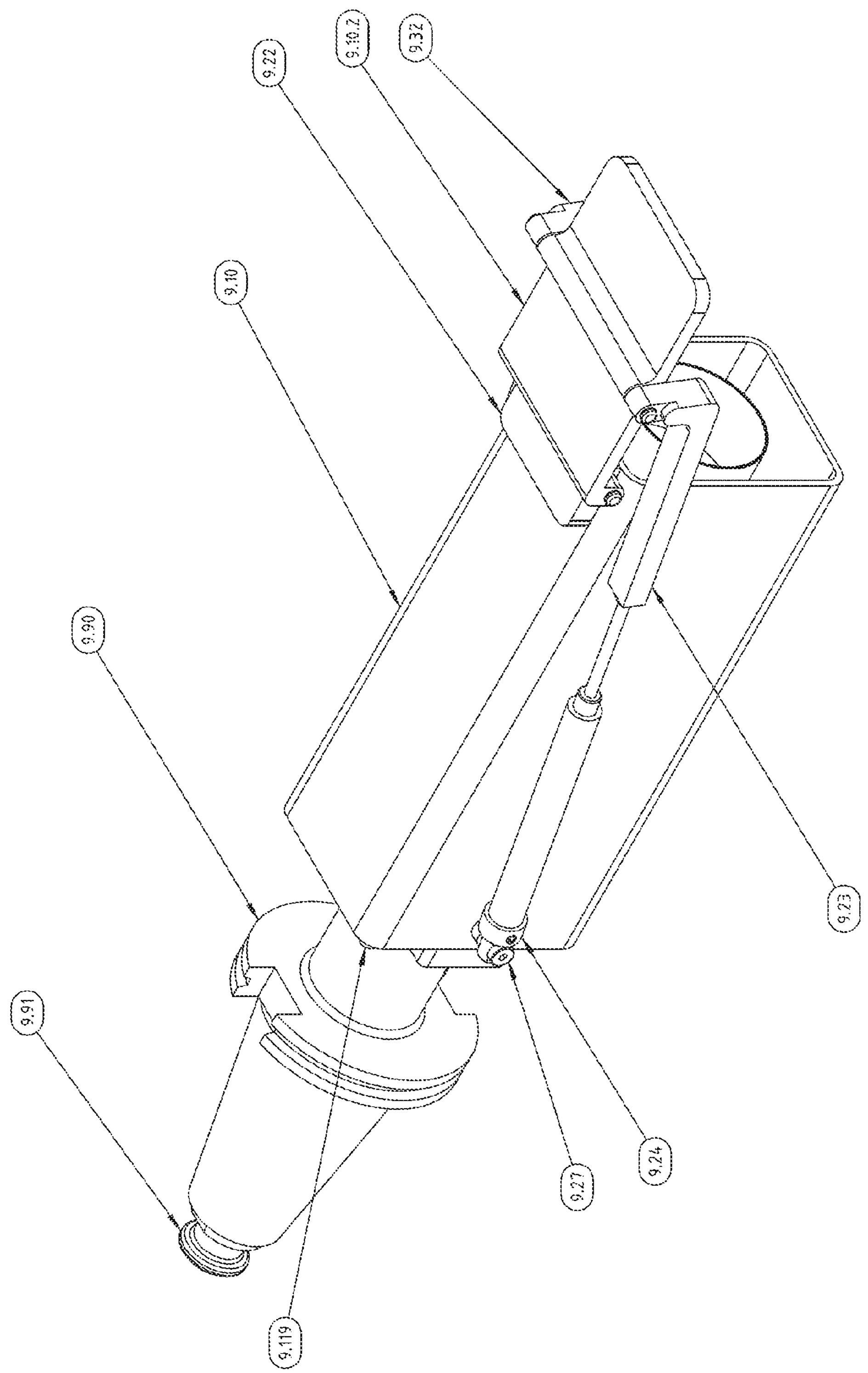
Figure 3:
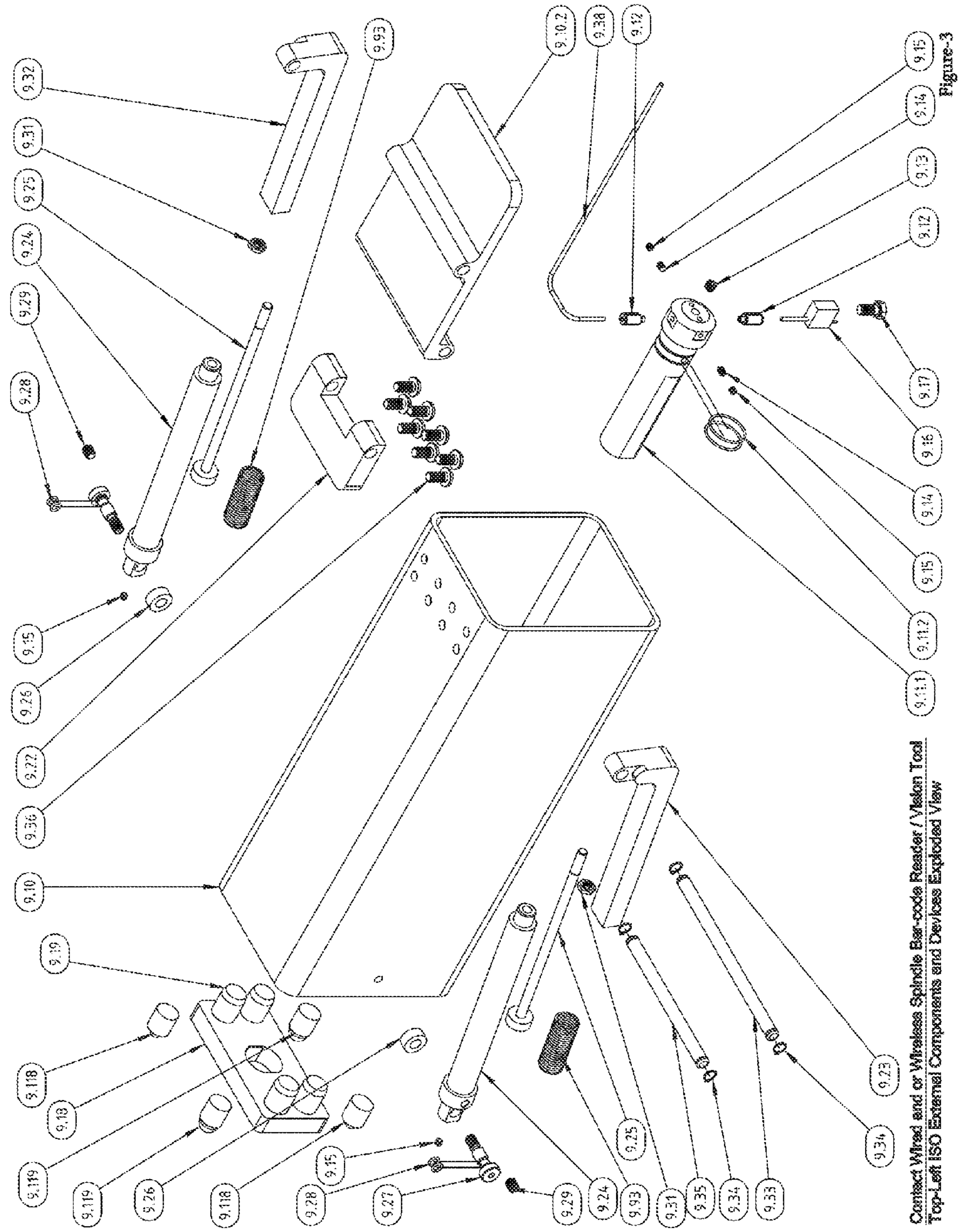
Figure 4:
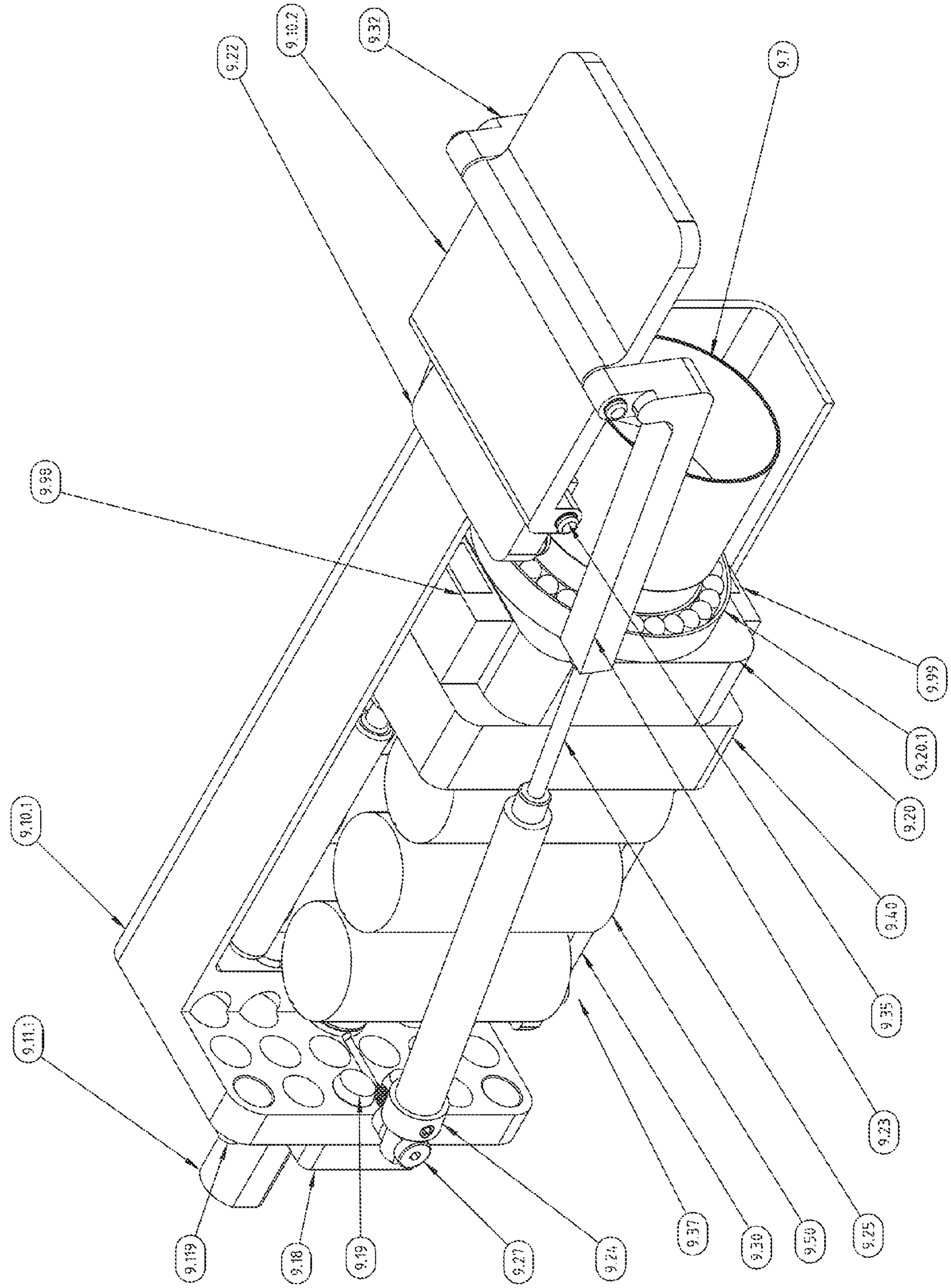
Figure 5:
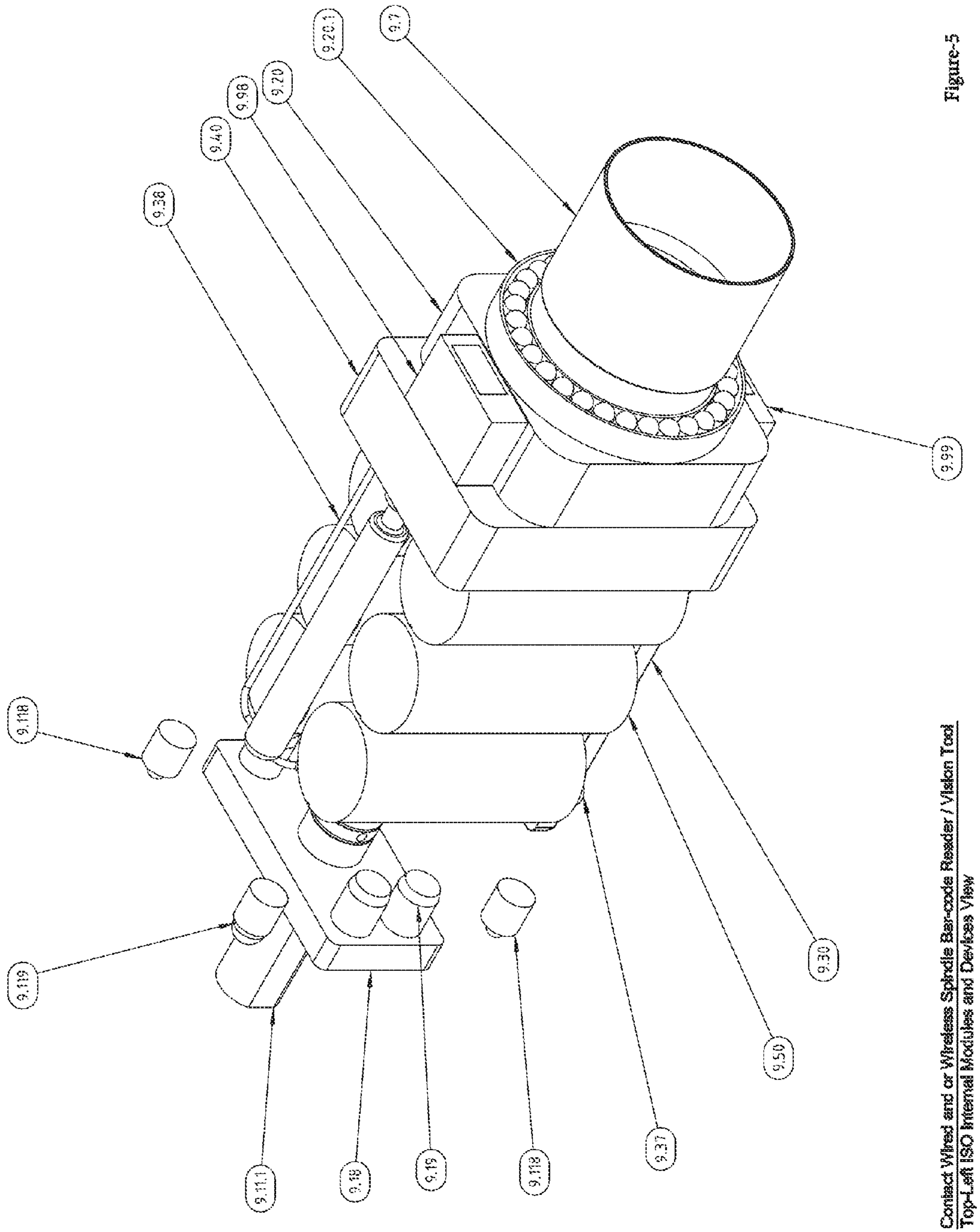
Figure 6:
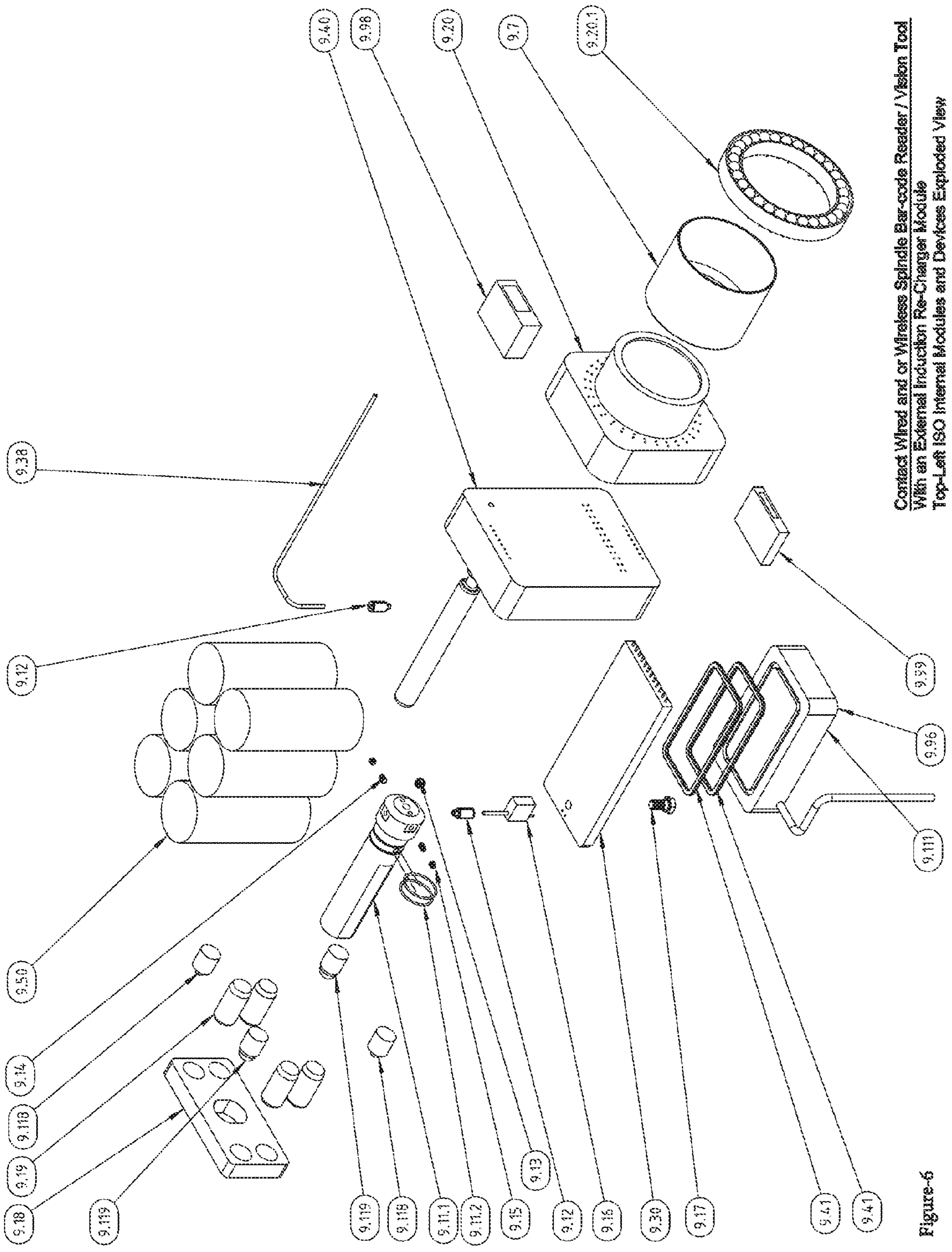
Figure 7:
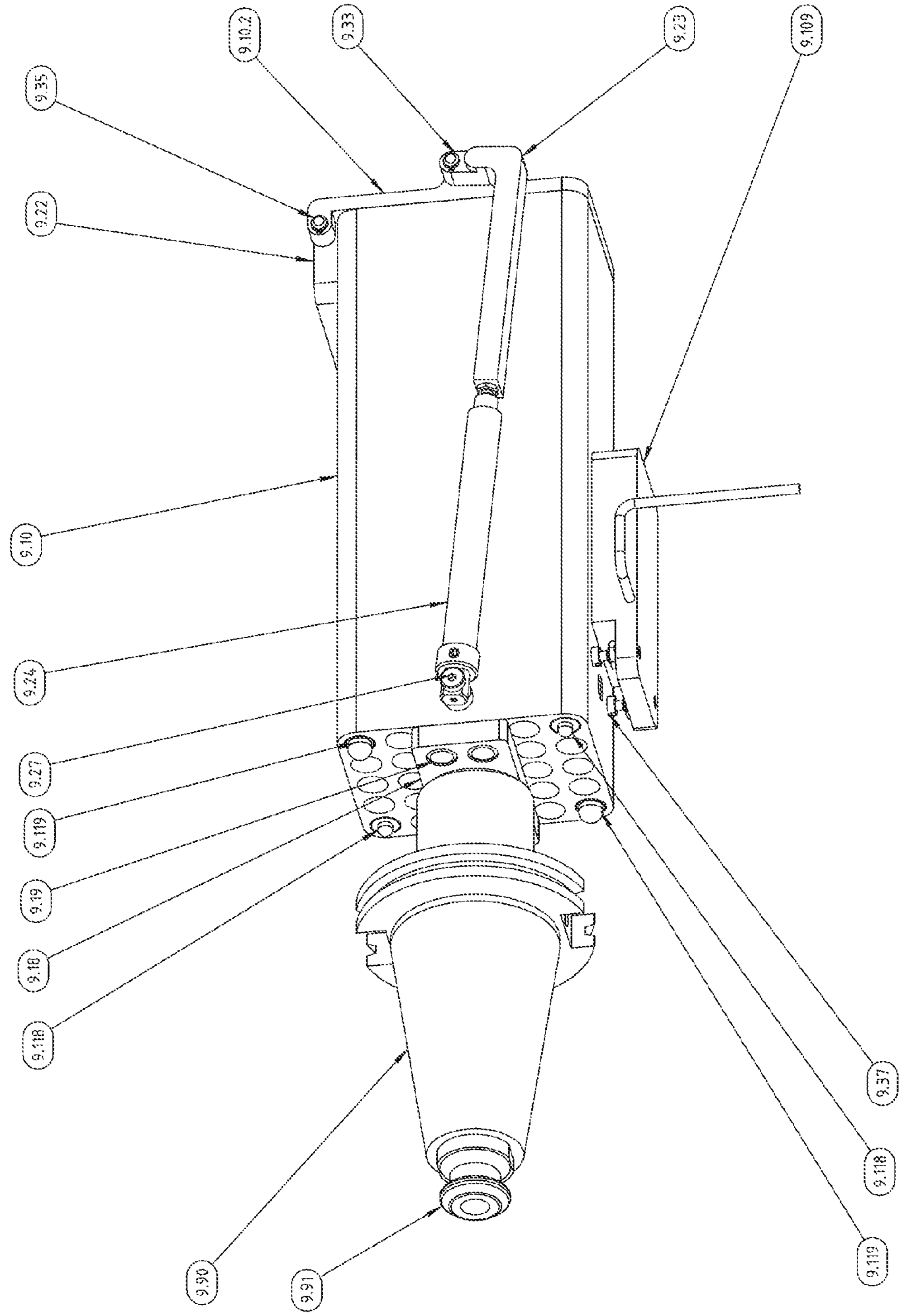
Figure 8:
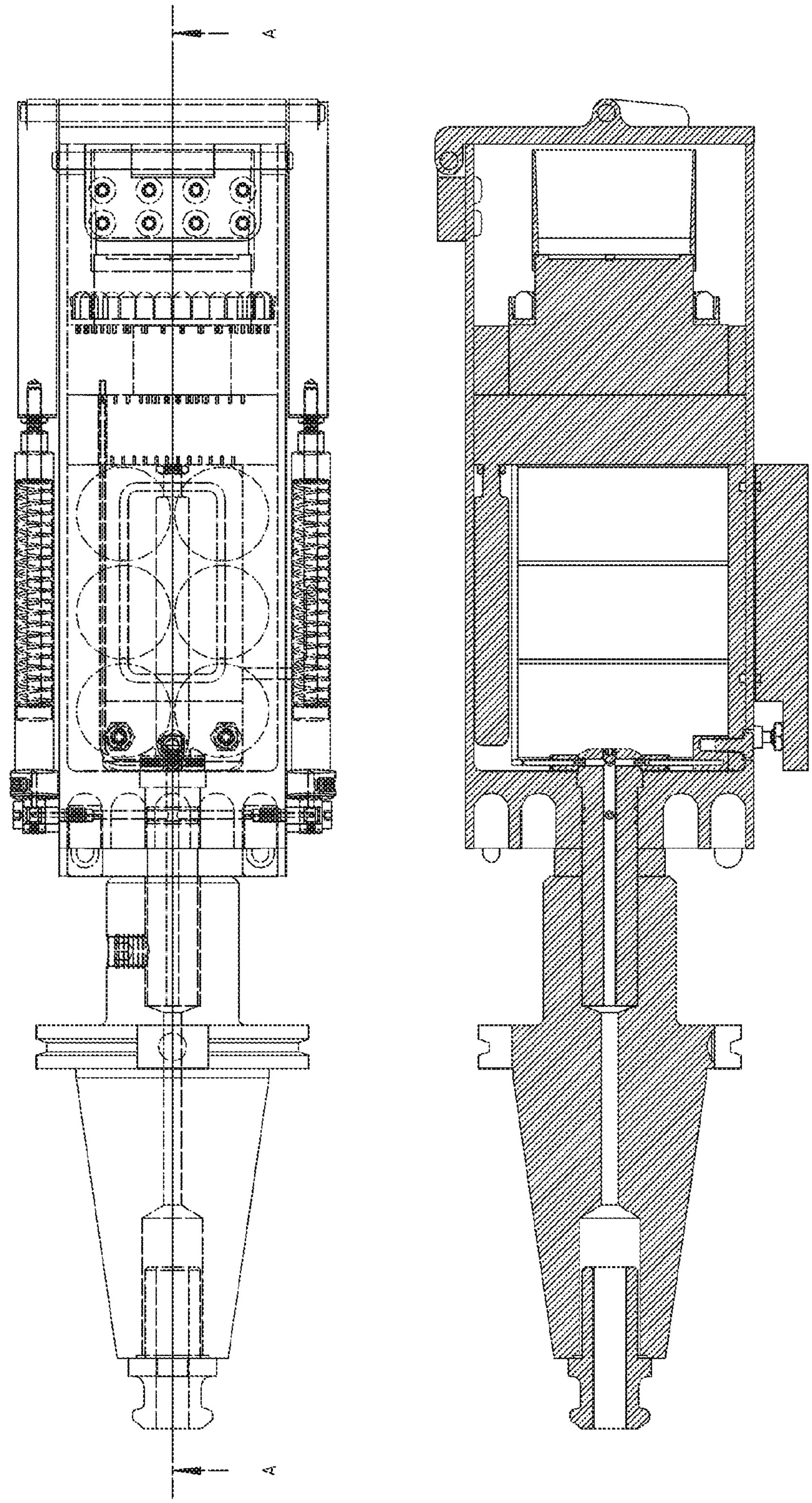
Figure 9:
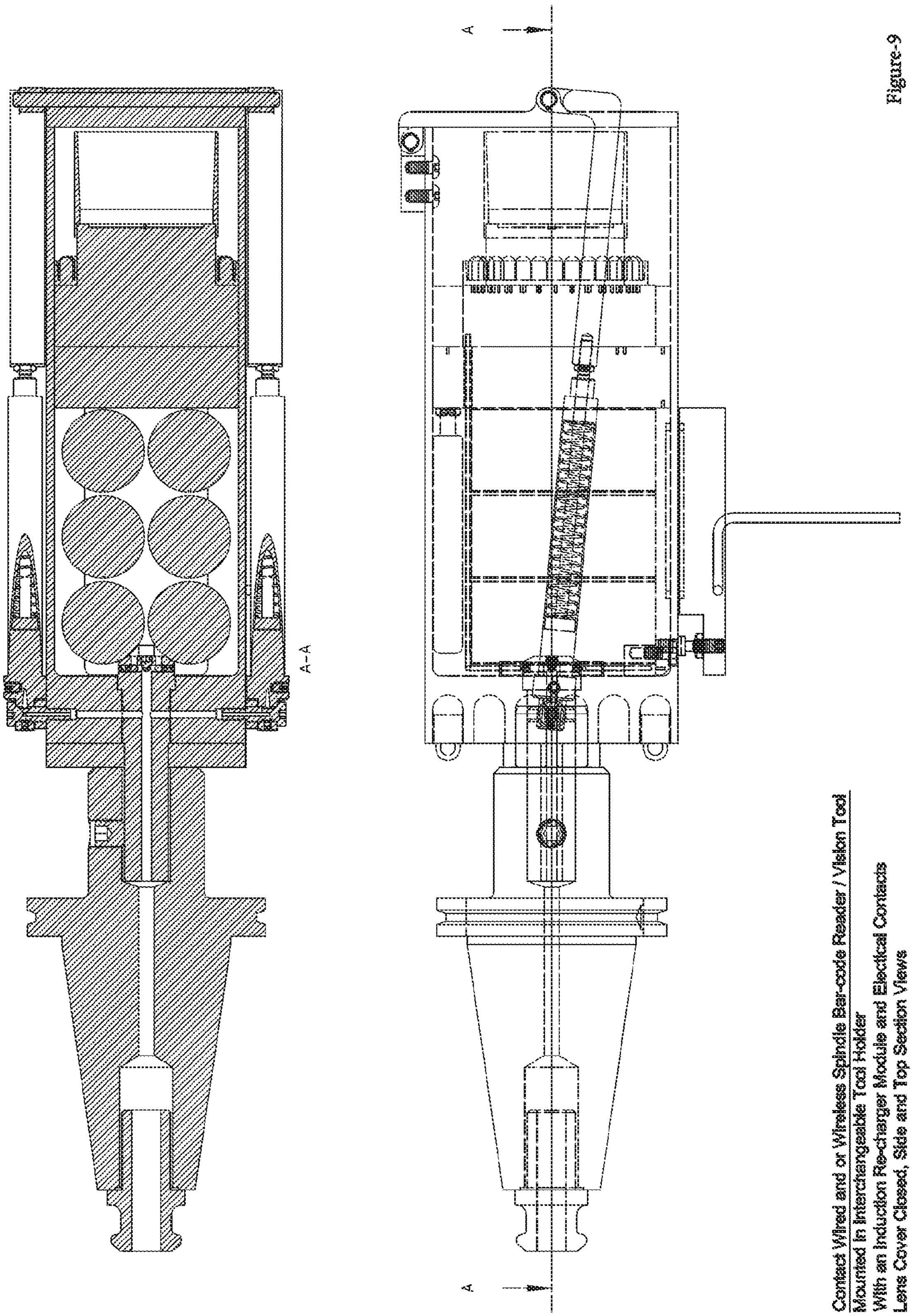
Figure 10:
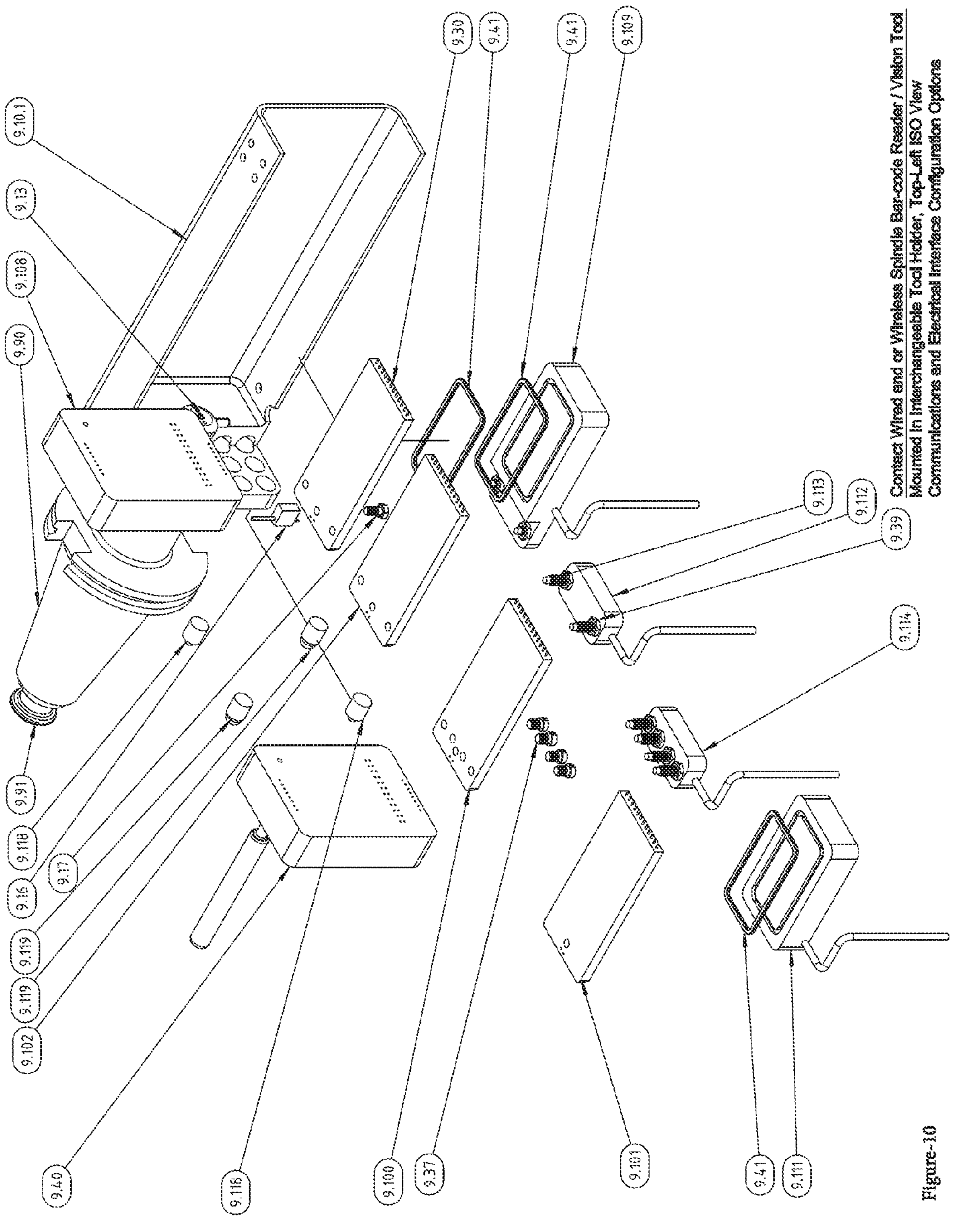
Figure 11:
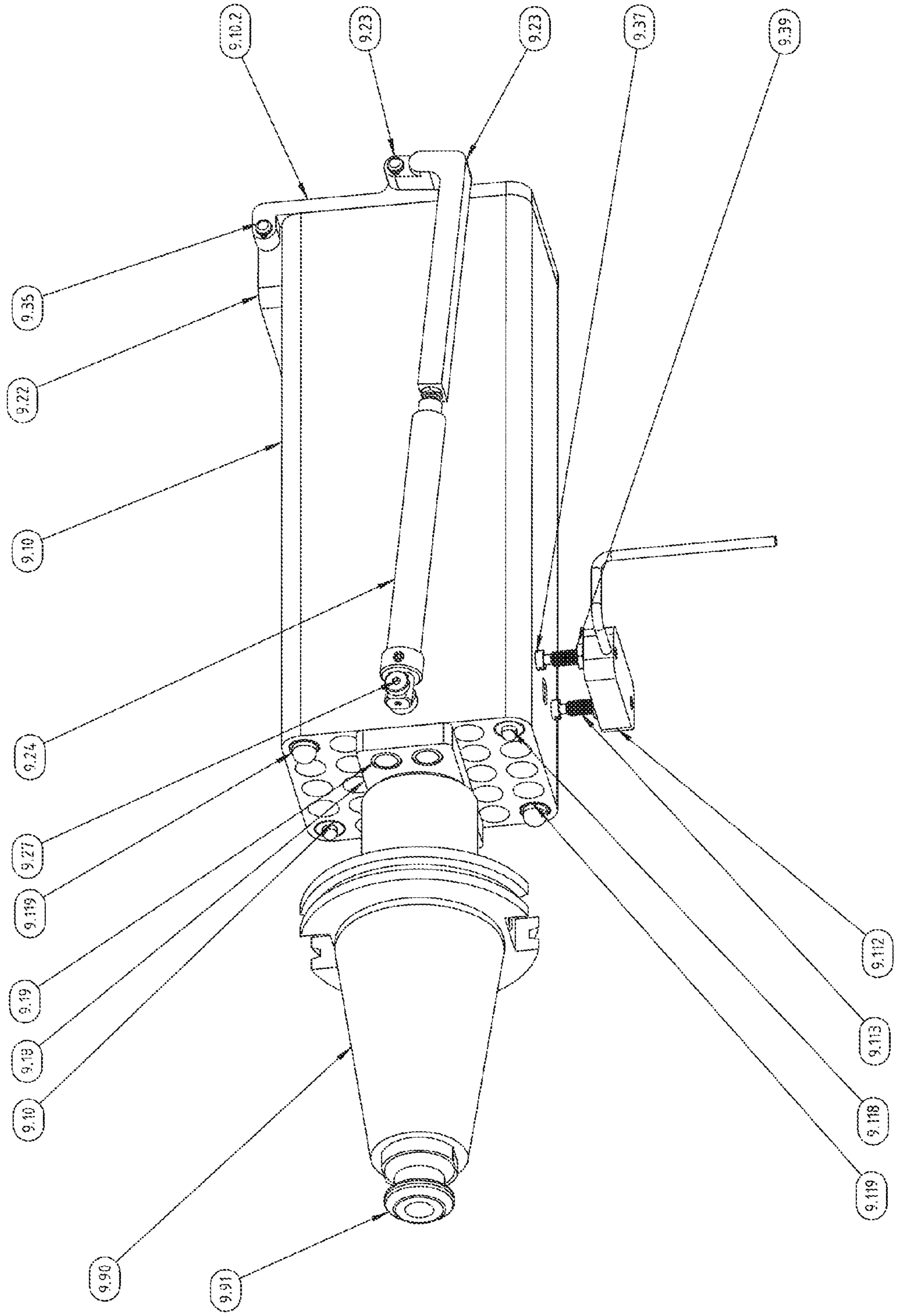
Figure 12:
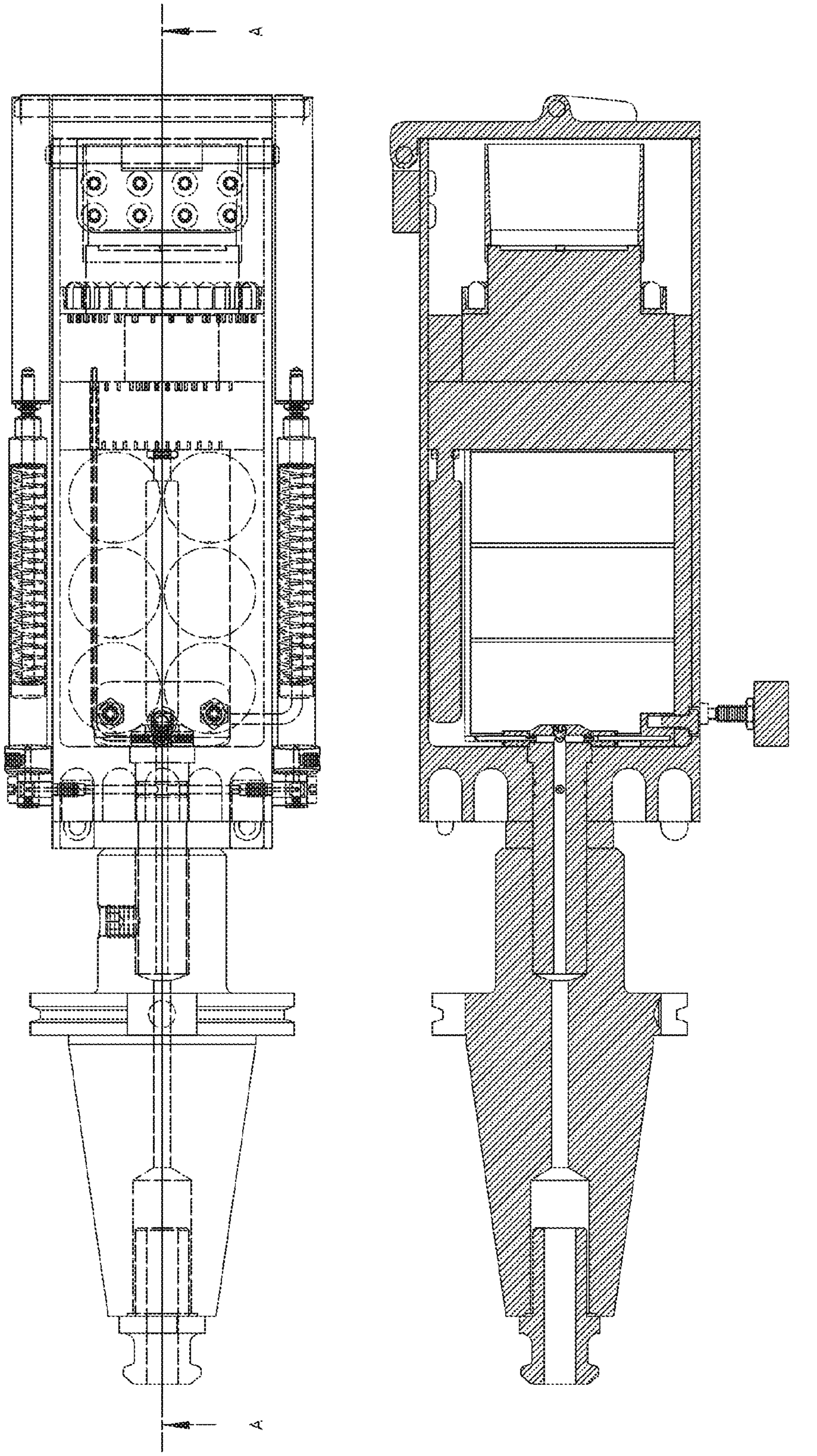
Figure 13:
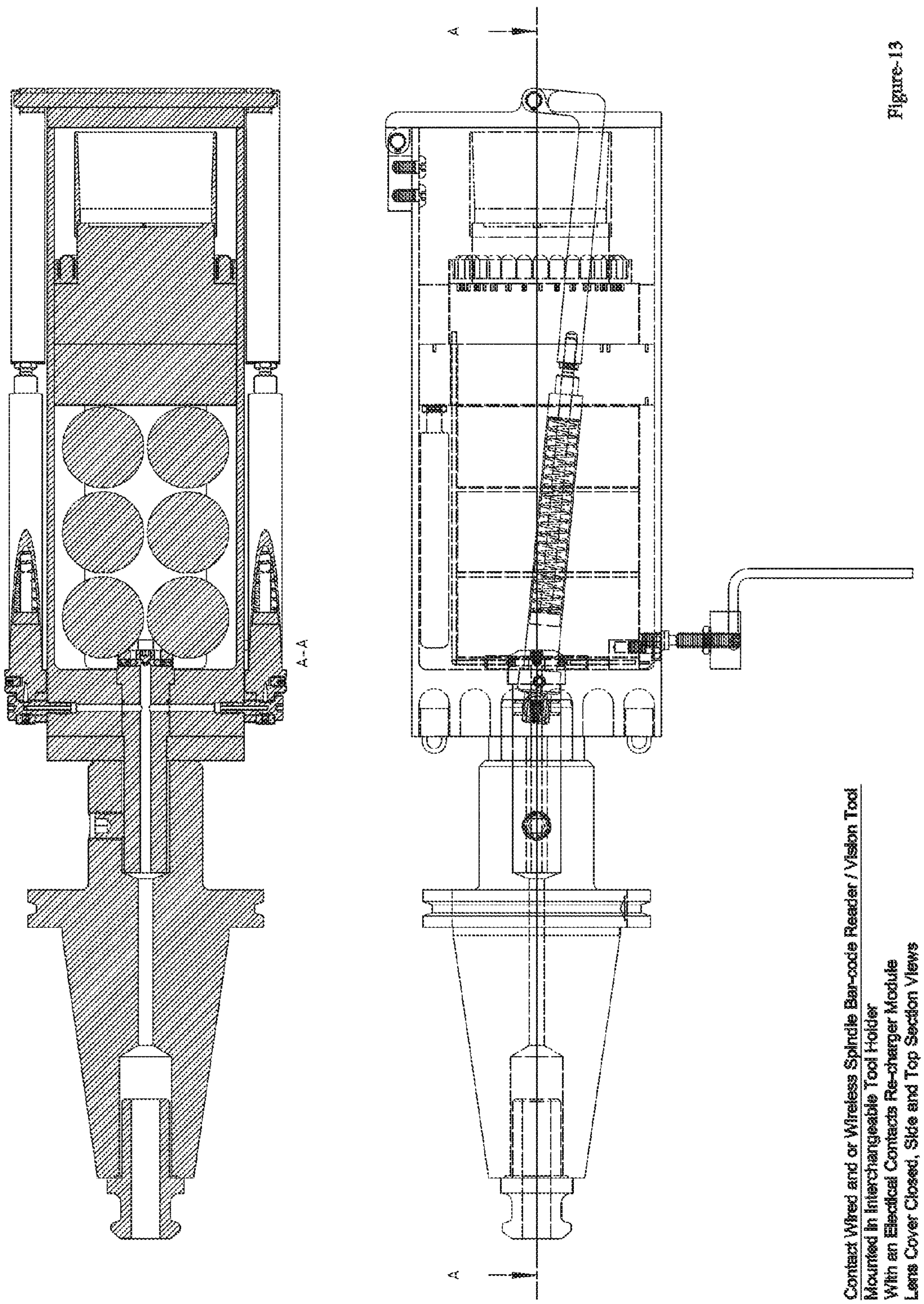
Figure 15:
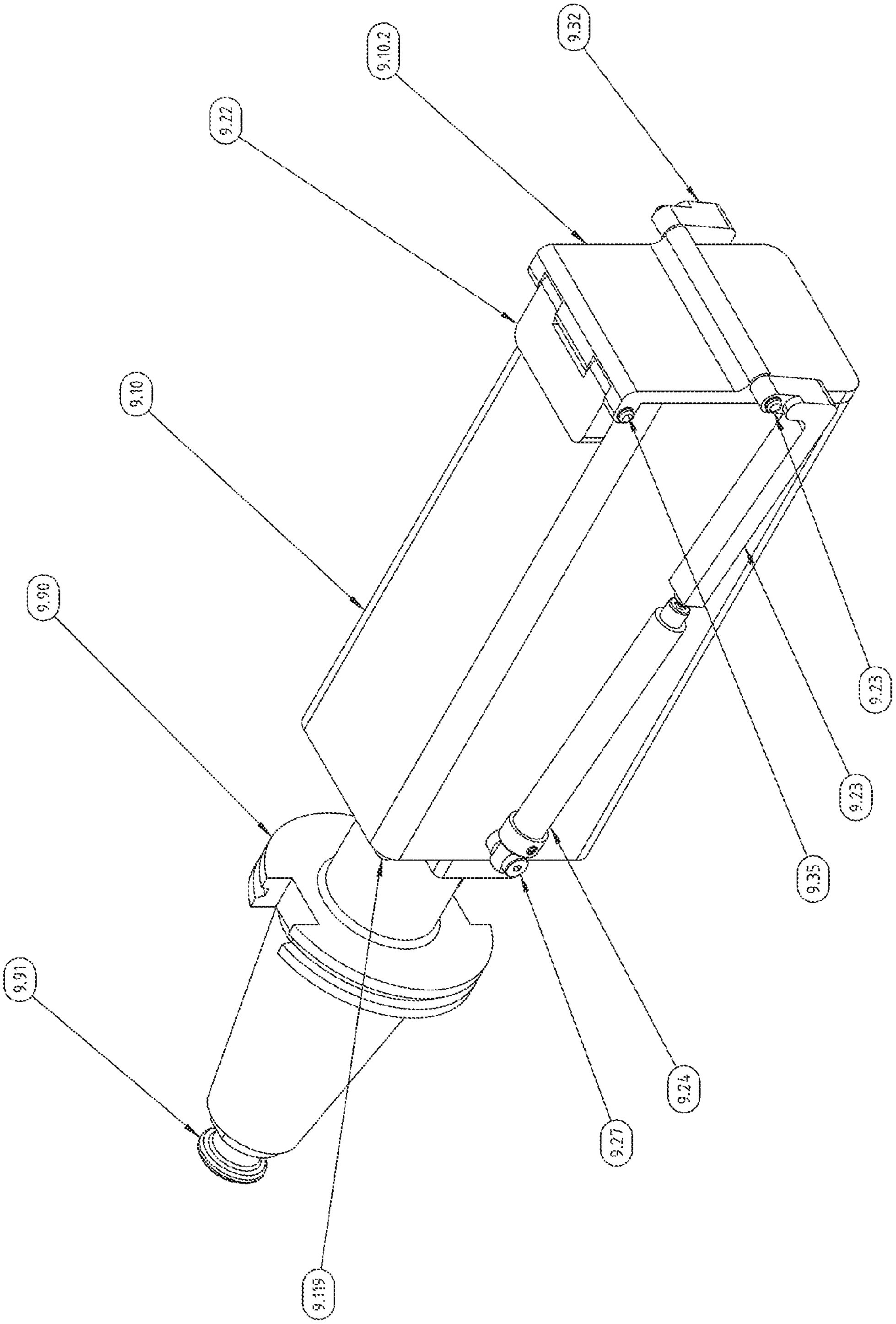
Figure 16:
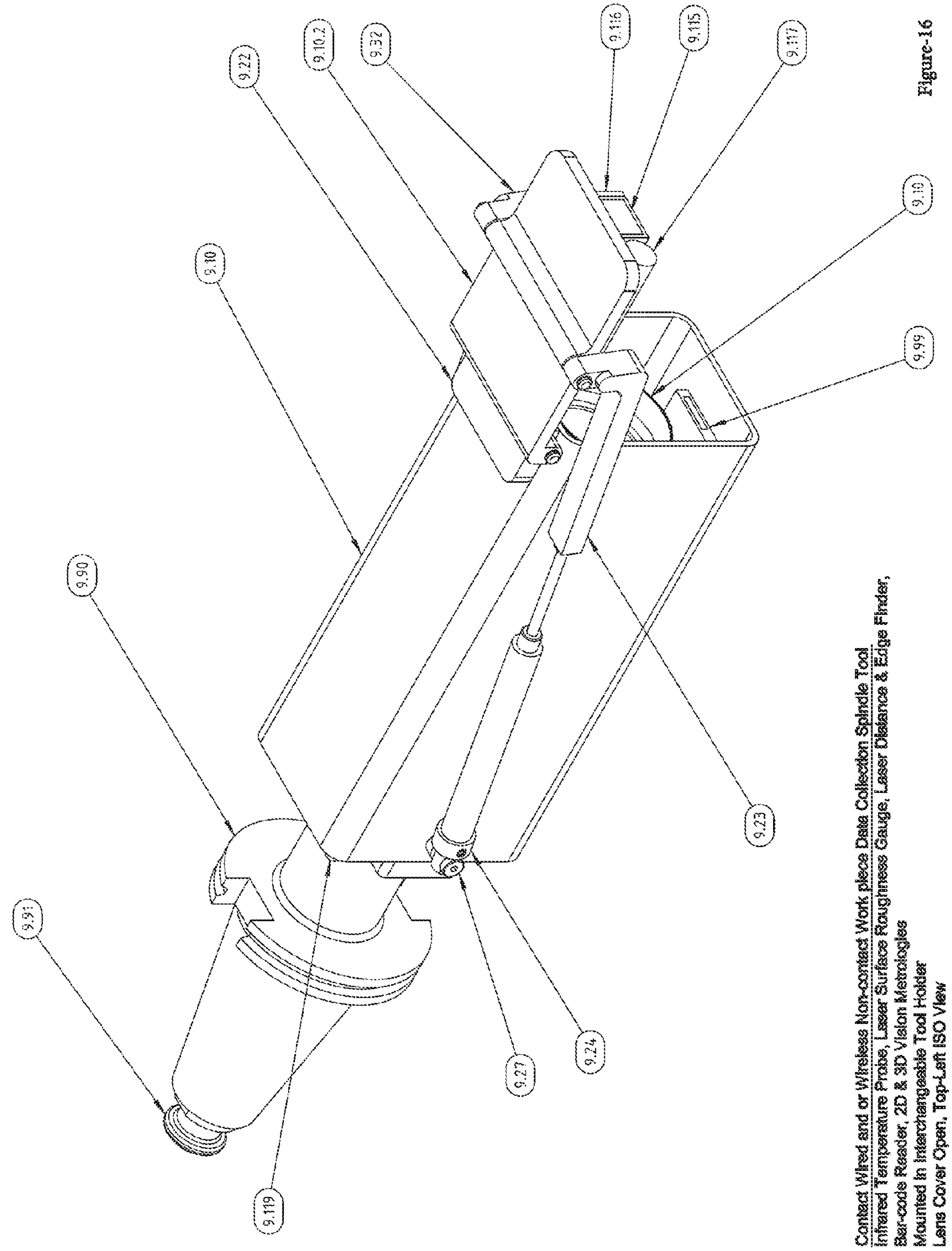
Figure 17:
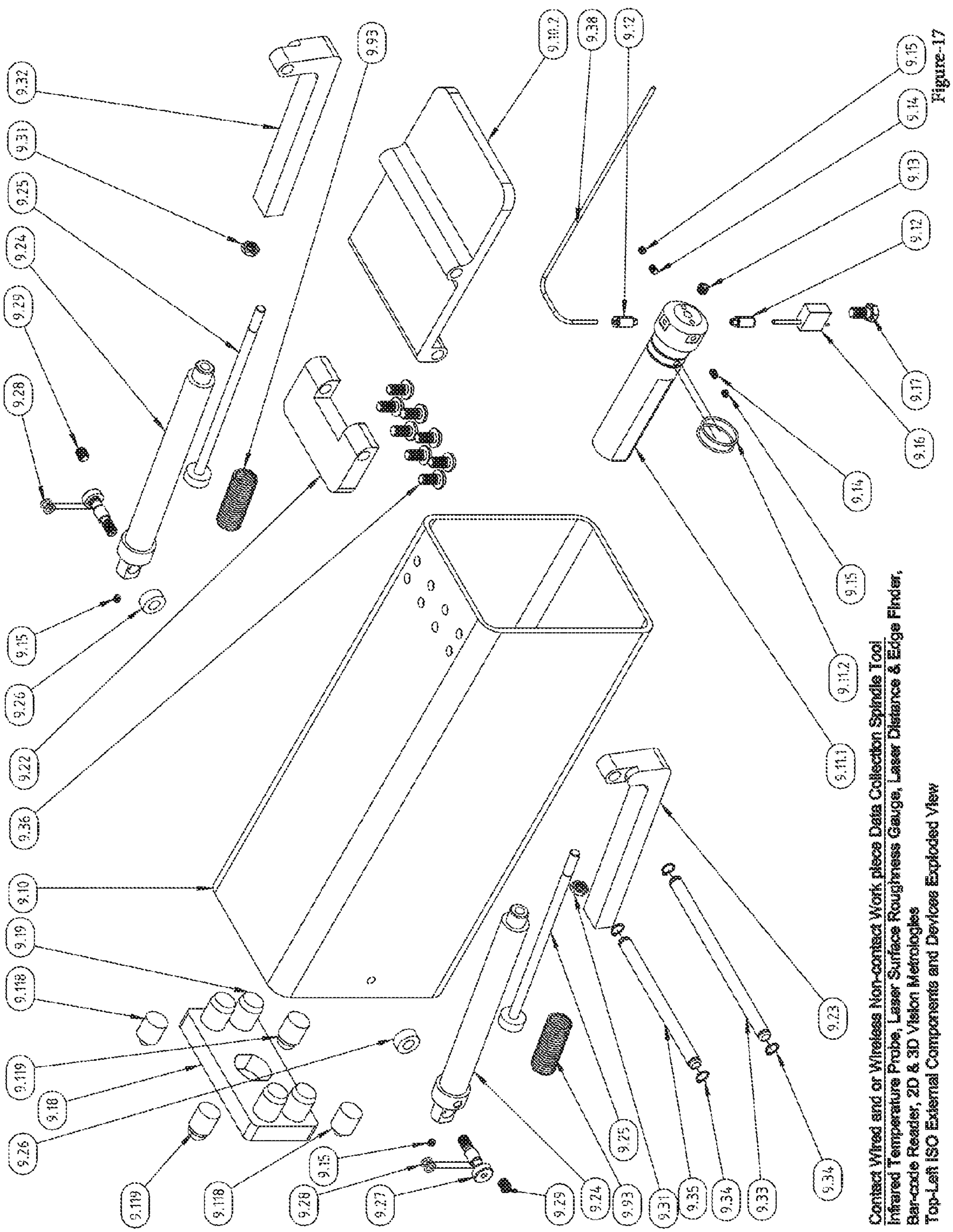
FIG. 17 shows the exploded view of the external components and devices for the spindle mountable camera multiple sensor data acquisition/inspection system of FIG. 15.
Figure 18:
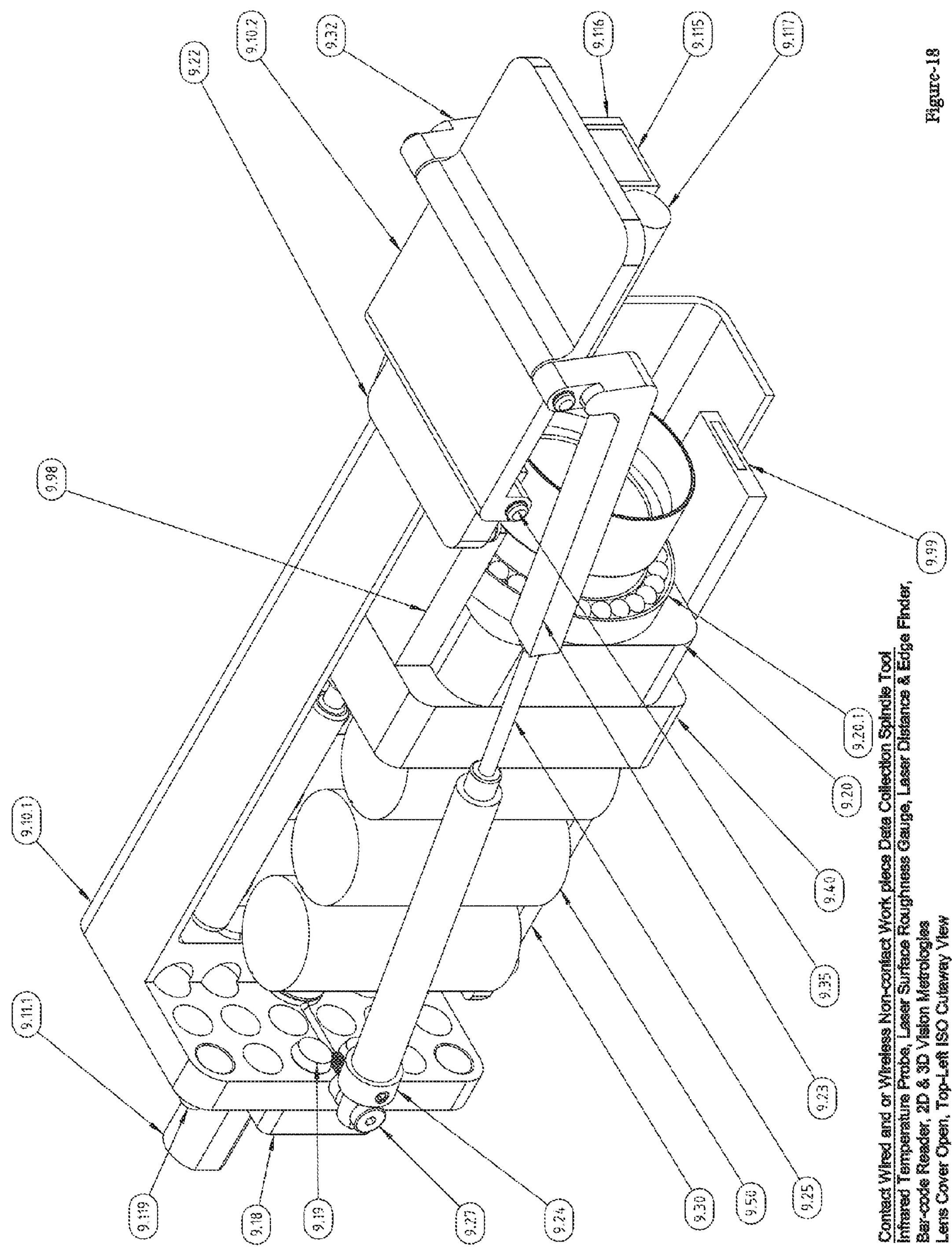
FIG. 18 shows the enclosure 9.10.1 cutaway view of the external components and devices for the spindle mountable camera multiple sensor data acquisition/inspection system of FIG. 15.
Figure 19:
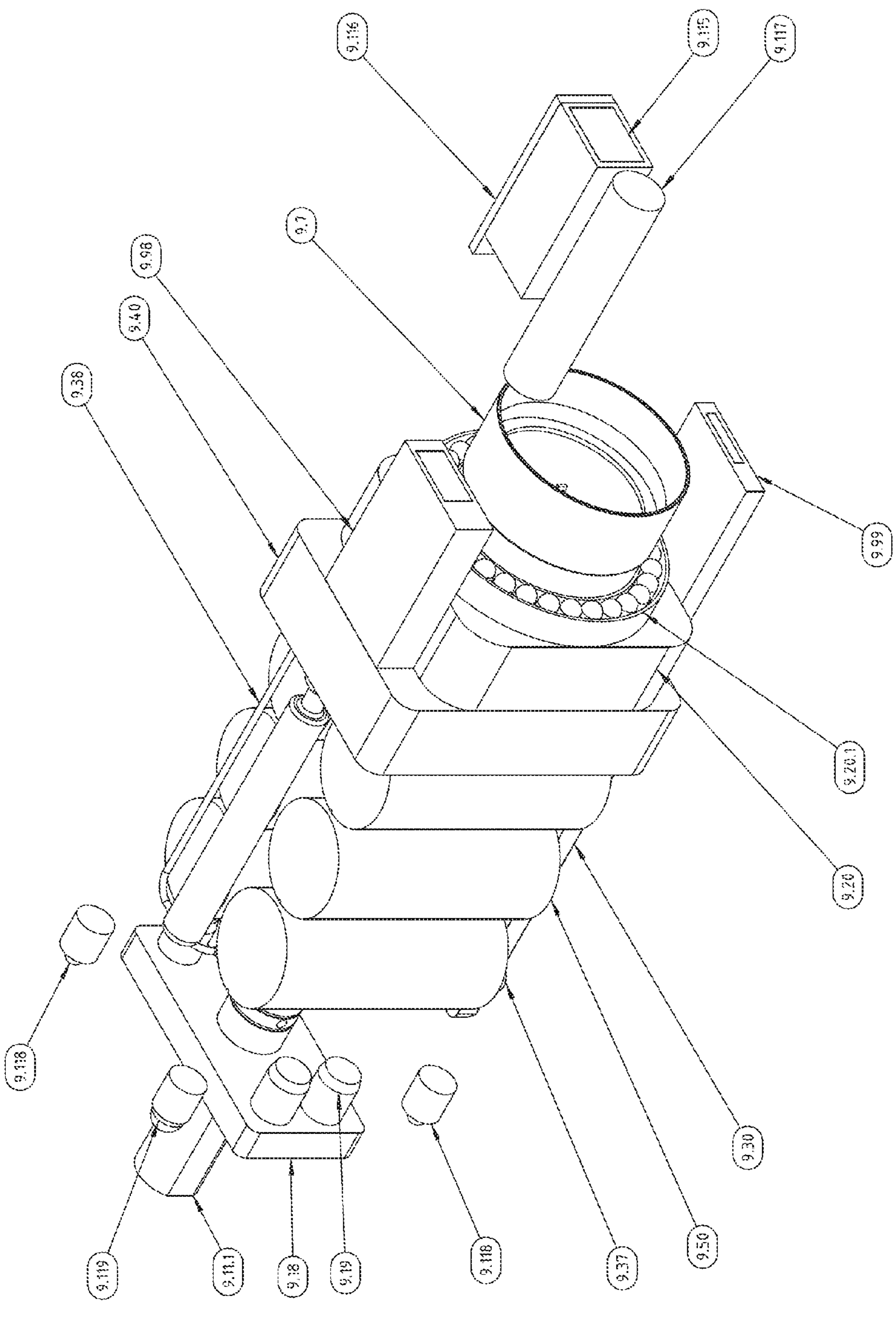
FIG. 19 shows the assembled view internal modules and devices for the spindle mountable camera multiple sensor data acquisition/inspection system of FIG. 15 with the addition of a laser projection and inspection module 9.98 for calculating distances and various metrology measurements of the work piece.
Figure 20:
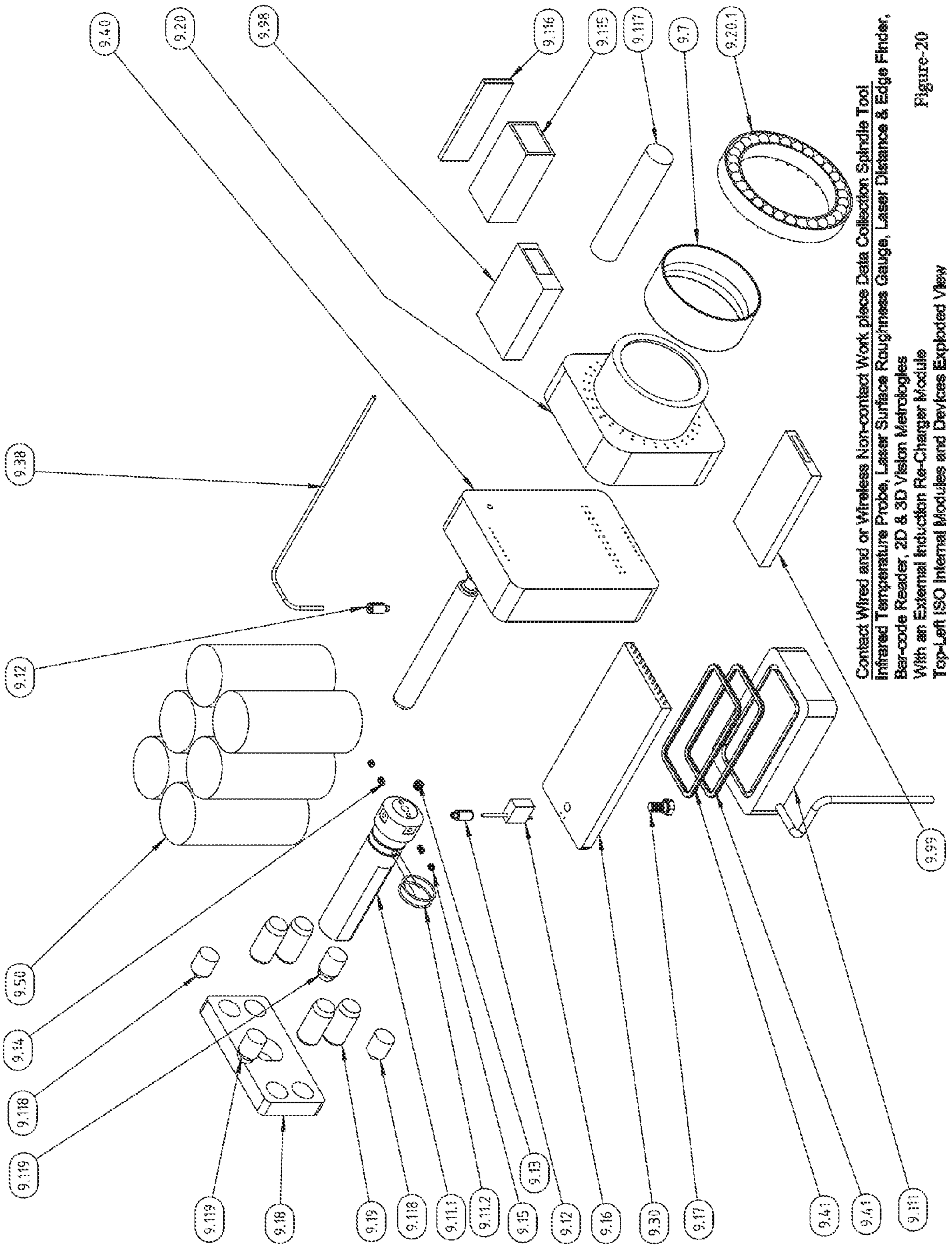
FIG. 20 shows the exploded view of the internal modules and devices for the spindle mountable camera multiple sensor data acquisition/inspection system of FIG. 15.
Figure 21:
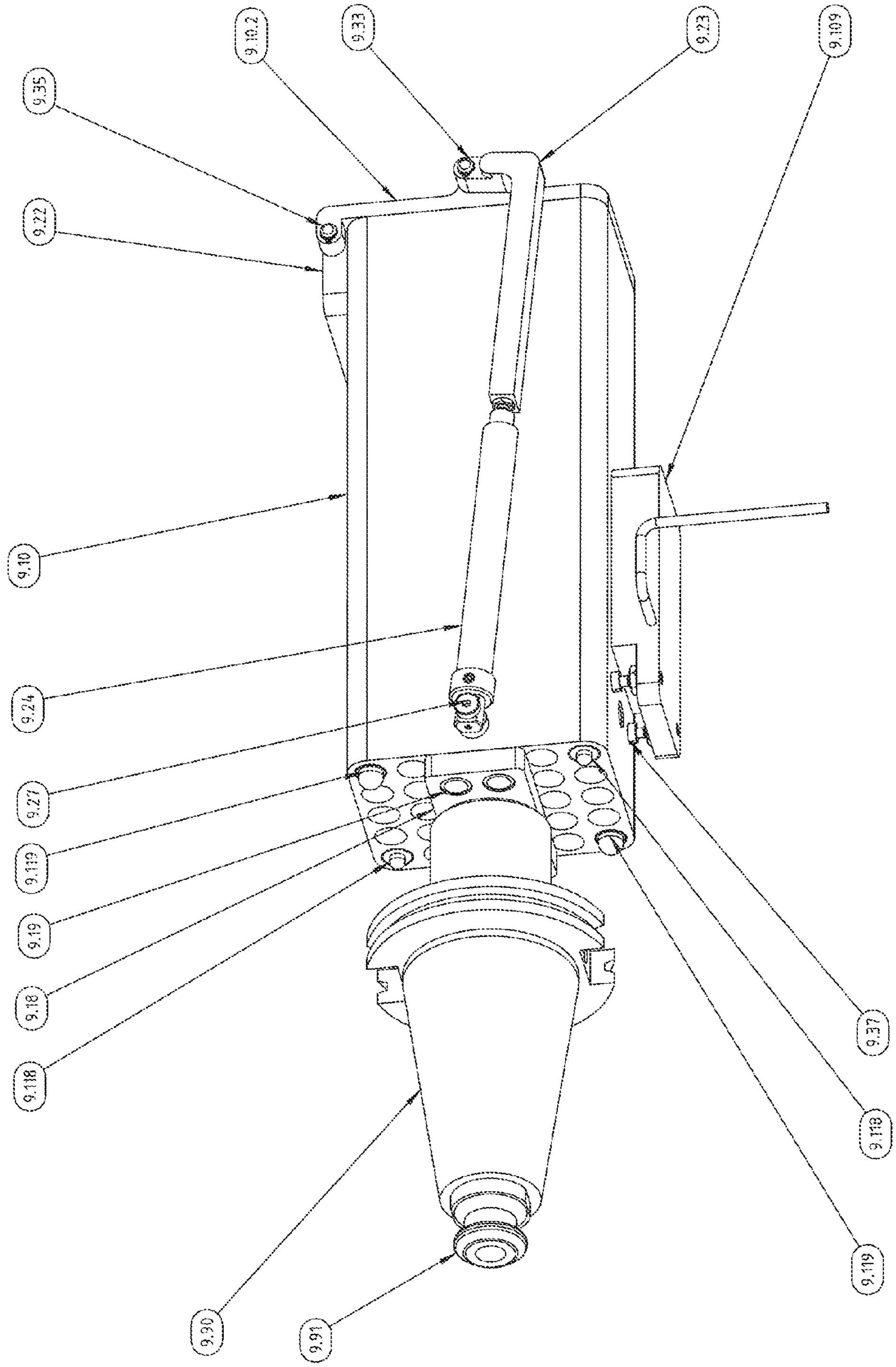
FIG. 21 shows the multiple interfaces for the spindle mountable camera multiple sensor data acquisition/inspection system to the machine tool for system's acquisition/inspection data and/or its programming via IR emitters 9.118 and IR receivers 9.119 and/or contact probes 9.37, or the internal wireless antenna, with internal batteries' recharging via contact probes 9.37 and/or the induction coil 9.109.
Figure 22:
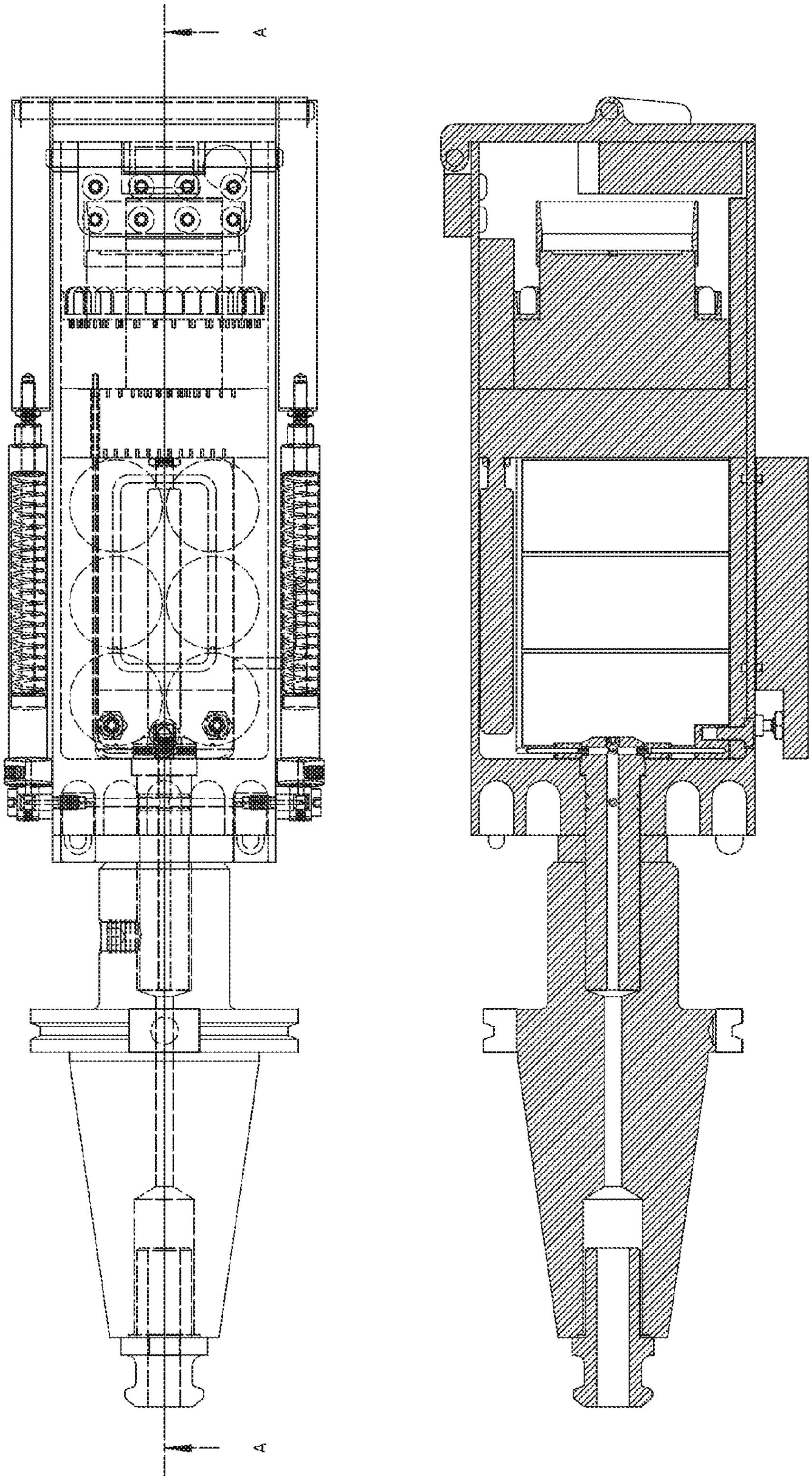
Figure 23:
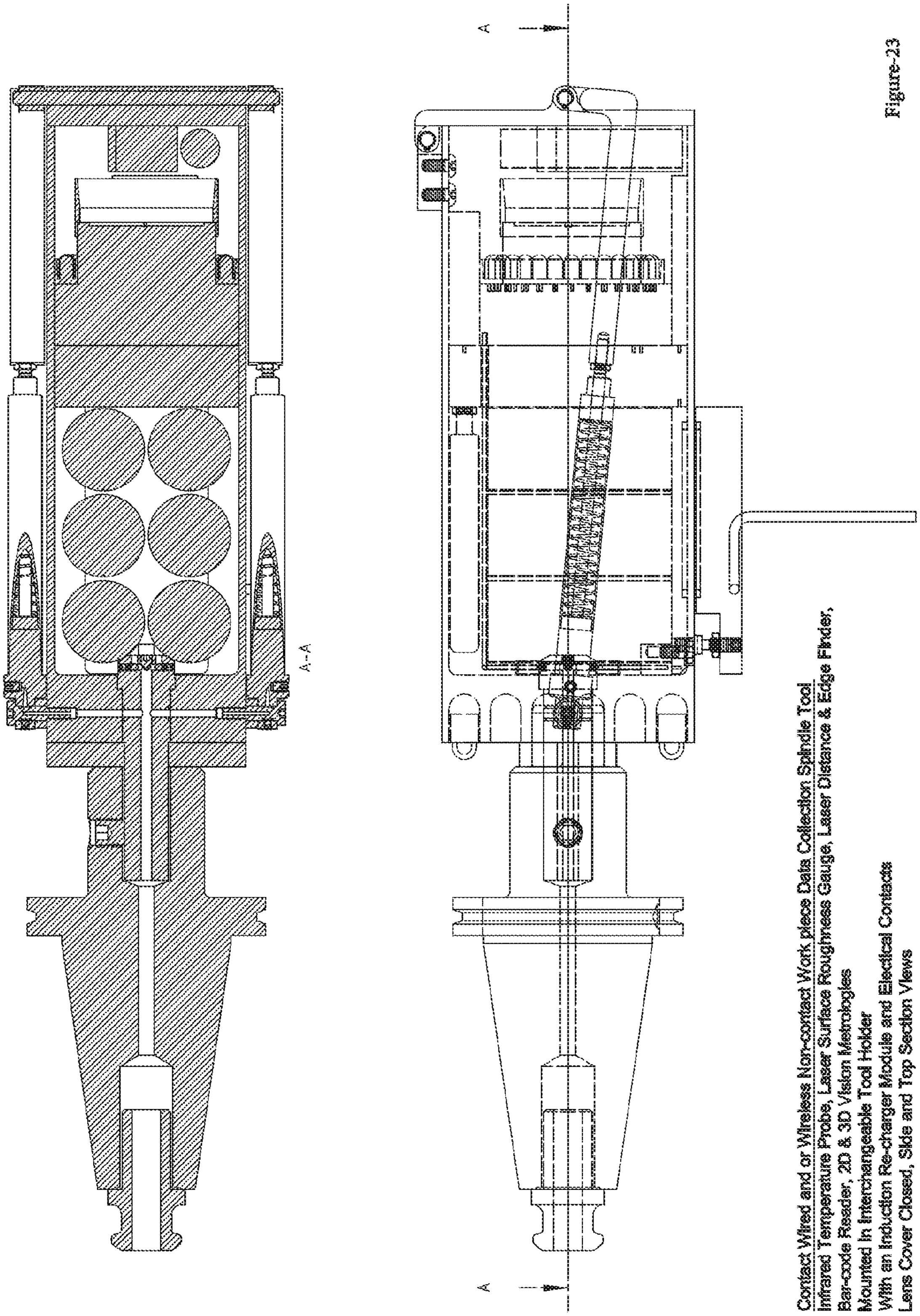

FIG. 22 and FIG. 23 shows the hidden and cutaway views for the internal modules and devices for the spindle mountable camera multiple sensor data acquisition/inspection system of FIG. 15 having the combination induction and/or contact recharging module 9.109.

Figure 24:
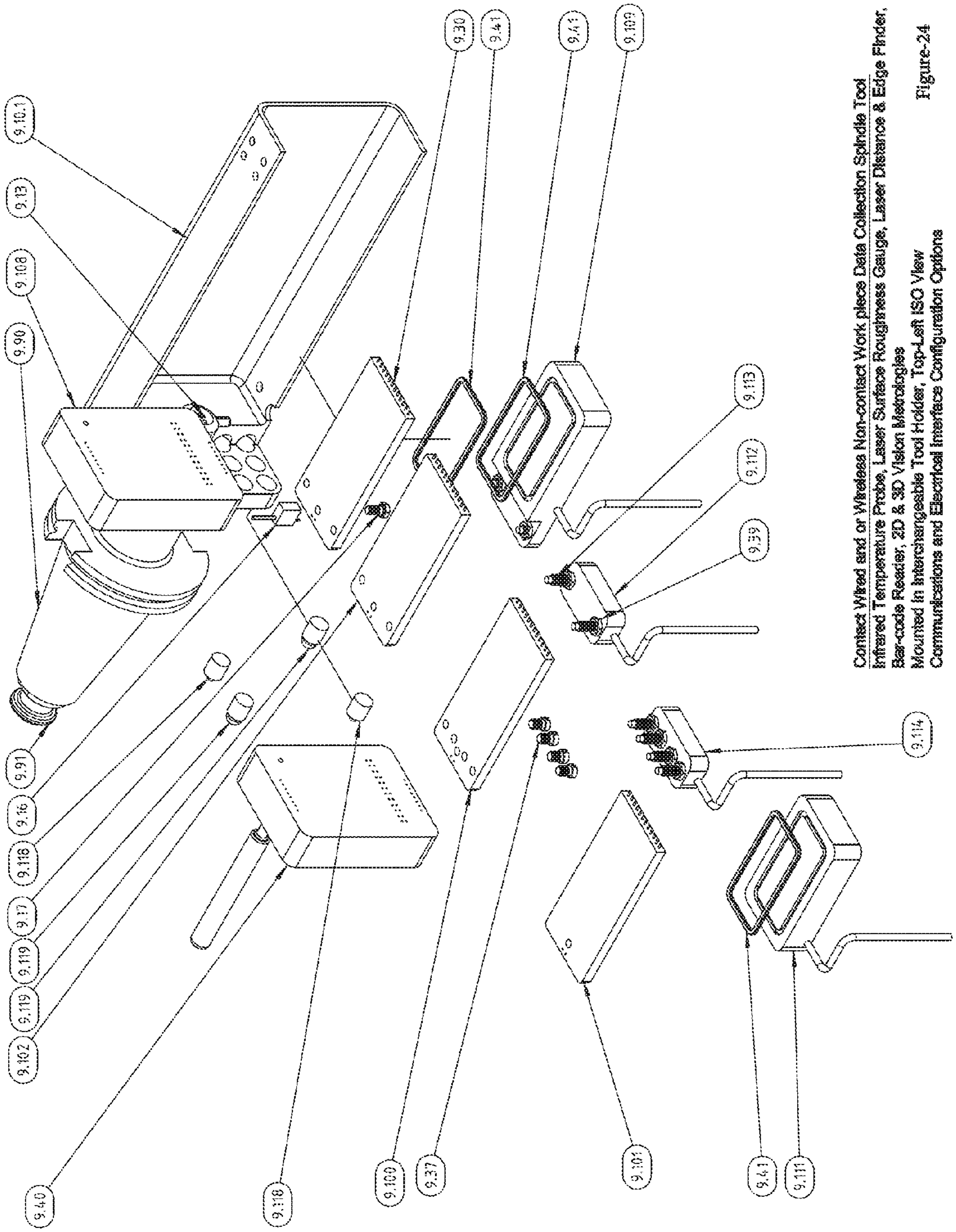

FIG. 24 shows the exploded and cutaway views for the internal modules and devices for the spindle mountable camera multiple sensor data acquisition/inspection system of FIG. 15 having multiple internal battery recharging means via electrical induction power transmission utilizing the emitter induction coil 9.41 to transmit power to the system's corresponding receiving induction coil 9.41 that is operably connected to the non-contact induction interconnection charging control module 9.101, or direct contact charging via the contact probes 9.113 of module 9.114 that is utilized for both battery charging and communications as required that is to transmit power to the system's corresponding 4 contact interconnection charging control module 9.100, or direct contact charging via the contact probes module 9.112 that is utilized for both battery charging that is to transmit power to the system's corresponding 2 contact probes 9.113 to transmit power to the system's interconnection charging control module 9.102, or the combination induction and/or contact recharging module 9.109.

Figure 25:
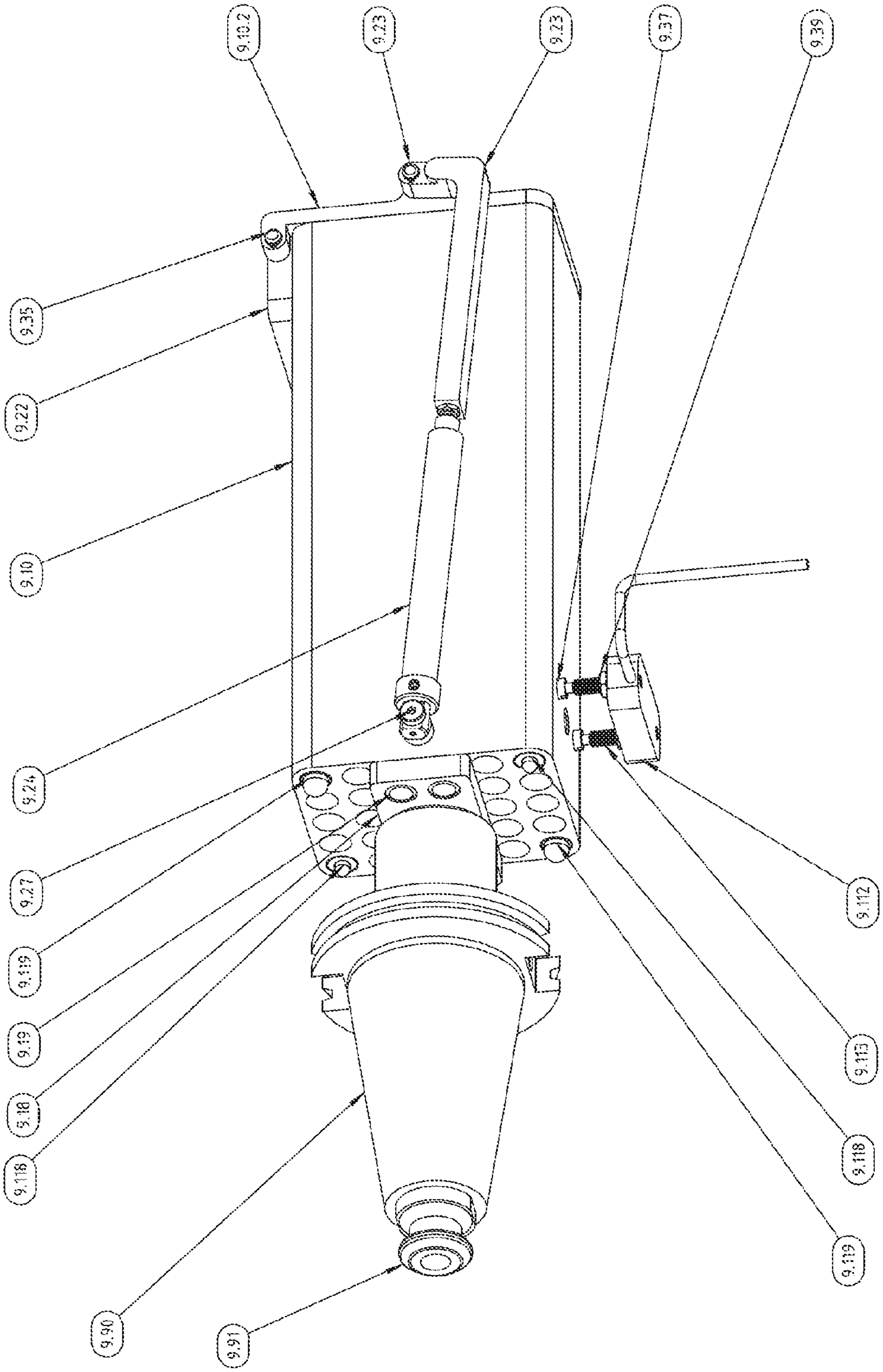

FIG. 25 shows the multiple interfaces for the spindle mountable camera multiple sensor data acquisition/inspection system to the machine tool for system's acquisition/inspection data and/or its programming via IR emitters 9.118 and IR receivers 9.119 and/or contact probes 9.37, or the internal wireless antenna, with internal batteries' recharging via contact probes 9.37 electrical contact module 9.112.

Figure 26:
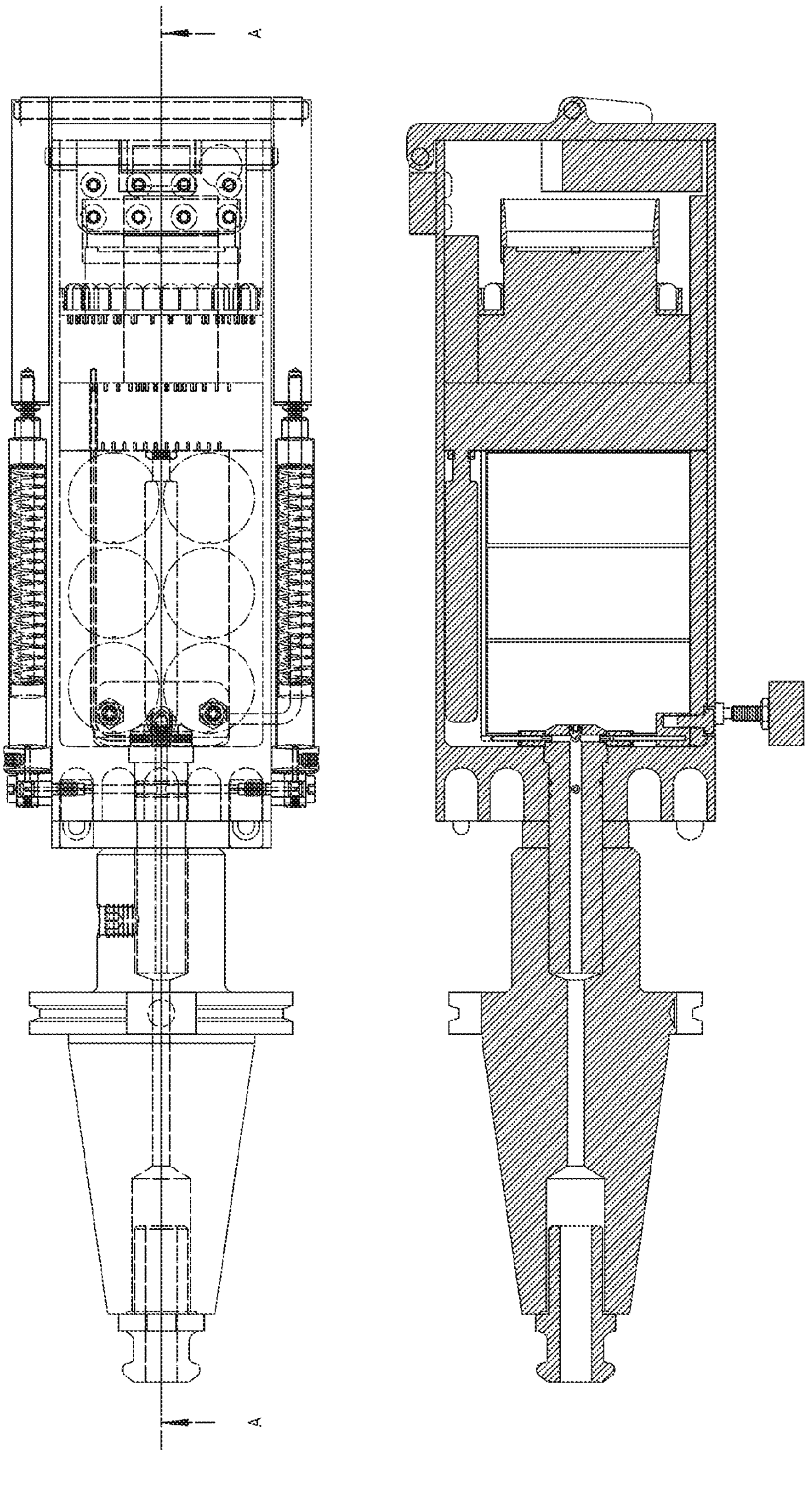
Figure 27:
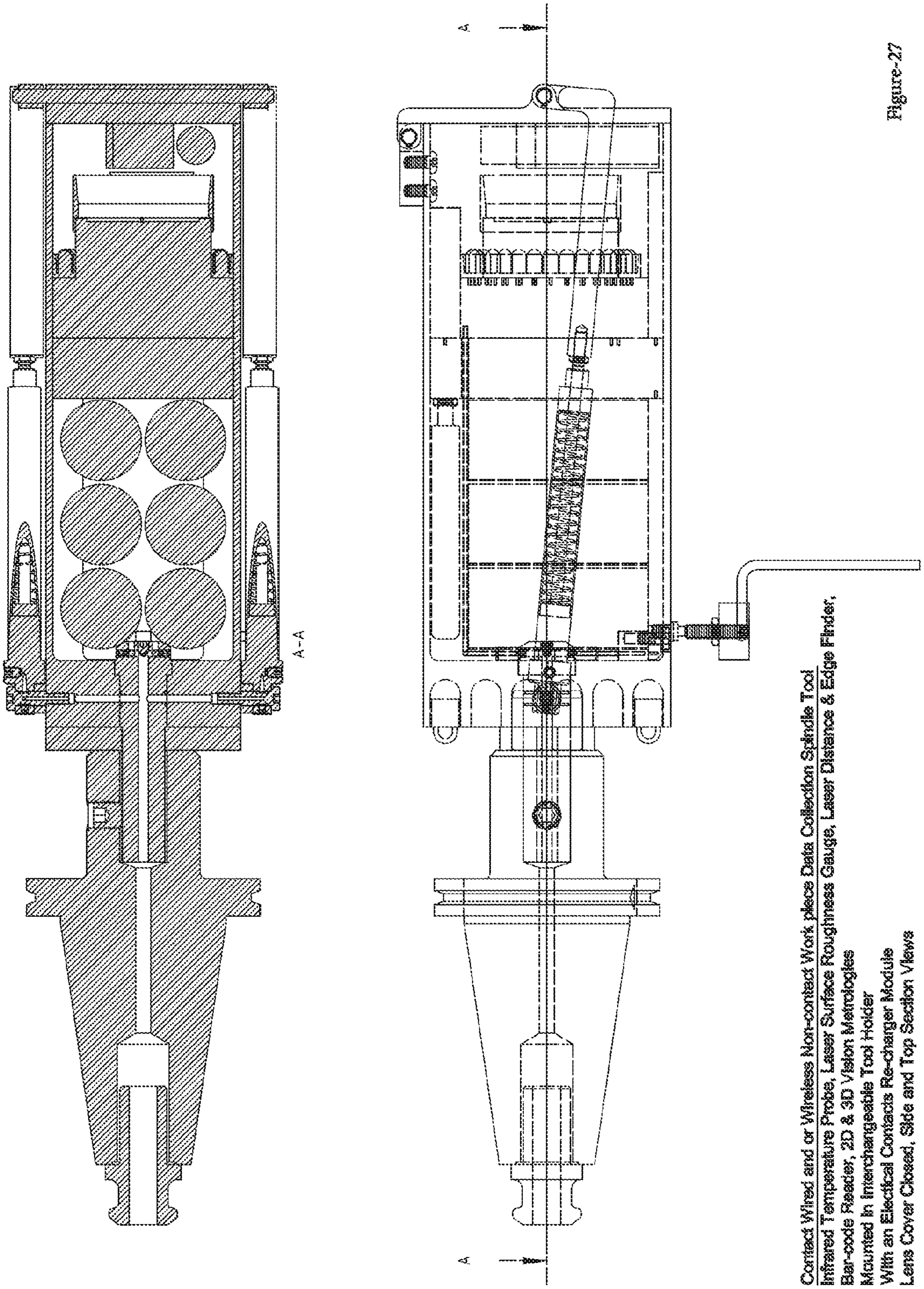
Figure 29:
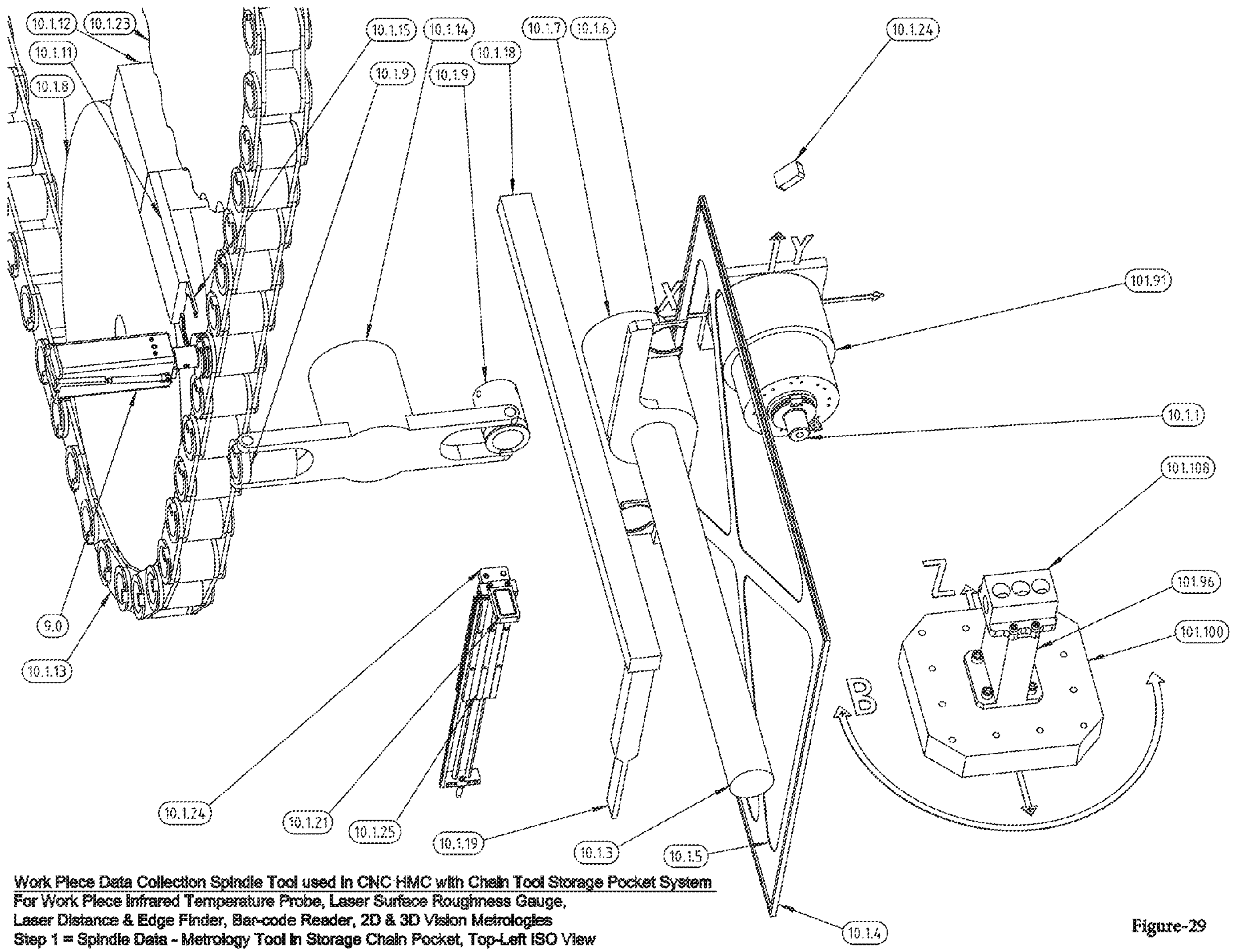
Figure 30:
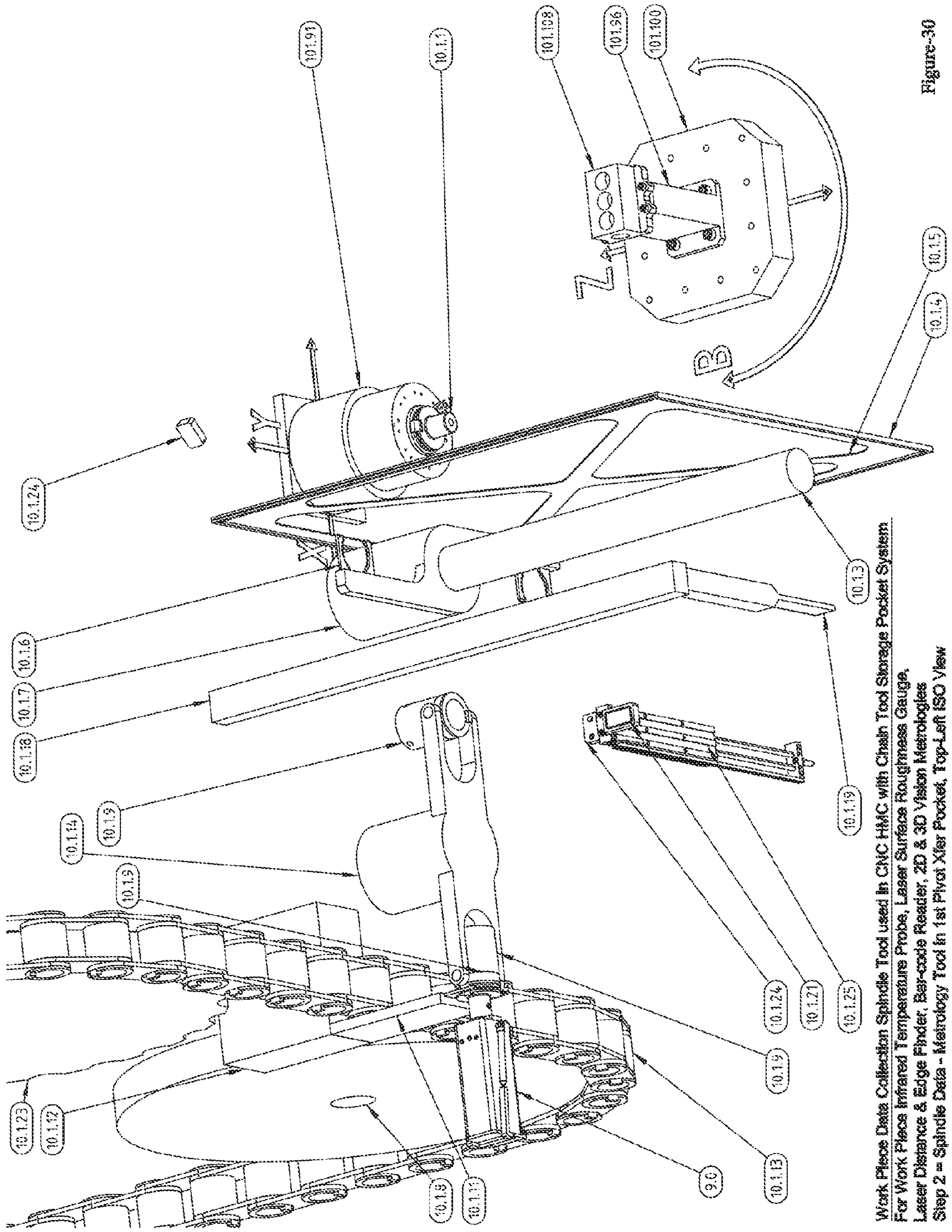
Figure 31:
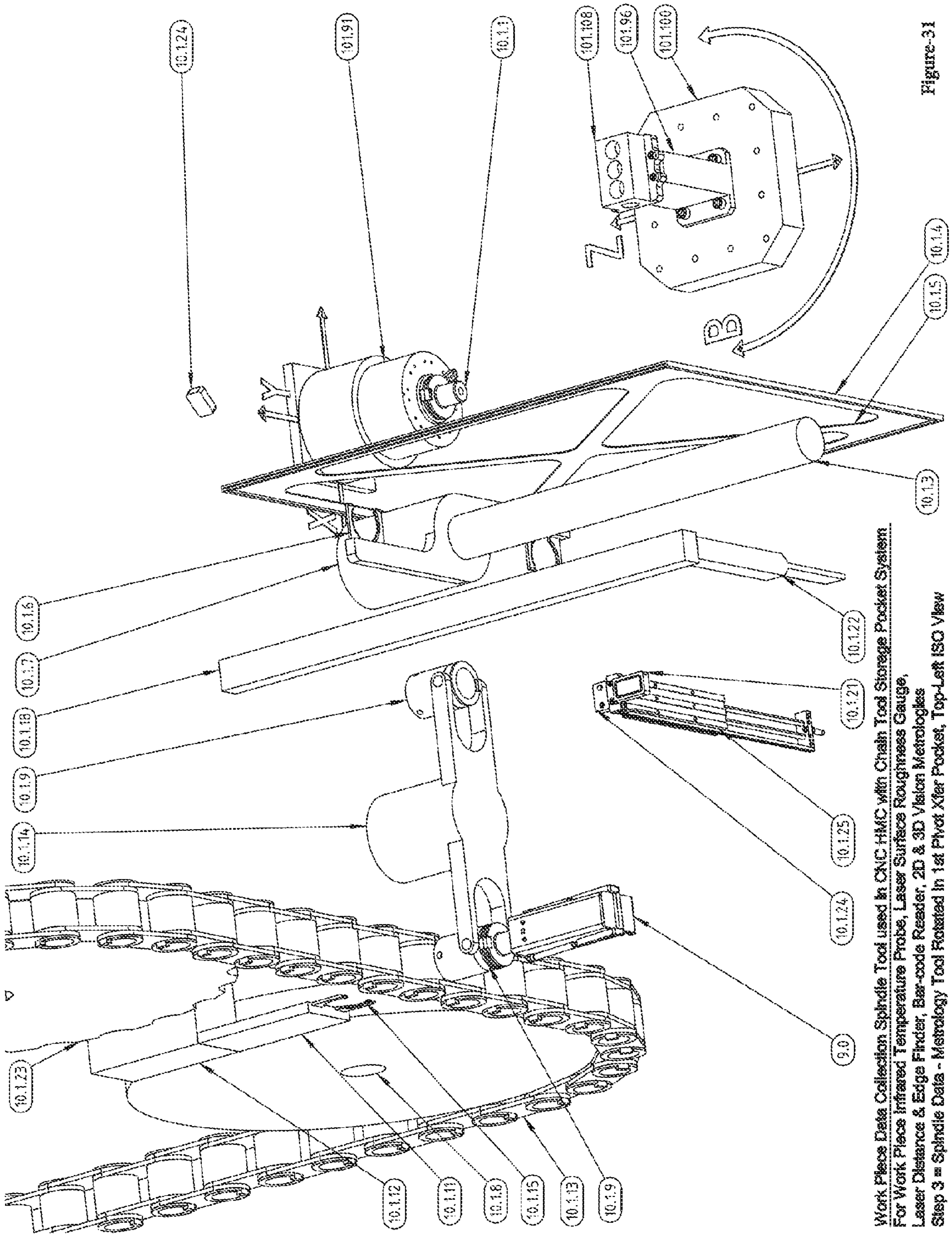
Figure 32:
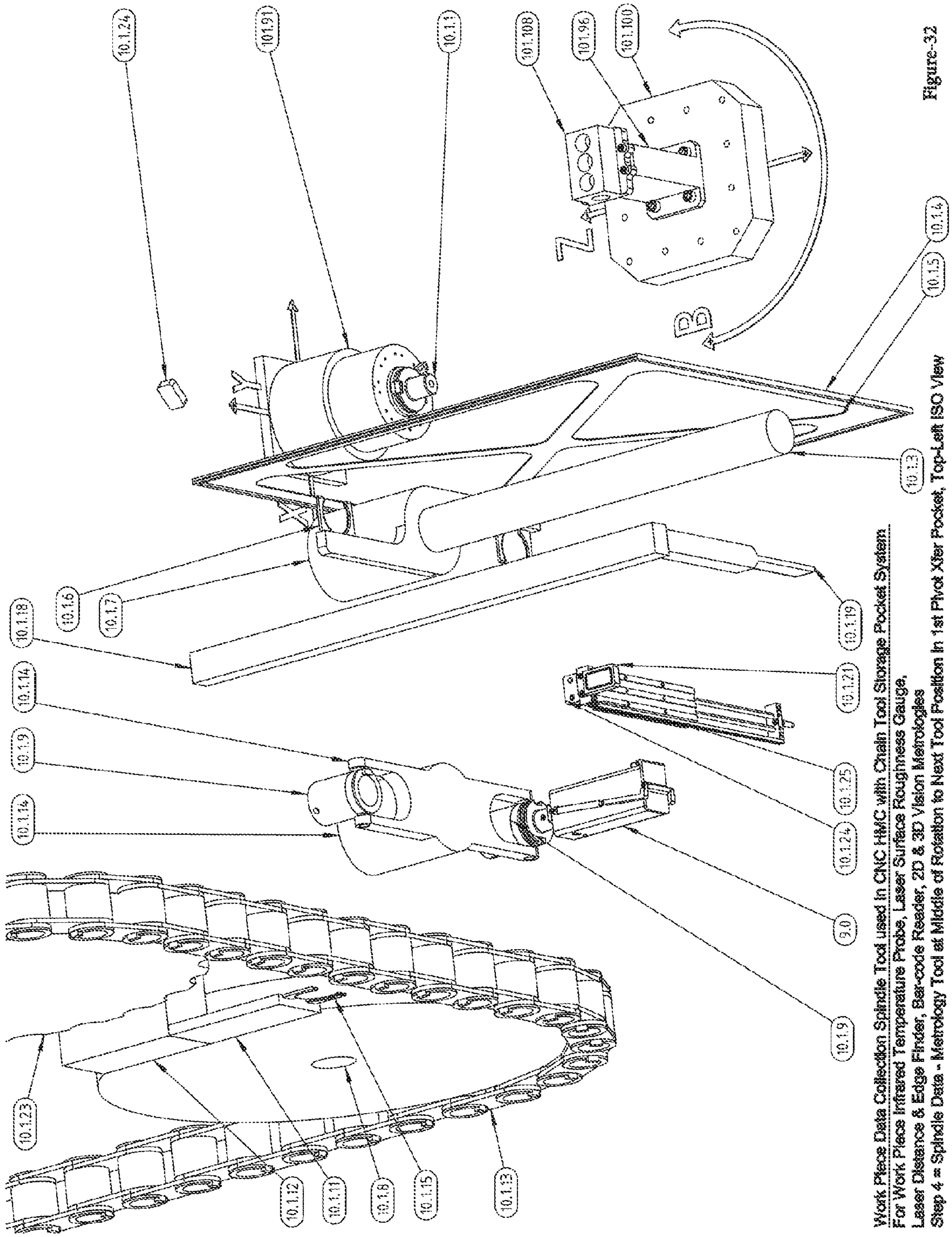
Figure 33:
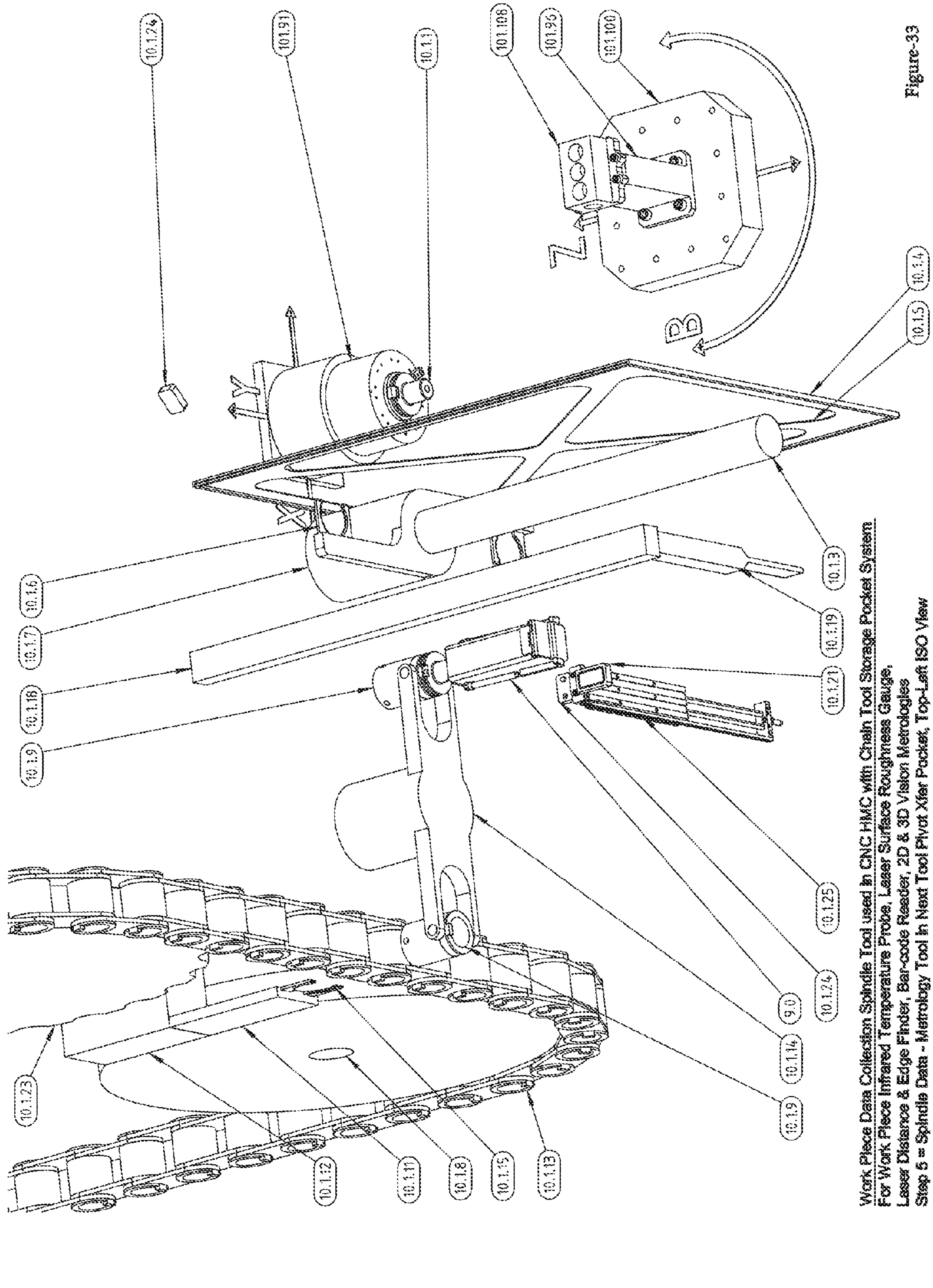
Figure 34:
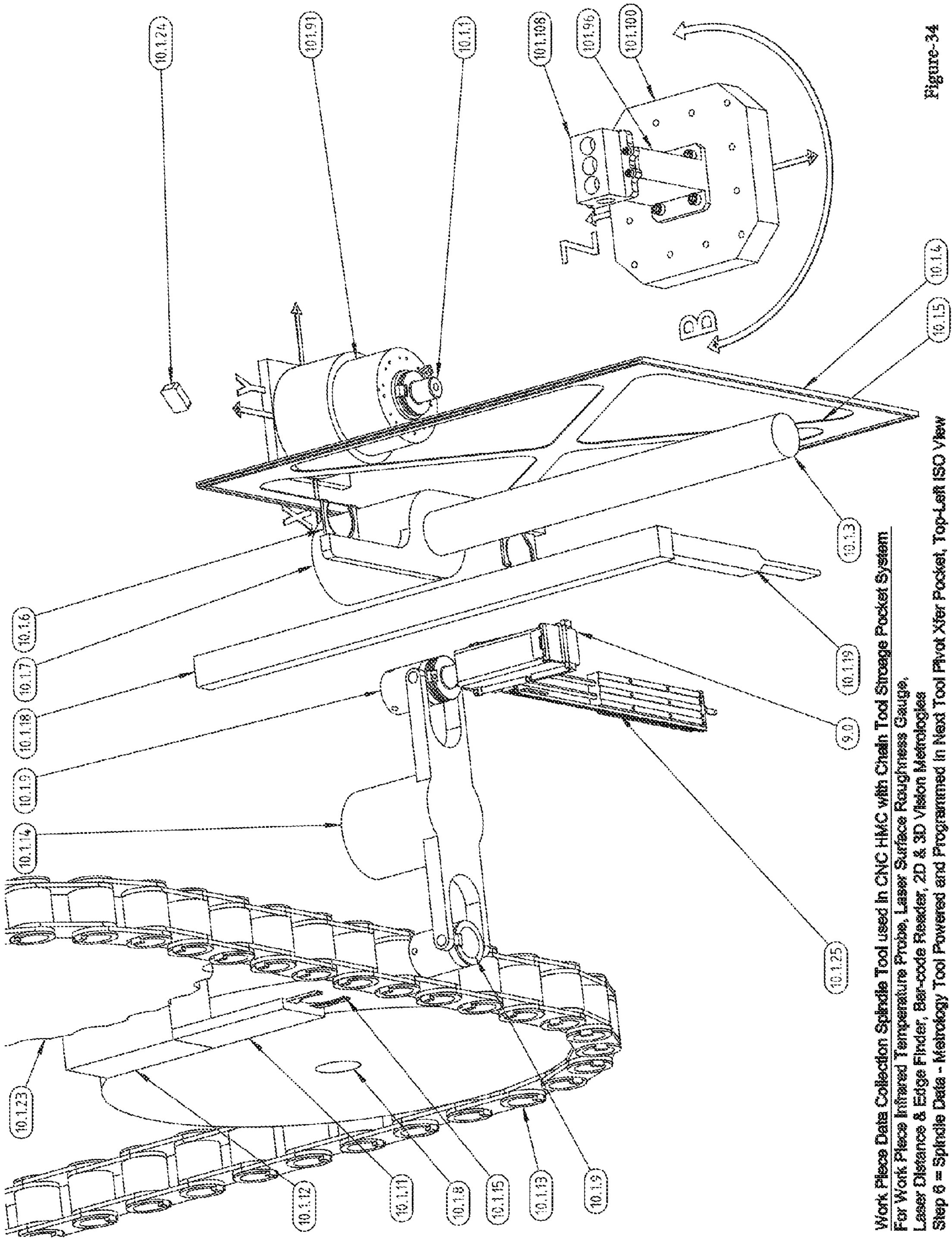
Figure 35:
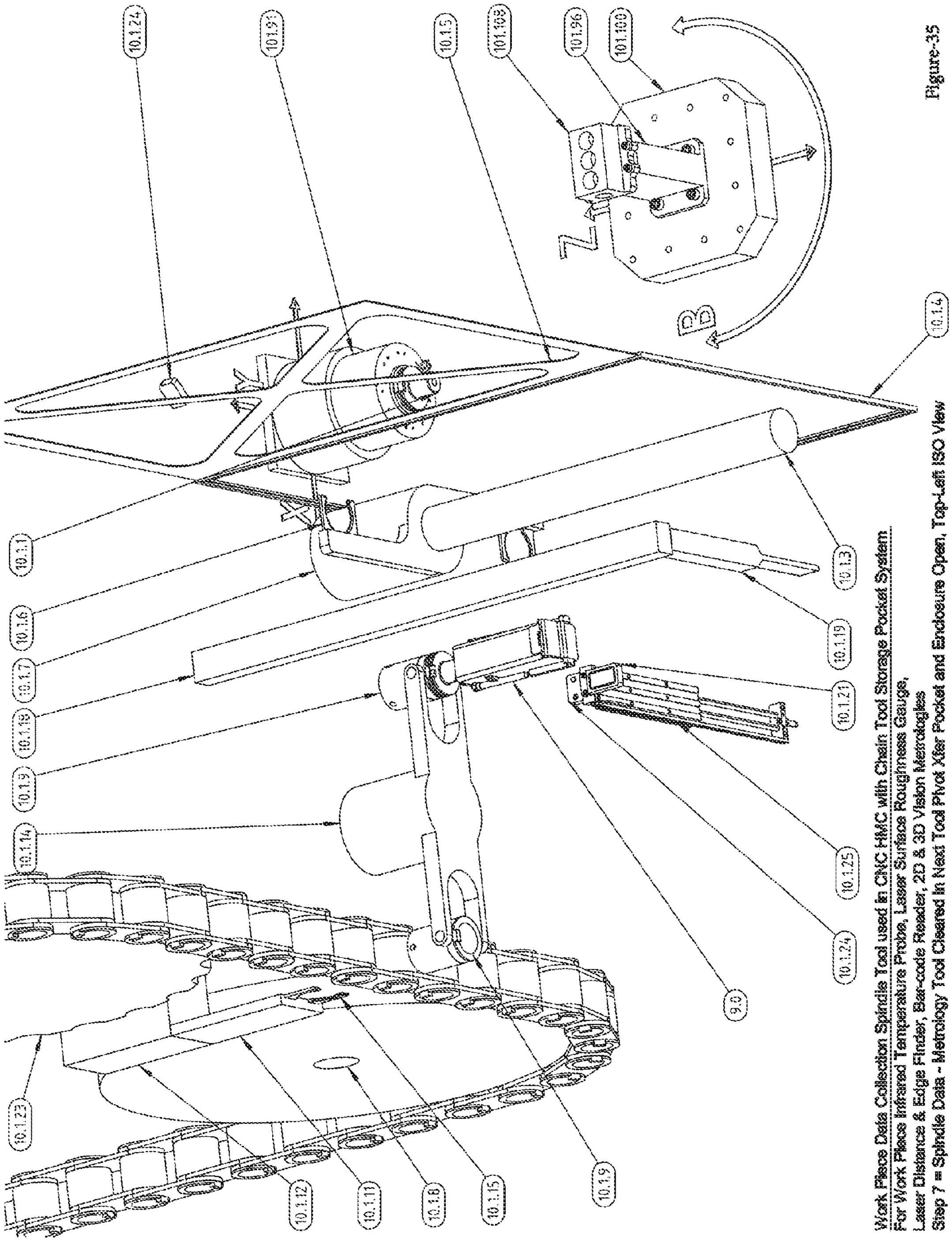
Figure 36:
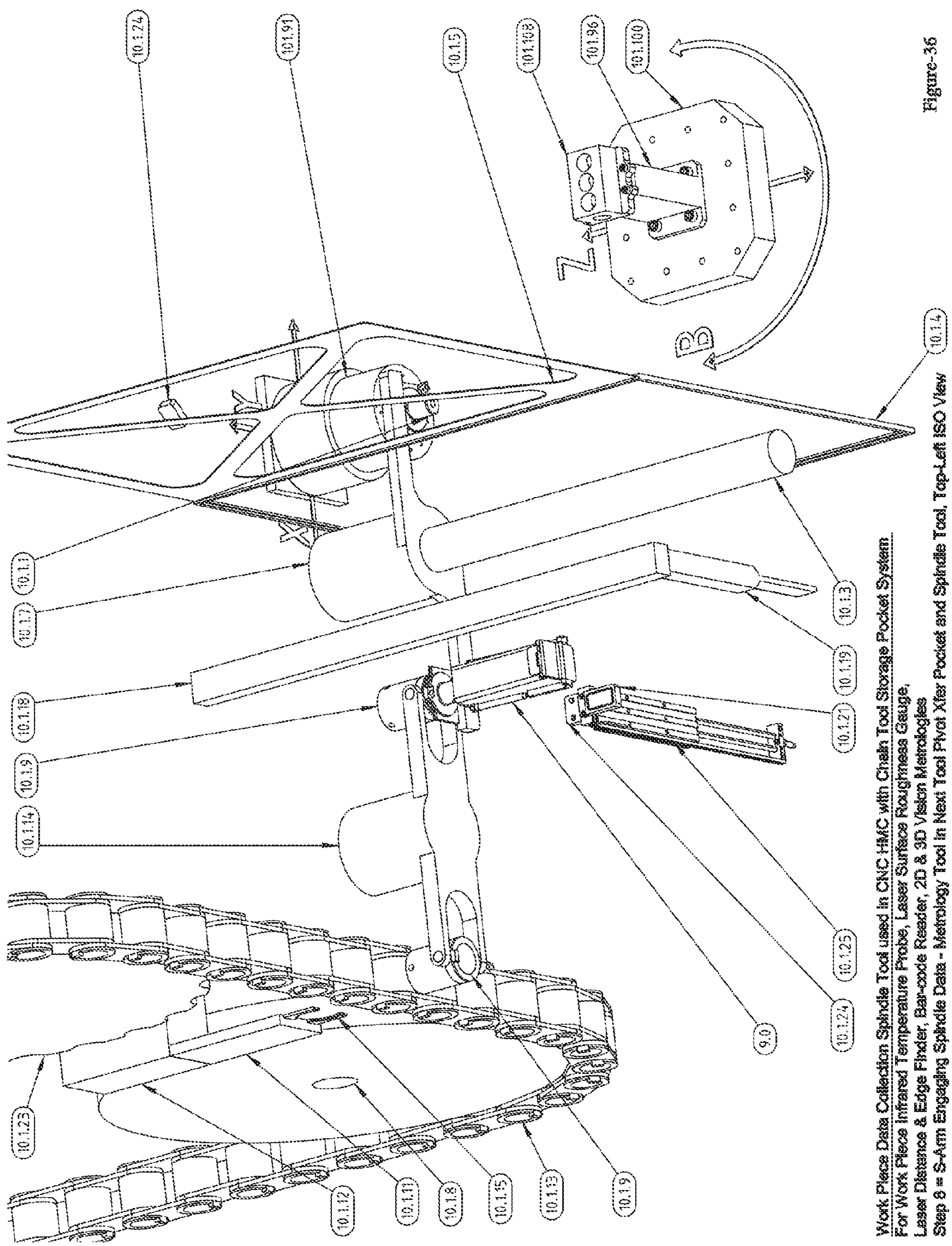
Figure 37:
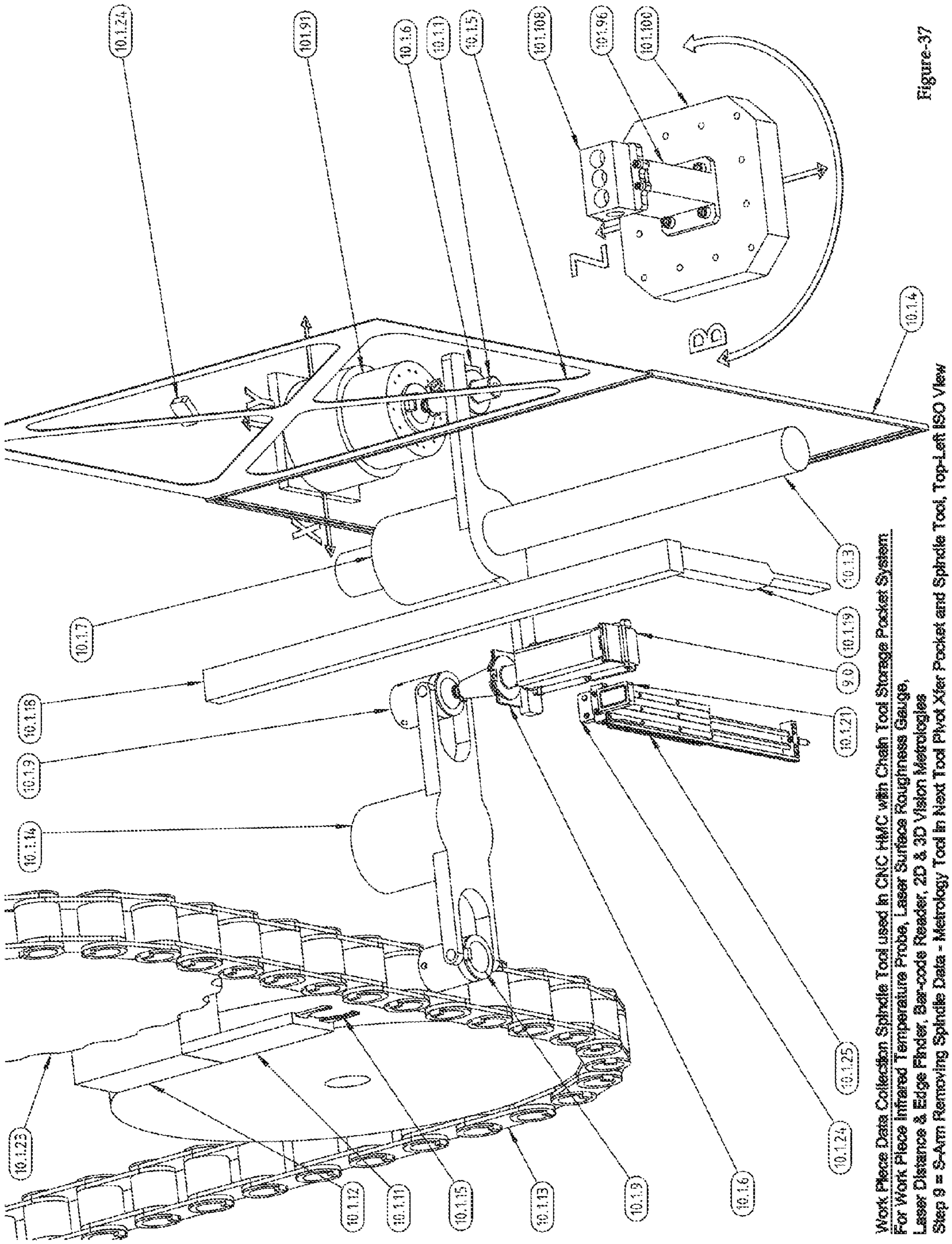
Figure 39:
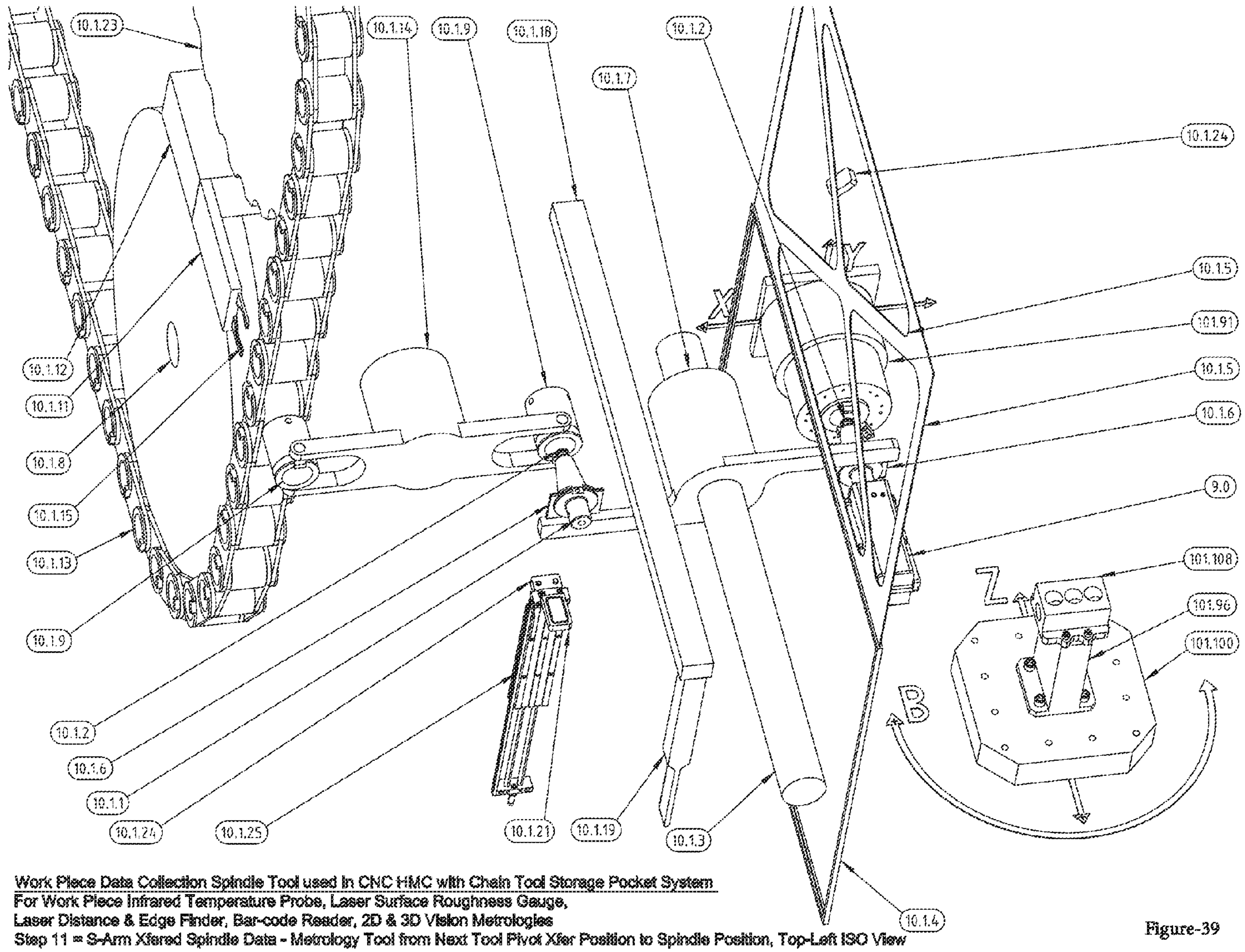
Figure 44:
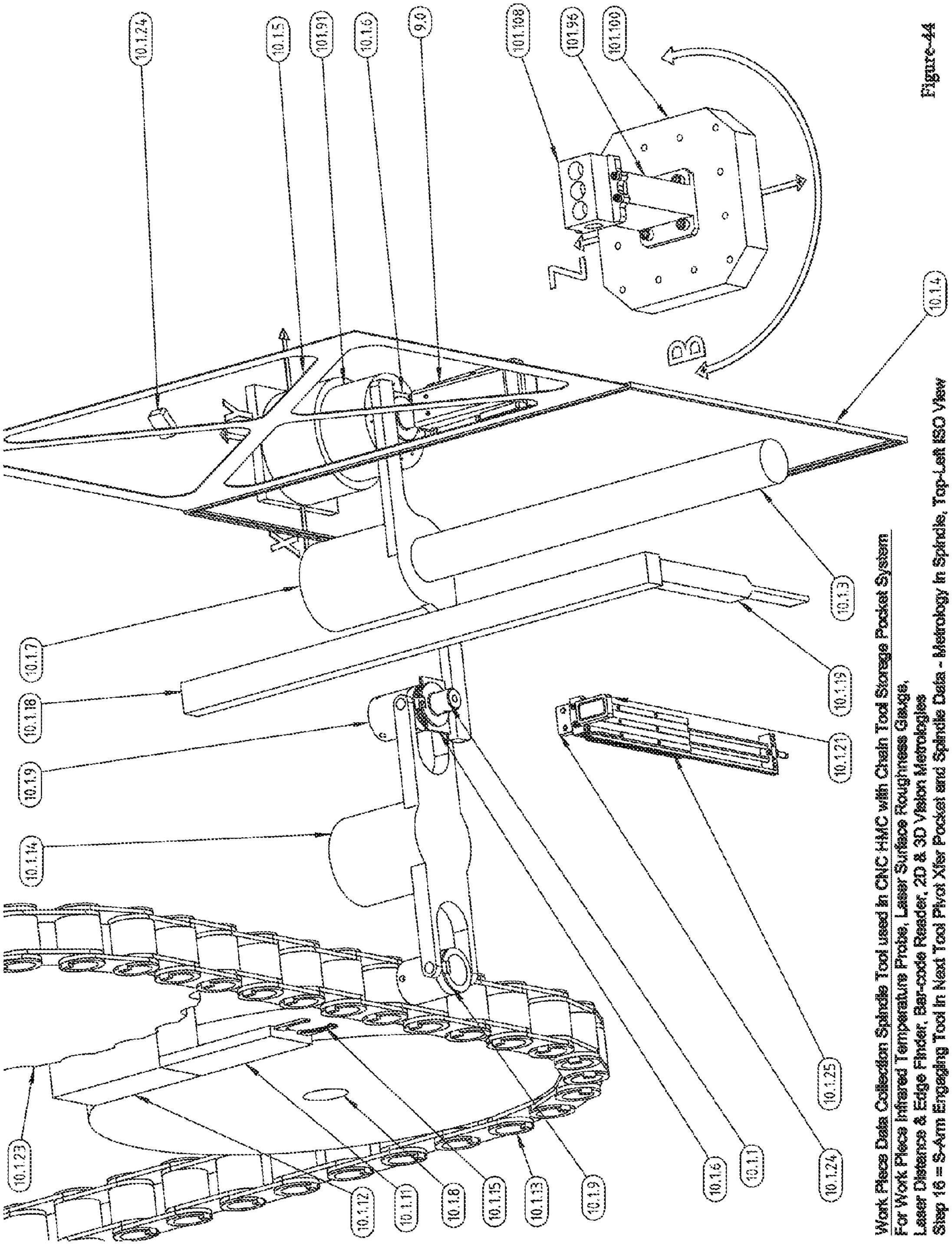
Figure 45:
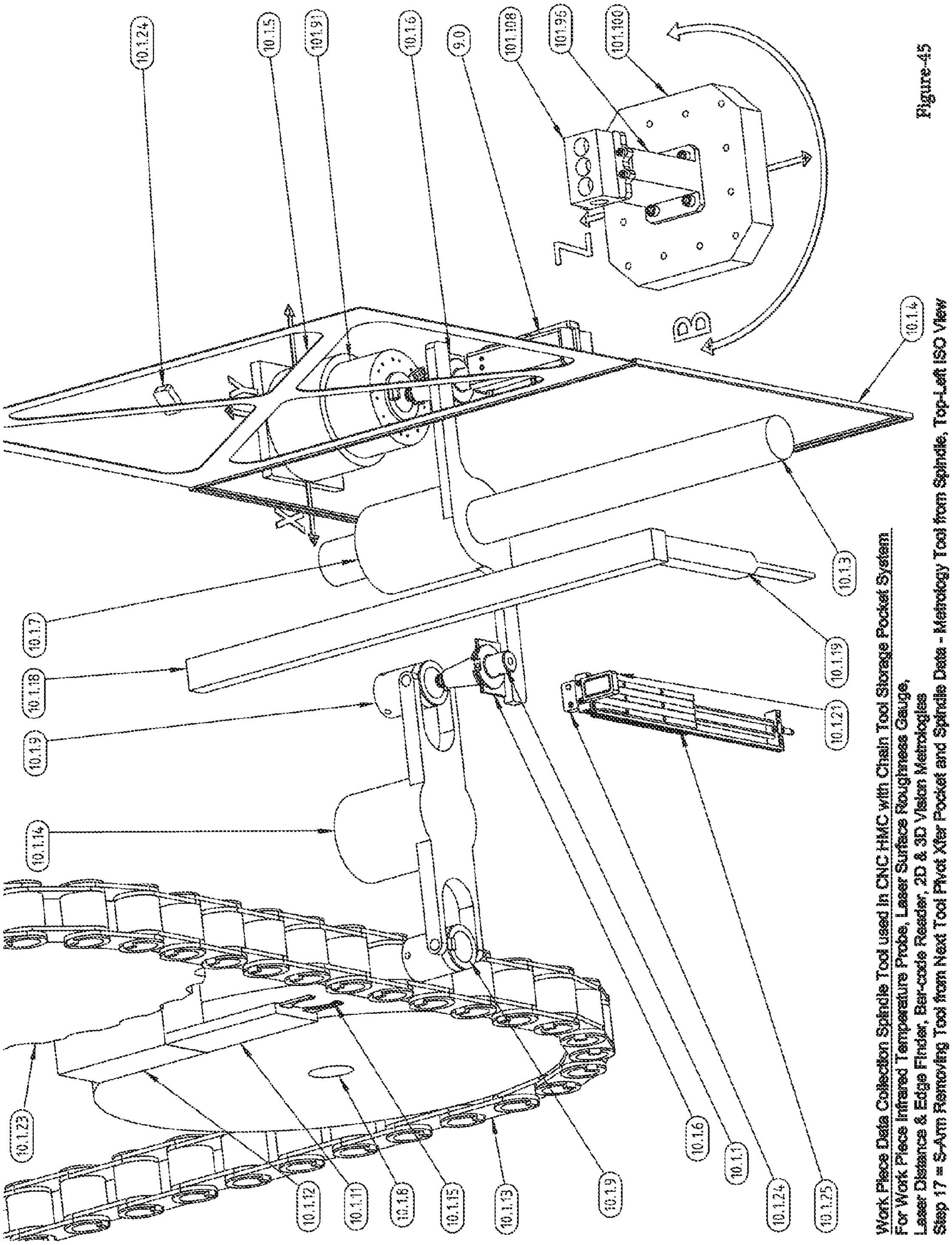
Figure 49:
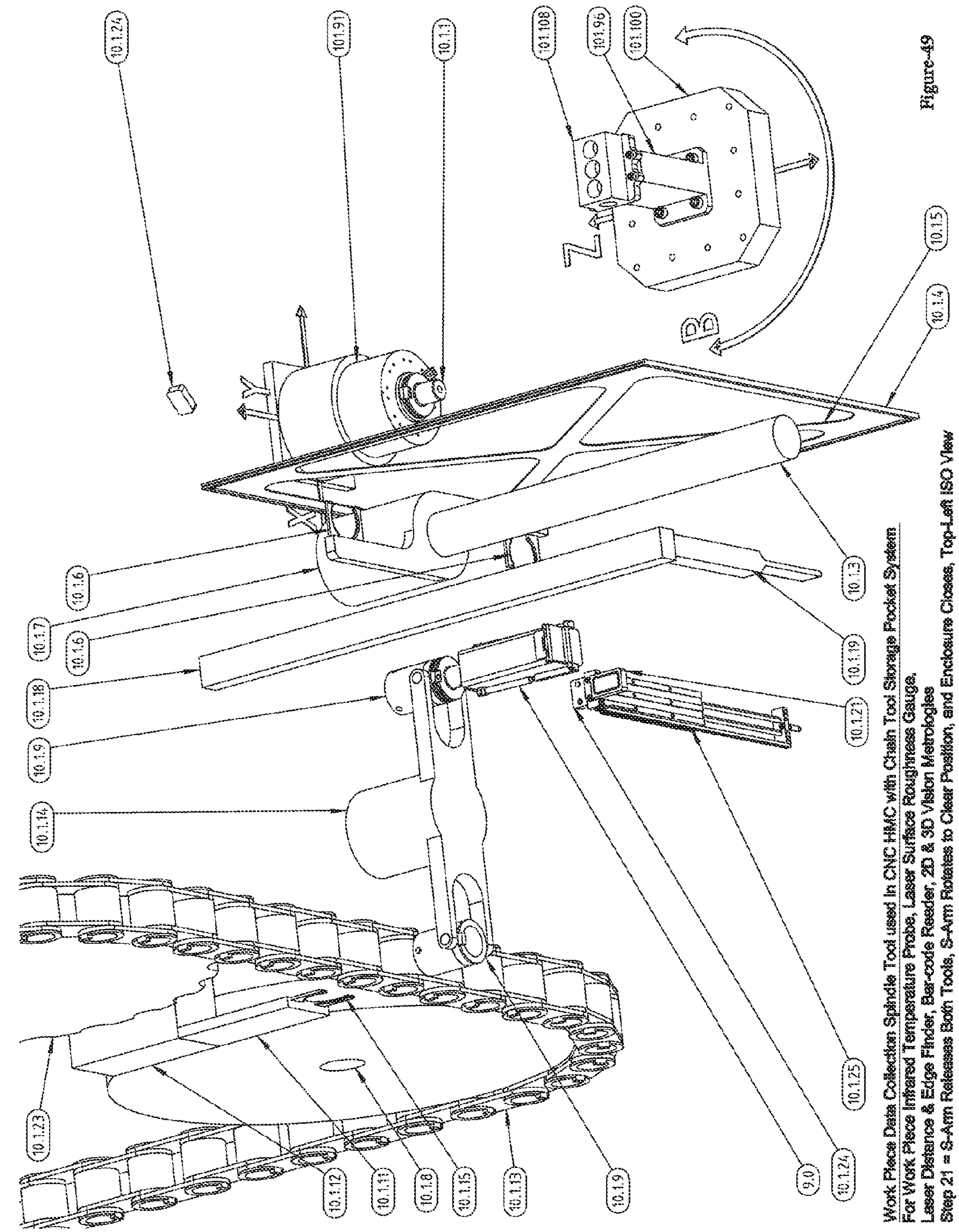
Figure 50:
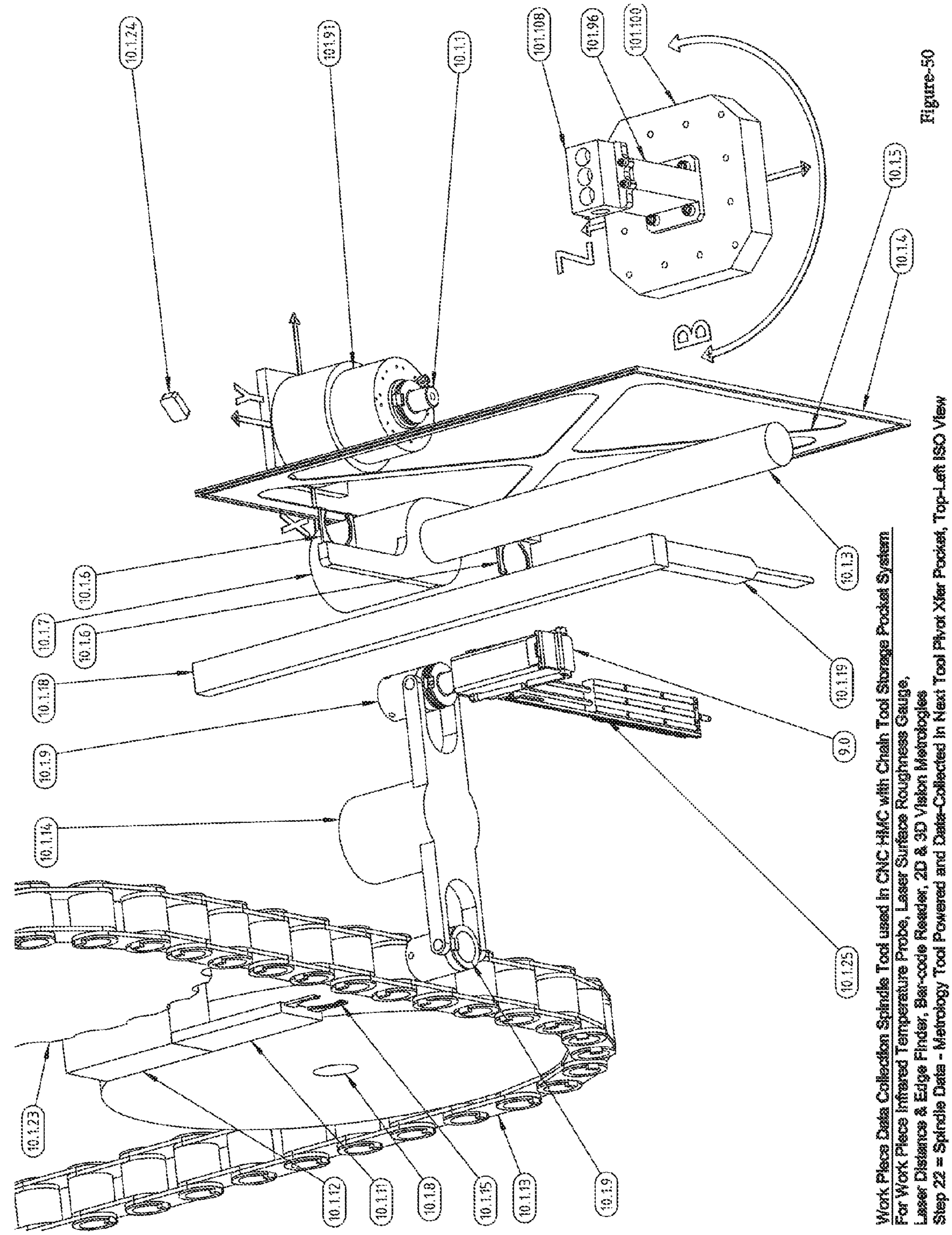
Figure 51:
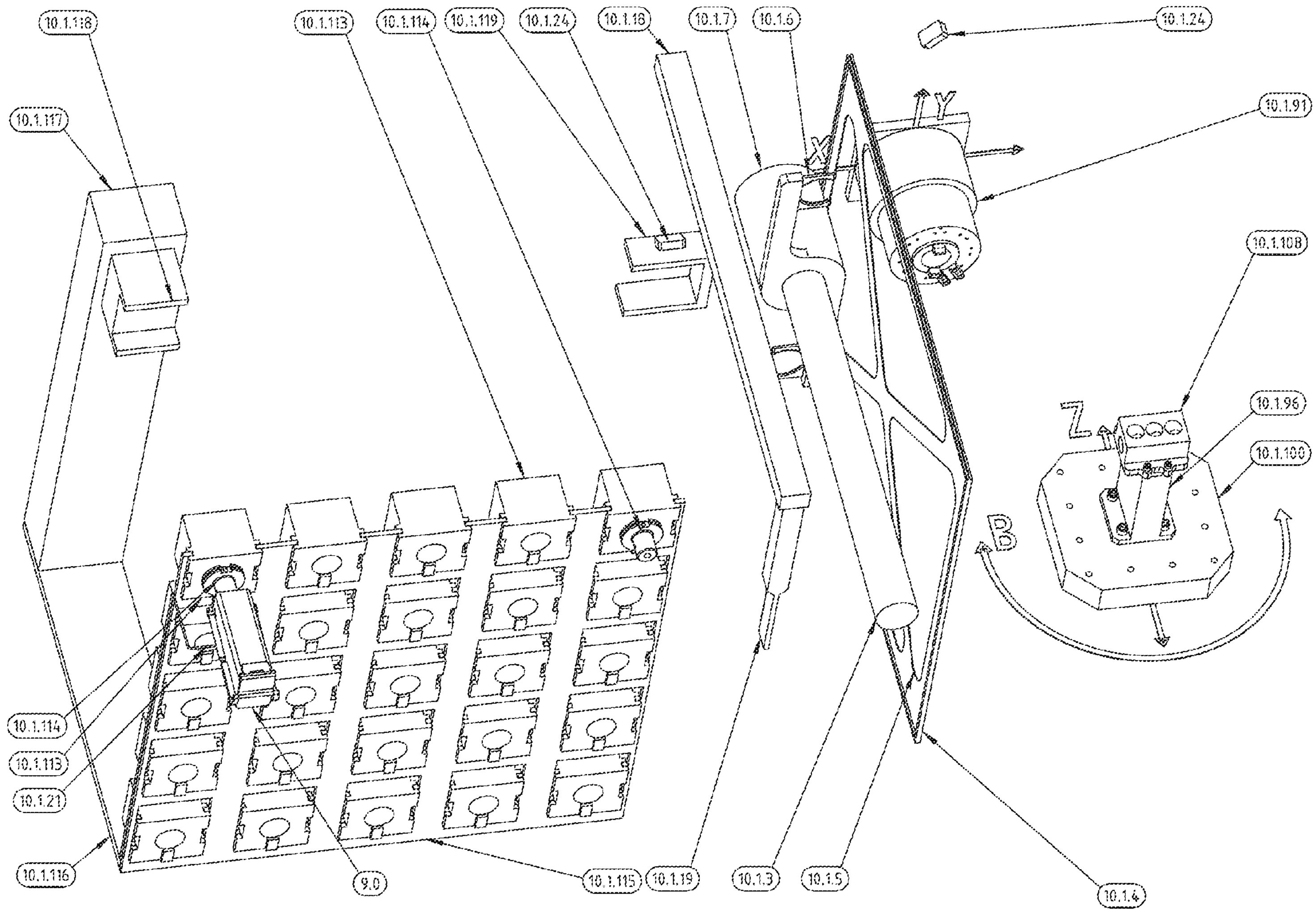
Figure 52:
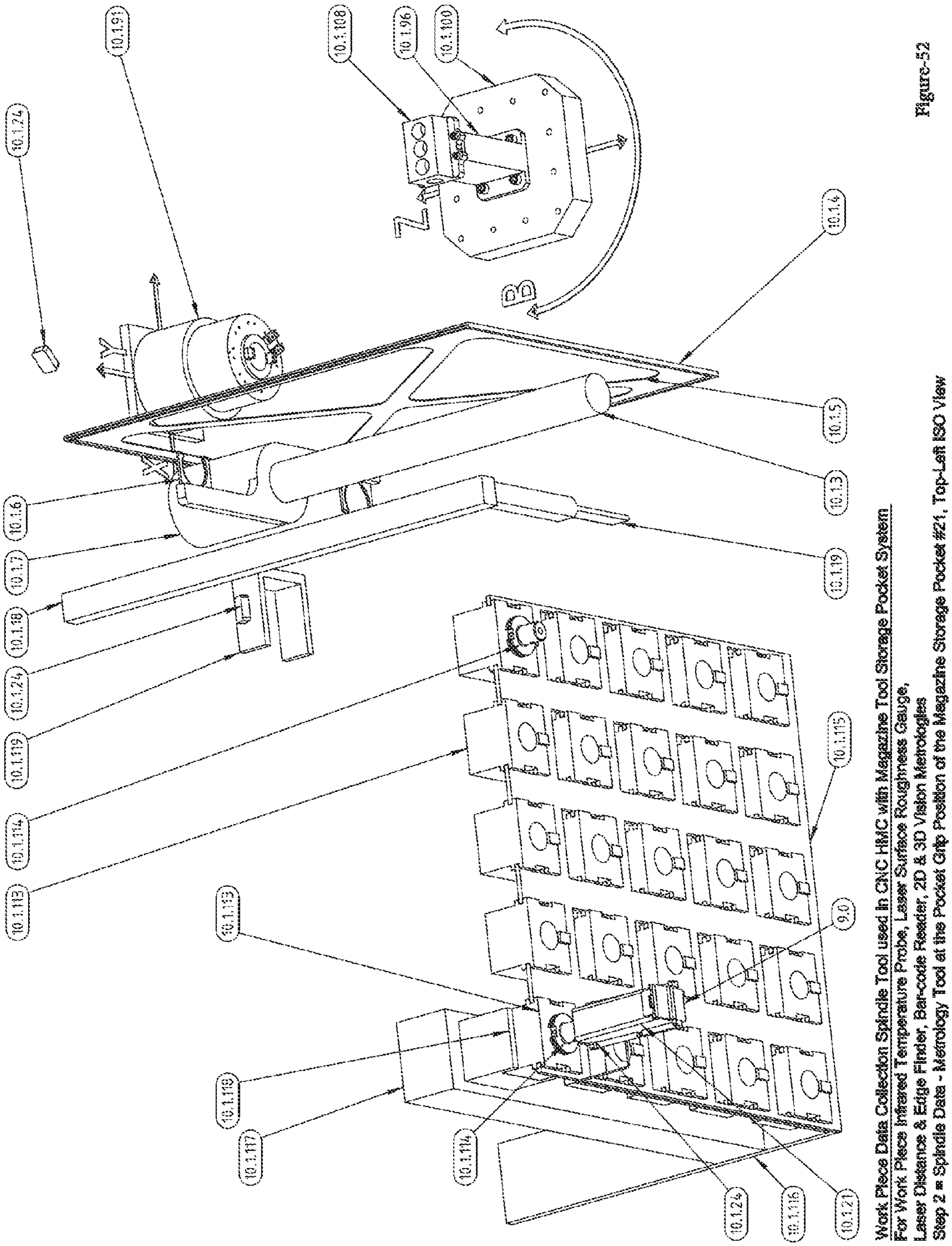
Figure 53:
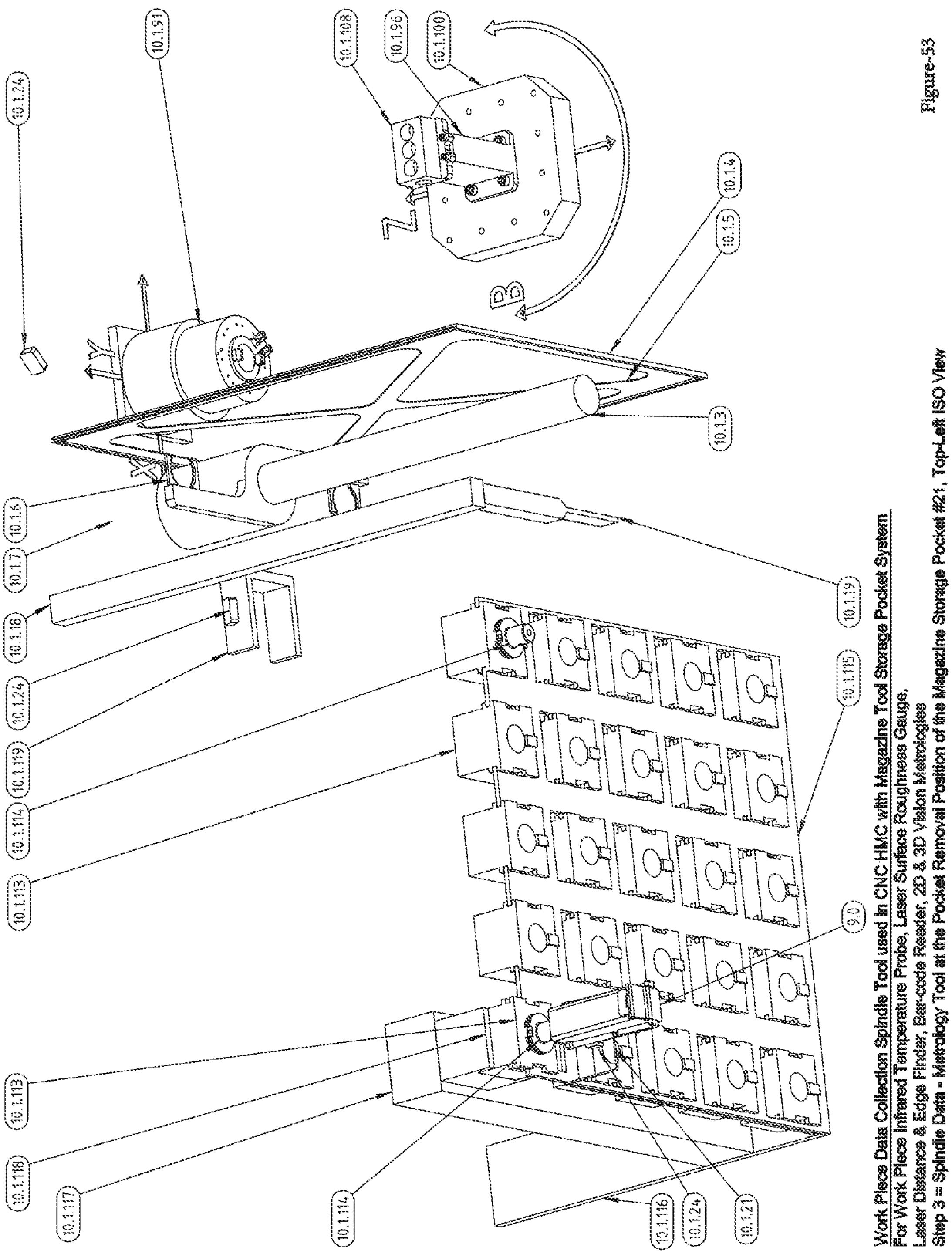
Figure 34:
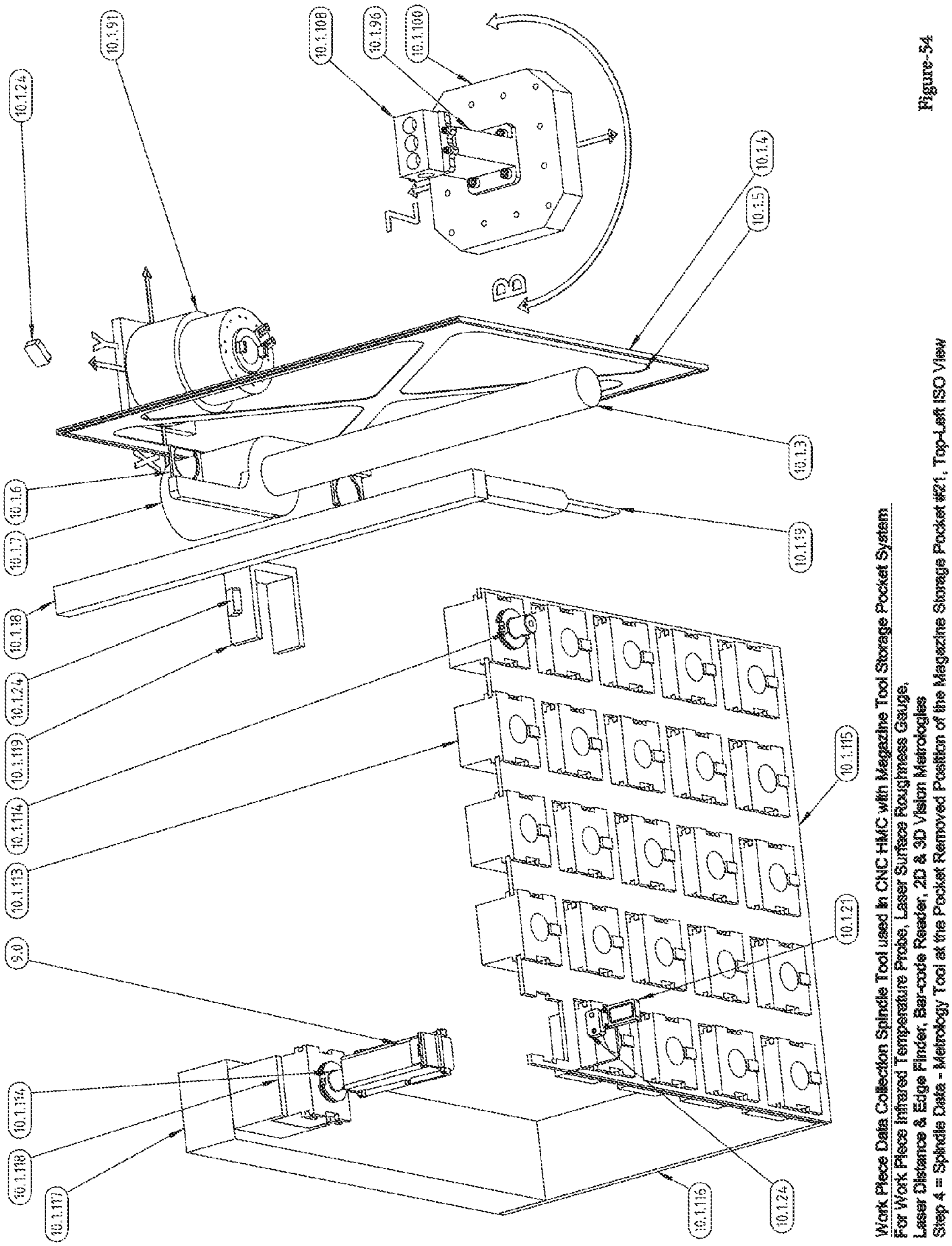
Figure 55:
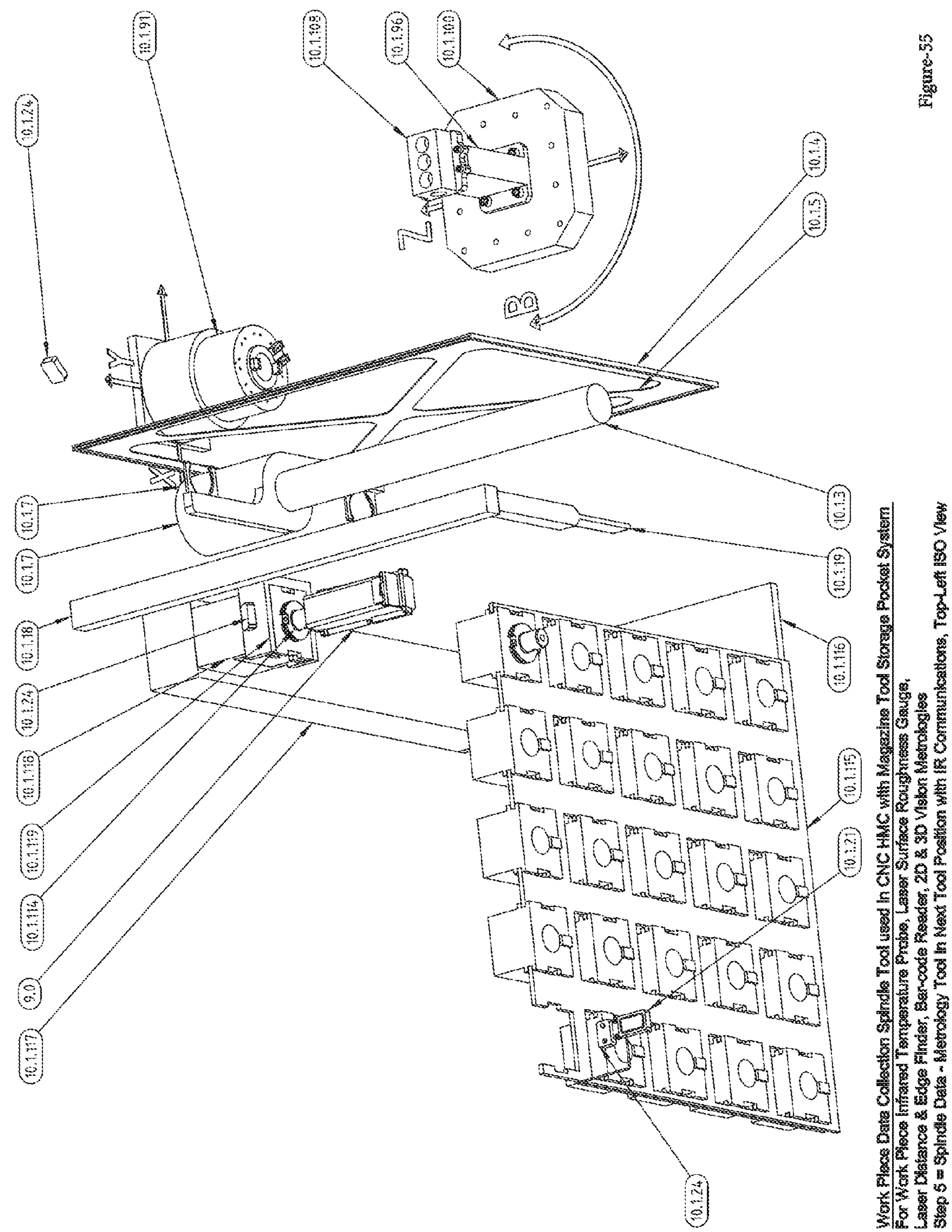
Figure 56:
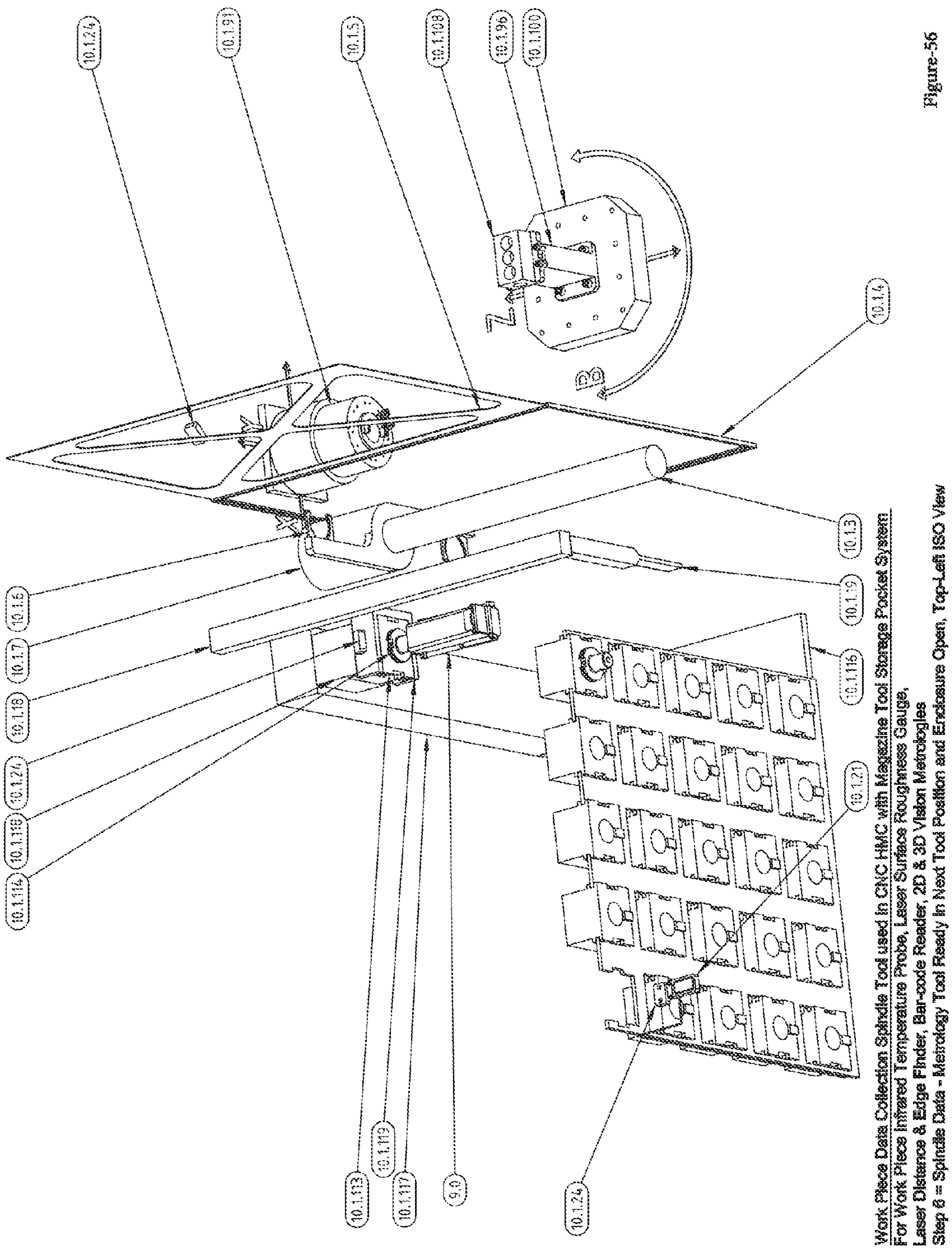
Figure 60:
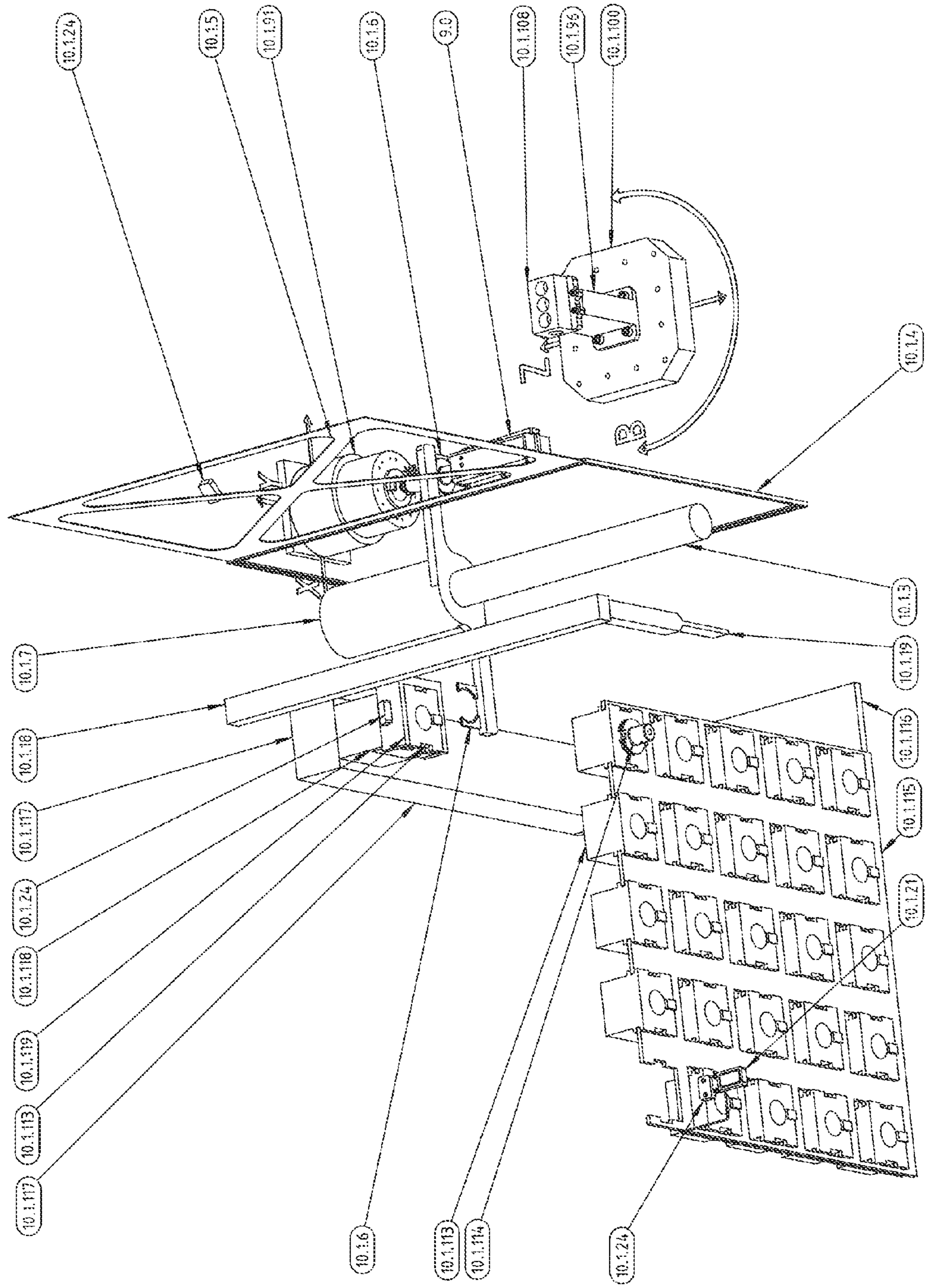
Figure 64:
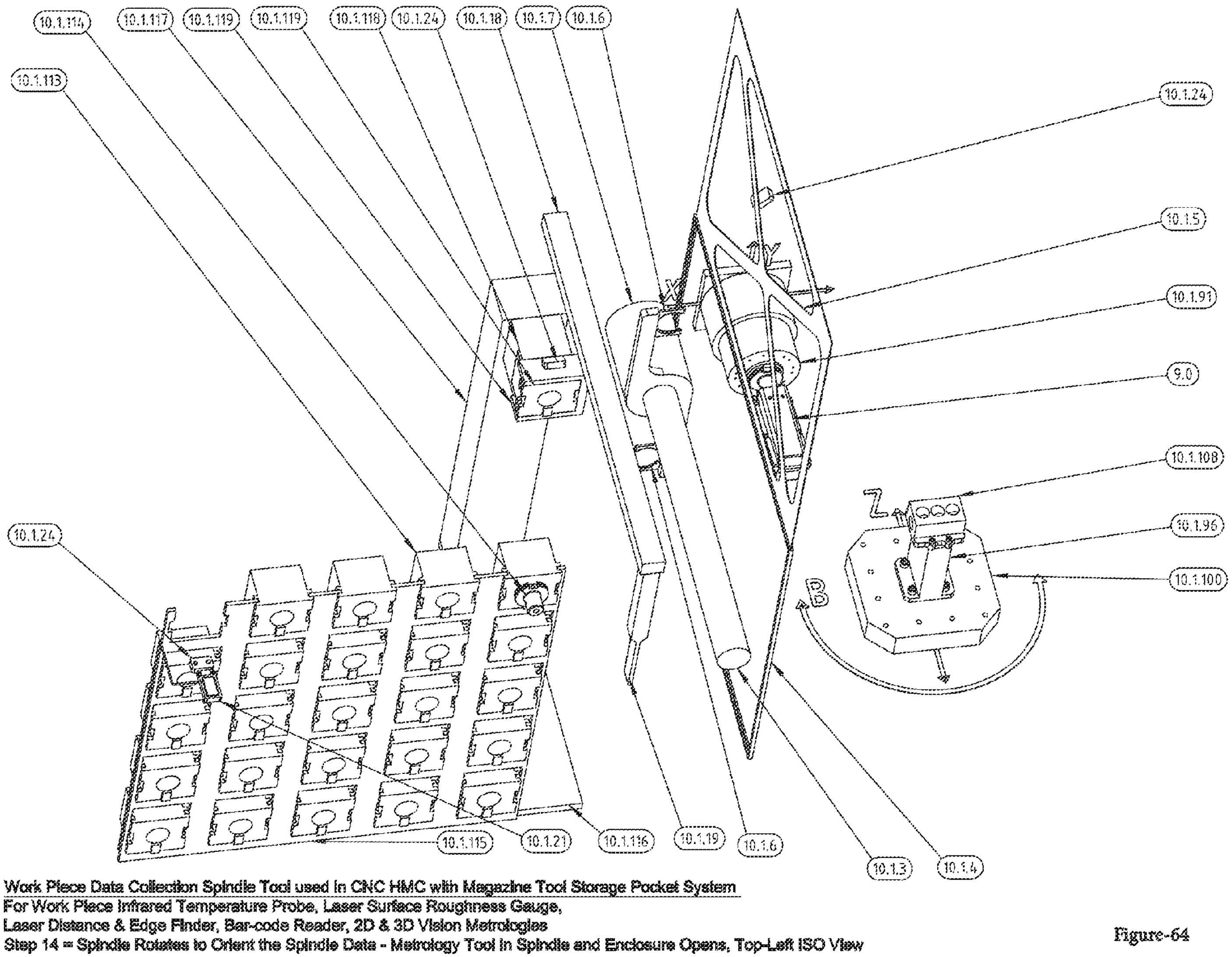
Figure 65:
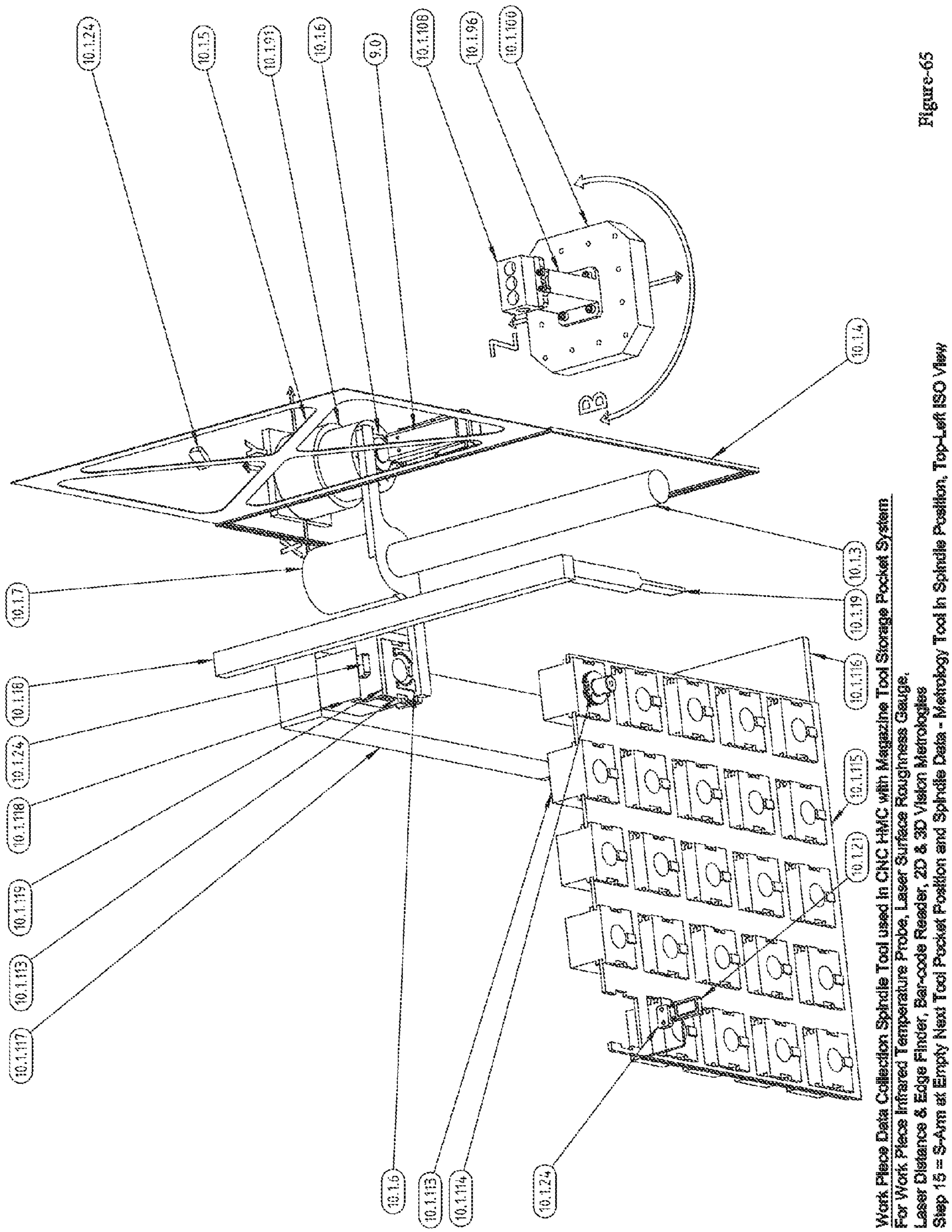
Figure 66:
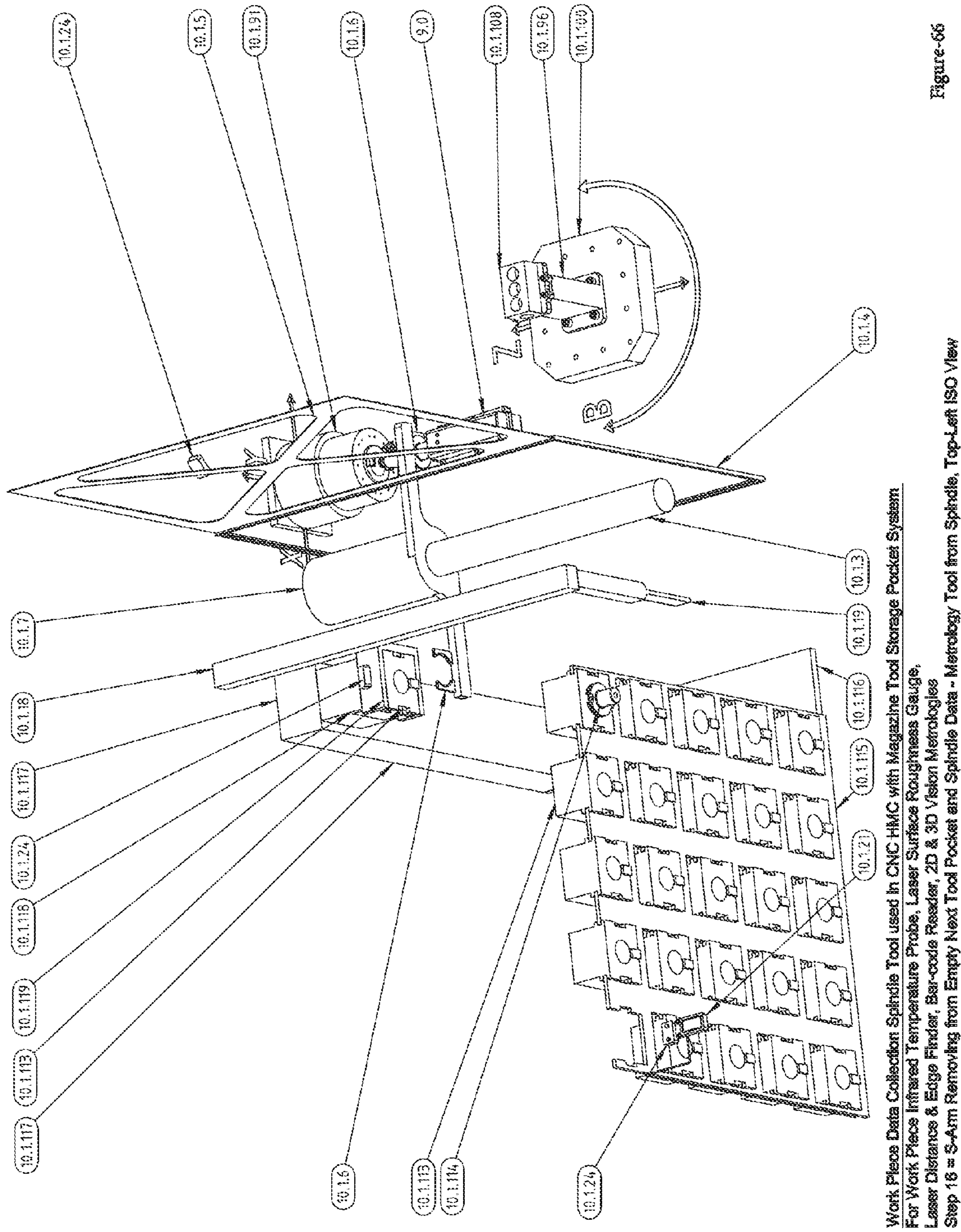
Figure 73:
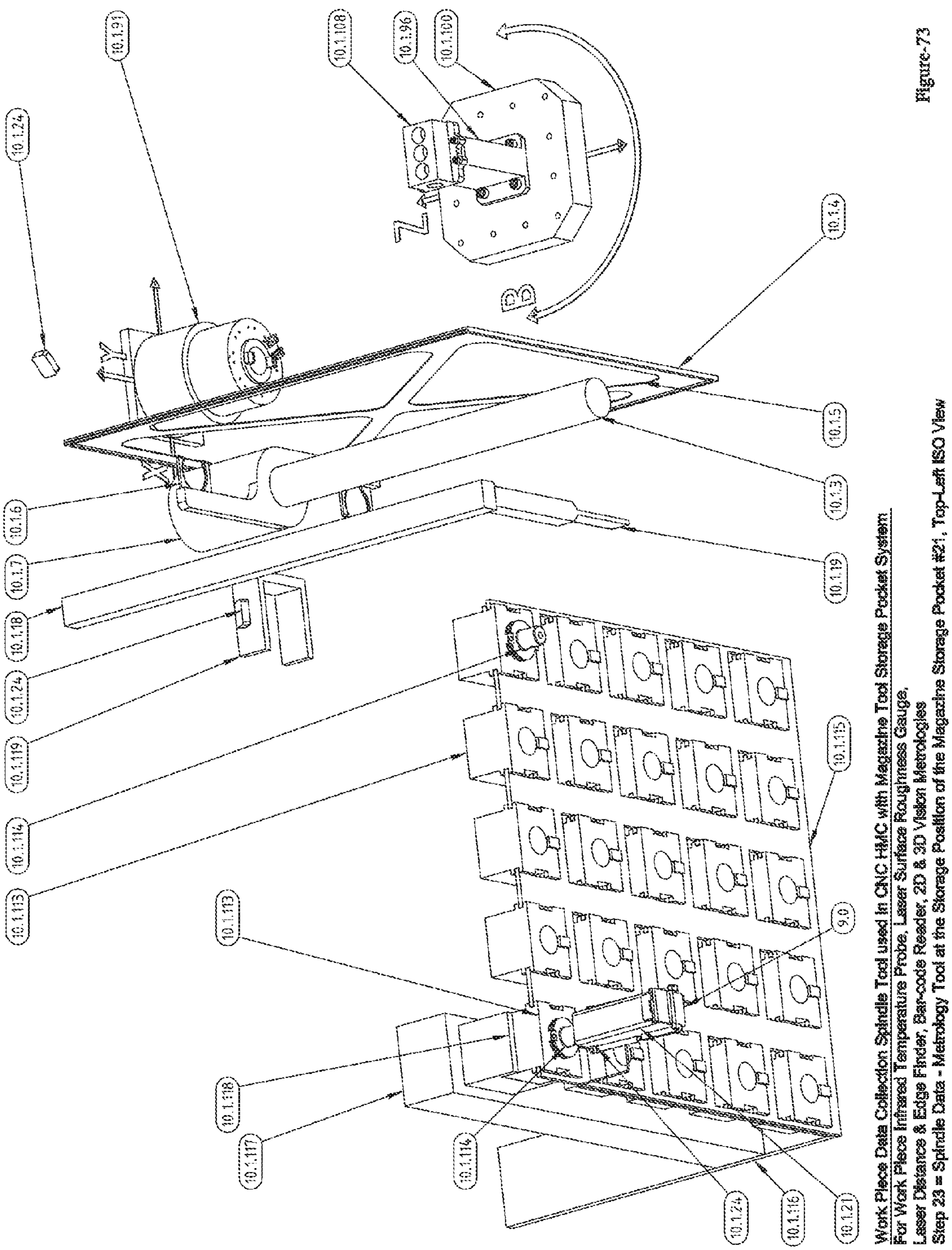
Figure 74:
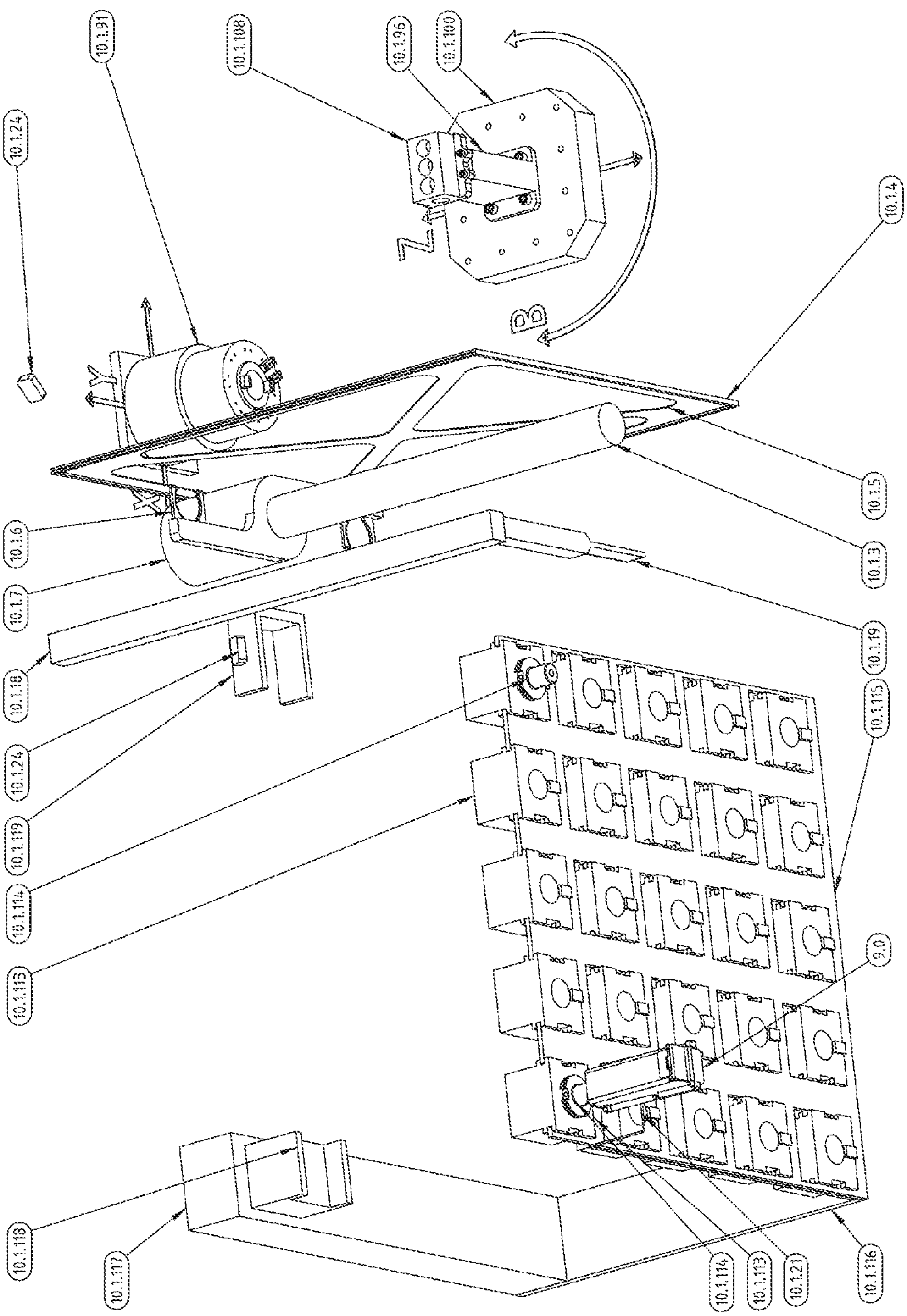

FIG. 26 in FIG. 27 shows the hidden and cutaway views for the internal modules and devices for the spindle mountable camera multiple sensor data acquisition/inspection system of FIG. 15 having the contact recharging module 9.112.

FIG. 28 is the individual descriptions for the typical components for the spindle mountable camera multiple sensor data acquisition/inspection system of FIG. 15.

Spindle Tooling for Work-Piece Verification, Data Collection, Utilization, and Exchange:

Via the real-time and automatic spindle tooling comprising either separately and or a combination of Vision Inspection, Vision Pattern Recognition, Vision Capture, Optical Character Recognition, Bar-code scanning, Surface Roughness Measurement, and work holding fixture temperature and work-piece parts' temperature real time data being verified and/or correlated to a specific and unique work-piece parts' identification number and its processing requirements and or specifications. There are multiple configurations for the work-piece part's/article's data collection tooling from having a single task sensor with an optional integral air work-piece part machining chip and cutting coolant blow-off being initially operated by the spindle's pressurized air to open the protective enclosure cover and activate the data collection tool, or having the multi-functionality for Illuminated Vision inspection, laser bar code scanning, and laser distance gauging, as shown in FIGS. 1-14, or advanced functionality having the fore mentioned single task sensor and multi-functionality plus a laser surface roughness gauge and a laser scanning surface profiler for measuring finished bored details, radiuses, etc. . . . as shown in FIGS. 15-28.

The real-time work-piece data temperature collection and the correlated machining corrections has become a requirement for the cost effective machining of precision work-piece parts as the utility cost for maintaining a stable temperature manufacturing environment, that is traceable to National Institute of Standards and Technology measurements being temperature compensated to 68° F. and other standards, can be more expensive than the facilities and utilities needed for machining the work-piece part/article.

The spindle probe tool is a routine method for determining the correct loading of work pieces prior to machining; however, it is a time-consuming portion of the machining operation that can result in the destruction of the spindle probe tool and render it and the machining center that it is installed in operative when the spindle probe tool collides with, and is destroyed or damaged by contact with, an incorrectly loaded work-piece part.

The spindle probe tool is a routine method for determining the location and dimensions of features of the work-piece part; however, without the real-time temperatures of the work-piece part(s), work holding fixture, and the machine tool, the dimensional corrections to the NC-program could be erroneous and an additional source of manufacturing defects.

The following are common examples of the multiple benefits to inspecting the raw casting and or incoming work-piece part/article before the machining operation to determine:

1. The real-time temperatures' of the work piece(s) and the machining work holding fixture prior to machining is required to adjust the machine tool's NC-Program for correctly machining the work piece(s).
2. The real-time temperatures' of the work piece(s) and the machining work holding fixture during the machining operation being used to adjust the machine tool's NC-Program for correctly machining to the precision tolerances that may be required for the work-piece part/article utilizing the NC-Programs and finish machining work holding fixture.
3. The capturing of the work-piece casting's integral data and identification that may be machined away during the subsequent machining operation being the upper left portion of the raised date code "casting stamp" that was removed by the machining operations for the round port detail and the lower right portion of the raised day code "casting stamp" that was removed by the machining operations for the work piece's engraved identification data detail.
4. The capturing of the information on the casting's permanent and or non-permanent identification and or routing labels that may be machined away during the machining operation.
5. That the specific work pieces are being loaded into the work holding fixture have had their respective machining operation(s) being done correctly.
6. That the work-piece is loaded correctly into the work holding fixture for its correct and safe operation are of an event that can happen when the work-piece part is not loaded correctly.
7. That the work-piece part is loaded correctly into the work holding fixture and that it is secured for its machining operation such as the inadequate hydraulic work holding fixture clamping pressure, or the risk of destructive consequences of having inadequate hydraulic pressure to secure the work-piece part.
8. That the specific work-piece parts are loaded into the multiple work holding fixture locations for their respective machining operation, having the bottom center work-piece part loaded incorrectly or the consequences of a work-piece part having not been loaded correctly and then machined incorrectly.

There are multiple benefits to inspecting the work-piece during the machining operation to determine:

1. That the work-piece part did not move in its work holding fixture during the previous machining operation, where the work-piece part was moved in the work holding fixture during the multiple machining operations.
2. The real-time temperature corrected correlation for the differential of the thermal expansions of the machine tool, work-piece part(s), and the machining work-piece part holding fixture prior to final finish machining operation to adjust the machine tool's NC-Program for correctly machining the work-piece parts(s).

There are multiple benefits to inspecting the work-piece at the end of the machining operation to determine:

1. That the correct surface finish(es) of the machined work piece before the unacceptable machined surface finish work-piece part is released/un-clamped from the pallet/work-piece holding fixture and loses the work-piece parts' datum references as would be needed to re-machine the unacceptable machined surface finish.
2. That the machined details of the work-piece are correct before releasing/un-clamping from the pallet/work-piece holding fixture and losing the work-piece parts' datum references as would be needed to re-machine the unacceptable machined detail.
3. That the manufacturing discrepancies are traceable to the specific machining operations for the work-piece part, the specific machine tool, and its operational variables at the time that it was machined.
4. That all of the initial information, either being via marking ink/pen, label, imprint, pattern and or work-piece part identification, on the work-piece part is captured and correlated to the work-piece part's subsequent identification.
5. That the engraved work-piece part identification data, its operational data, and optionally its encoded engraving land data, is correct and captured in real-time for the integrity of the work piece's data exchange interface(s) and its traceability, as the time and expense for inspection can be more than the time and expense to machine the work-piece parts, while the initial results for both the machining and inspection operations may not be reproducible when the machined details are measured and reported to the millionth of an inch [0.000001"].

Advantages of Real-Time Spindle Tooling for Work-Piece Data Collection:

The real-time Spindle Tooling for Work-piece data collection will improve the utilization of machine tools via the elimination of downtime being caused by operator errors, improve the precision of machined work-piece part(s), and improve the environmental safety for the machine tool operators as:

There is a "no load" plus/minus 0.000200" repeatability limitation for the pallet transfer mechanisms, that is typical, of machining centers, for the work-piece part holding pallets' transferring for unloading and reloading the pallet/work-piece holding fixture. As the operator would have to transfer the work-piece part work holding fixture pallet from the internal enclosed machining area, out to the external access area for the operator to inspect the machined work-piece part(s), then transfer the pallet and its work-piece part(s) back into the internal enclosed machining area for the corrective machining operation(s) as required. However the plus/minus 0.000200" repeatability limitation of the machine tool effectively eliminates the benefits of any corrections that could be made via the re-machining of a work-piece part where the true position tolerance for features would need to be more than 0.000400" for a work-piece part having multiple details requiring less of a tolerance.

There are multiple immediate safety and environmental hazards for the operator entering the internal enclosed machining area to inspect the work-piece part(s) in situ, as this area of the machine tool is not designed to be occupied by the operator on a regular basis, such as slippery combustible mineral-based cutting fluids that requires an automatic fire suppression system for the machine's safe operation that could become fatal for the operator if it was activated while the operator was in the enclosed area. Alternatively, slippery water-based cutting fluids can become a bacterial hazard for the operator creating multiple medical risks ranging from a minor asthma attack to fatal bacterial pneumonia, while the long-term human exposure risks to the consumable cutting materials, coatings, and the material being removed by machining operation from the work-piece parts/articles are being determined, there are several materials such as beryllium-copper, graphite, silica, etc. . . . having known human exposure risk.

The in-process inspection of the work-piece part/article during the machining operation is required by the tolerances required for some finish bored hole machining operations that can be done by the means of a "gauge cut" being done semi-automatically via the NC-Program O3173 for the T1760 Rough and Semi-finish rotor bore tool, and the T1757 Finish Rotor bore tool. The operator's selection of the machine tool's "gauge cut" option causes the work-piece part/article to be bored only to a limited depth, which is not critical to the operation of the assembled work-piece part, for the bored feature to be measured and the boring tool's cutter being either (a) used as is, (b.1) adjust the insert(s) actual cutting diameter, (b.2) repeat the "gauge cut" machining operation, (b.3) measure the bored diameter to determine the actual cutting diameter, (b.4) go back to the previous step a or b.1, or (c) replace the boring tool's cutter(s) via (c.1) replacing the worn cutting insert(s), (c.2) backing off the insert(s) effective cutting diameter several thousandths of an inch as determined by operational experience for installing new insert(s), (c.3) repeat the "gauge cut" machining operation, (c.4) measure the bored diameter to determine the new insert(s) actual cutting diameter, (c.5) go to the previous step a or b.1, to machine an acceptable finish bored work-piece.

For the measurement of the bored feature(s) of the work-piece part/article for the cast iron work-piece part "317", the work-piece part must remain in the machining enclosure for its in-process measurements, as the variability of transferring the work-piece part from and back to the machining enclosure is greater than its specified machining tolerance. While having the rough machining cutters' wear condition affecting the temperature rise of the work-piece part/article during the machining operations, the shop's ambient temperature, and the timing for the operator to take measurements of the work-piece part/article after its machining operations are done affecting the measurement's uncertainty ratio. The uncertainty ratio can be as unfavorable as 1:1.6 for the work-piece part/article that has not cooled to near the ambient temperature of the carbon steel master reference bore ring, that is traceable to the National Institute for Standards and Testing for measurements being done at 68 F, used by the operator for the point-of-use comparison measurement of the bored hole(s) inside diameter using a certified dial indicator gauge.

The hours of time required for cooling the work-piece part/article inside of the machining enclosure of an idle machine tool, instead of machining, is considered to be too expensive to be practical. While the variability of the machine tool operator taking the temperature of the work-piece part/article can be unfavorable to the measurement's uncertainty ratio and could expose the operator to multiple immediate safety and environmental hazards for the operator entering the internal enclosed machining area.

Generally, an uncertainty ratio of 1:5 is considered as being practical with a ratio of 1:10 being considered ideal for measurement uncertainty.

Utilizing the spindle touch probe for tight tolerance measurements can negatively affect the uncertainty ratio, as the heat of the machine tool can influence the high resolution glass encoder scale(s) and introduce more uncertainty.

Manual Finish Boring Tooling's Adjustment:

The Spindle Tooling for Work-piece data collection would provide for an automatic real-time point-of-use temperature sensing and measurement(s) to advise the operator of the actual temperatures needed to accurately compensate the measurement(s) for the bored hole dimensional feature(s) that would have to be larger for a work-piece part/article that is warmer than the National Institute for Standards and Testing for measurements being done at 68F.

Automatic Finish Boring Tooling's Adjustment:

The Spindle Tooling for Work-piece data collection would provide for an automatic real-time point-of-use temperature sensing and measurement(s) of the work-piece part/article's bored hole feature(s) that could be used with the Kennametal/Romicron finish hole boring tooling, via the CLB Pin for automatic Closed Loop Boring, to make Ø.000080" incremental adjustments, via the mechanical rotation of the spindle, to adjust the hole boring tooling's effective cutting diameter as required. Or the RIGIBORE/ActiveEdge finish hole boring tooling for automatic Closed Loop Boring to make Ø.000040" incremental adjustments electronically, via the wire-less ActiveEdge Interface to the adjustable cartridge holding the interchangeable cutting insert, to adjust the hole boring tooling's effective cutting diameter as required, or either of these Closed Loop Boring Tools' equivalents.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A spindle mountable camera system, comprising:
- a tool holder attachable to a spindle of a CNC machine;
- a mounting stem connected to the tool holder, including an axial air passage connectable to an air supply of the CNC machine when the tool holder is attached to the spindle and a radial air passage intersecting the axial air passage;
- an enclosure including a proximal end portion attached to the mounting stem and a distal end portion including a camera opening;
- a camera module disposed within the distal end portion;
- an air supply line connected between the radial air passage and the camera module to supply air from the air supply to the camera module; and
- an enclosure cover pivotably mounted to the enclosure proximate the camera opening and moveable between an open position wherein the camera opening is uncovered and a closed position wherein the camera opening is covered.

2. The camera system of claim 1, further comprising one or more actuators connected between the enclosure and the enclosure cover, operative to move the enclosure cover between the open position and the closed position.

3. The camera system of claim 1, further comprising a laser bar code reader disposed within the distal portion adjacent the camera opening.

4. The camera system of claim 1, further comprising one or more pneumatic cylinders extending between the enclosure and the enclosure cover and connected to the axial air passage, wherein the one or more pneumatic cylinders are operative to move the enclosure cover between the open position and the closed position.

5. The camera system of claim 4, further comprising an air switch interconnected between the axial air passage and the one or more pneumatic cylinders operative to selectively control an air flow to the one or more pneumatic cylinders.

6. A spindle mountable camera system, comprising:
- a mounting stem connectable to a CNC machine tool holder, including an axial air passage connectable to an air supply of the CNC machine when the tool holder is attached to the spindle and one or more radial air passages intersecting the axial air passage;

an enclosure including a proximal end portion attached to the mounting stem and a distal end portion including a camera opening;

a camera module disposed within the distal end portion;

an enclosure cover pivotably mounted to the enclosure proximate the camera opening and moveable between an open position wherein the camera opening is uncovered and a closed position wherein the camera opening is covered; and one or more actuators connected between the enclosure and the enclosure cover and connected to the one or more radial air passages, wherein the one or more actuators are operative to move the enclosure cover between the open position and the closed position.

7. The camera system of claim 6, further comprising a laser bar code reader disposed within the distal portion adjacent the camera opening.

8. The camera system of claim 6, further comprising an air supply line connected between the one or more radial air passages and the camera module.

9. The camera system of claim 6, further comprising an air switch interconnected between the one or more radial air passages and the one or more actuators operative to selectively control an air flow to the one or more actuators.

10. The camera system of claim 6, further comprising a plurality of batteries disposed in the enclosure and connected to the camera module.

11. A spindle mountable camera system, comprising:

a mounting stem connectable to a CNC machine tool holder and including an axial air passage and one or more radial air passages connectable to an air supply of the CNC machine when the tool holder is attached to a spindle of the CNC machine;

an enclosure including a proximal end portion attached to the mounting stem and a distal end portion including a camera opening;

a camera module disposed within the distal end portion;

an air supply line connected between the mounting stem and the camera module;

a laser bar code reader disposed within the distal portion adjacent the camera opening;

an enclosure cover pivotably mounted to the enclosure proximate the camera opening and moveable between an open position wherein the camera opening is uncovered and a closed position wherein the camera opening is covered; and one or more pneumatic cylinders extending between the enclosure and the enclosure cover and connected to the one or more radial air passages, wherein the one or more pneumatic cylinders are operative to move the enclosure cover between the open position and the closed position.

* * * * *